(12) United States Patent
Tadokoro et al.

(10) Patent No.: US 6,553,456 B2
(45) Date of Patent: Apr. 22, 2003

(54) LIBRARY DEVICE AND LOGICAL NUMBER ALLOCATING METHOD THEREFOR

(75) Inventors: Keiji Tadokoro, Kanagawa (JP); Toru Yumine, Kanagawa (JP); Nobuhiro Tsurumaki, Kanagawa (JP); Masato Yokota, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/116,353

(22) Filed: Apr. 4, 2002

(65) Prior Publication Data
US 2002/0144056 A1 Oct. 3, 2002

Related U.S. Application Data

(62) Division of application No. 09/378,994, filed on Aug. 23, 1999.

(30) Foreign Application Priority Data

Aug. 24, 1998 (JP) .......... 10-253288
Aug. 24, 1998 (JP) .......... 10-253289
Aug. 24, 1998 (JP) .......... 10-253290

(51) Int. Cl.[7] .............................. G06F 12/00
(52) U.S. Cl. .......... 711/112; 711/154; 711/202; 360/79; 360/83; 360/91
(58) Field of Search .......... 711/111, 112, 154, 711/202; 360/79, 87, 91

(56) References Cited

U.S. PATENT DOCUMENTS 5,936,918 A * 8/1999 Ohba et al. .............. 369/30.31
6,044,442 A * 3/2000 Jesionowski .............. 711/100
6,059,509 A * 5/2000 Ostwald .................... 414/277
6,271,982 B1 * 8/2001 Helmick ..................... 360/92
6,353,581 B1 * 3/2002 Offerman et al. ........... 360/92

* cited by examiner

Primary Examiner—Hiep T. Nguyen
(74) Attorney, Agent, or Firm—Frommer Lawrence & Haug LLP; William S. Frommer

(57) ABSTRACT

A library device, that is able to remote-actuate a recording/reproducing apparatus. The library device includes a recording/reproducing unit for recording or reproducing the information using a removable recording medium, a plurality of housing unit that is able to accommodate the recording medium therein, a transporting unit for transporting the recording medium between an optional housing unit in the housing unit and the recording/reproducing unit, and a control unit for controlling the transporting unit and/or the recording/reproducing unit. The control unit selects an operating mode of setting a control operation of permitting external terminal unit to perform the same control as that performed by the control unit or an operating mode of permitting the external terminal unit to perform control limited with respect to the control operation of the control unit, when the transporting unit and/or the recording/reproducing unit is controlled by the external terminal unit. The transporting unit and/or the recording/reproducing unit is controlled by the external terminal unit based on the operational mode selected by the control unit.

11 Claims, 55 Drawing Sheets

FIG.3

DNS Hours Meter

| Data | I/O Port1 | Access | I/O Port1 | I/O Port2 | Junction1 | Junction2 | XDistance |
|---|---|---|---|---|---|---|---|
| 98/07/02 | 1278 | 44833 | 126 | 30 | — | — | 80608 |
| 98/07/02 | 1278 | 44833 | 126 | 30 | — | — | 80608 |
| 98/07/02 | 1277 | 44833 | 126 | 30 | — | — | 80608 |
| 98/07/02 | 1276 | 44833 | 126 | 30 | — | — | 80608 |
| 98/07/02 | 1275 | 44833 | 126 | 30 | — | — | 80608 |
| 98/07/02 | 1274 | 44833 | 126 | 30 | — | — | 80608 |
| 98/07/02 | 1273 | 44833 | 126 | 30 | — | — | 80608 |
| 98/07/02 | 1272 | 44833 | 126 | 30 | — | — | 80608 |

Line(L) 1

[ Close ]  [ Revise ]  [ Help ]

DriveHoursMeter

| | Operation | Drum1 | Drum2 | Drum3 | TapeRun |
|---|---|---|---|---|---|
| 1 | drive not connected 2428 | 138 | 10 138 | | |
| 2 | drive not connected | | | | |
| 3 | drive not connected | | | 74 | |
| 4 | drive not connected 2423 | 246 | 10 246 | | |
| 5 | drive not connected | | | 151 | |
| 6 | drive not connected | | | | |
| 7 | drive not connected | | | | |
| 8 | drive not connected | | | | |

Revise    Help

ViewLog

Log(L)

```
98/07/24-17:26:46 [0001001] (INF) line=02,cmd=015101018502,dev=00b000,code=0202,mode=11
98/07/24-17:26:48 [0001001] (INF) line=02,cmd=015101018502,dev=00b000,code=0202,mode=12
98/07/24-17:28:30 [0001001] (INF) line=01,cmd=1d0001000000,dev=00a020,code=8006,mode=11
98/07/24-17:28:31 [0001001] (INF) line=01,cmd=1d0001000000,dev=00a020,code=8006,mode=12
98/07/24-17:28:49 [0001001] (INF) line=01,cmd=1d0001000000,dev=00a020,code=8006,mode=11
98/07/24-17:28:49 [0001001] (INF) line=01,cmd=1d0001000000,dev=00a020,code=8006,mode=12
98/07/24-17:38:49 [0001001] (INF) line=02,cmd=018101012105,dev=00a020,code=0086,mode=01
98/07/24-17:56:49 [0001841] (INF) line=02,cmd=1d0001000000,dev=00a020,code=4006,mode=11
98/07/24-17:58:03 [0001841] (INF) line=02,cmd=1d0001000000,dev=00a020,code=4006,mode=12
98/07/24-17:58:07 [0001841] (INF) line=02,cmd=1d0001000000,dev=00a100,code=0111,mode=11
98/07/24-18:29:02 [0001841] (INF) line=02,cmd=1d0001000000,dev=00a100,code=0111,mode=12
98/07/24-18:29:06 [0001841] (INF) line=02,cmd=1d0001000000,dev=00a100,code=0111,mode=12
98/07/24-18:48:28 [0001841] (INF) line=01,cmd=1c0401210600,dev=00a210,code=0273,mode=01
```

| SystemInformation | | |
|---|---|---|
| No. | File | Comment |
| 1 | 99/06/30-01 | Test |
| 2 | 98/06/23-01 | aaaaaa |
| 3 | 98/06/19-06 | test |
| 4 | 98/06/19-05 | |
| 5 | 98/06/19-04 | hehe |
| 6 | 98/06/19-03 | test |
| 7 | 98/06/19-02 | test |
| 8 | 98/06/19-01 | |
| 9 | 98/06/18-09 | kagawa |
| 10 | 98/06/18-08 | kagawa |
| 11 | 98/06/18-07 | kagawa |
| 12 | 98/06/18-06 | kagawa |

Get | Open | Delete | Save | Close | Help

LIBRARY DEVICE AND LOGICAL NUMBER ALLOCATING METHOD THEREFOR

This is a divisional of application Ser. No. 09/378,994 filed Aug. 23, 1999.

BACKGROUND OF THE INVENTION

1. Field of the Invention

This invention relates to a library device, that is able to remote-actuate a recording/reproducing apparatus, an operating mode setting method therefor, a recording medium processing method and a logical number allocation method.

2. Description of the Related Art

There has so far been known a system for housing a plurality of recording mediums, such as cassette tapes or disc-shaped recording mediums, that can be mounted on or dismantled from a recording/reproducing apparatus, and that permits various information to be recorded on or reproduced from the recording medium housed therein. This system, termed a library system or an auto-changer system, is herein termed a library system.

The library system includes a cassette console, made up of plural shelves for housing the above-mentioned recording mediums, a driving console, inclusive of a recording/reproducing device for recording or reproducing the information for the recording mediums, a transport unit, termed an elevator, for travelling along the consoles for selectively transporting the recording mediums between the shelves and the recording/reproducing device, a monitor for displaying the state of the consoles, the recording/reproducing device constituting the consoles or the shelves, and a control device for controlling the recording/reproducing device, elevator and so forth.

With the present library system, the recording mediums are selectively moved by the transporting device between an optional shelf and the recording/reproducing device, under control by the control device, whilst the information may be recorded or reproduced for the recording medium transported to the recording/reproducing device.

By combining these plural sorts of the consoles, a library system of an optional structure can be constructed, whilst its structure can be modified.

In identifying plural recording mediums in this library system, a database constituted by the identification information, such as the bar code information attached to the respective recording mediums (cassette ID) or the shelf or bin numbers in each console, is stored in the control device to supervise the recording mediums in the recording/reproducing device or the recording medium in the bin, and the contents controlled by the system are displayed on a monitor.

Meanwhile, in this library system, logical number are allocated at the outset to the respective consoles or bins based on the respective identification information to perform overall control. If the allocated identification information is the physical number, the logical numbers are allocated to the physical numbers in a one-to-one correspondence for control.

If, with the allocated logical numbers, one or more consoles is added, the logical numbers need to be modified.

For example, it is assumed that the bin numbers of the respective consoles are allocated as shown in FIG. 1, and the logical numbers for a bin in the console number "3" are allocated from "3200" to "3299", as shown in FIG. 3. If a cassette console is added next to the console number "2" in FIG. 1, and the console number "3" is allocated to the extended console by way of console extension, as shown in FIG. 2, it is necessary to change the console having the logical number "3" of FIG. 1 to a console of "4" and to change the inner bin number for re-allocation from "3300".

In the control device, the recording/reproducing device or the recording medium is controlled based on the logical numbers, there is raised a problem controlling totally different consoles if the logical number is changed.

For avoiding this problem, it may be contemplated to initialize the totality of the logical numbers to allocate a new logical number. However, if such processing is to be made, it is necessary to discharge the recording mediums stored in the respective consoles once to re-allocate the logical numbers, otherwise the library system in its entirety is likely to fall into disorder, with the logical numbers not corresponding to the cassette IDS.

If the database, controlled as described above, is accessible from an external terminal via a telephone network or other networks connected to the control device, control of the library system that can be made on the control device can be performed in its entirety by the external device. Thus, if a third party controls the recording/reproducing device, using the external device for mischief or malignant intention, there is a risk that the operation of the recording/reproducing device be halted to produce accidents or malfunctions.

Also, the conventional external device cannot confirm the current operation or monitor the current state of the control device, even although it can Access the files, such as log files, via the control device, however, it cannot confirm the current operation or monitor the current state of the control device.

SUMMARY OF THE INVENTION

It is therefore an object of the present invention to provide a library device, that is able to remote-actuate a recording/reproducing apparatus, an operating mode setting method therefor, a recording medium processing method and a logical number allocation method, in which, if the library system is extended by console addition, the extended library system can be controlled by simple system modification, instead of significant system modification.

It is another object of the present invention to provide a library device, that is able to remote-actuate a recording/reproducing apparatus, an operating mode setting method therefor, a recording medium processing method and a logical number allocation method, in which remote-controlled accessing can be immediately detected to prevent unauthorized operation by a third party.

In one aspect, the present invention provides a library device including recording/reproducing means for recording or reproducing the information using a removable recording medium, a plurality of housing means that is able to accommodate the recording medium therein, transporting means for transporting the recording medium between an optional housing unit in the housing means and the recording/reproducing means, and control means for controlling the transporting means and/or the recording/reproducing means. The control means selects an operating mode of setting a control operation of permitting external terminal means to perform the same control as that performed by the control means or an operating mode of permitting the external terminal means to perform control limited with respect to the control operation of the control means, when the transporting means and/or the recording/reproducing means is controlled by the external terminal means. The transporting means and/or the recording/reproducing means is controlled by the external terminal means based on the operational mode selected by the control means.

In another aspect, the present invention provides a method for setting an operating mode in a library device including recording/reproducing means for recording or reproducing the information using a removable recording medium, a plurality of housing means that is able to accommodate the recording medium therein, transporting means for transporting the recording medium between an optional housing unit in the housing means and the recording/reproducing means, and control means for controlling the transporting means and/or the recording/reproducing means. The setting method includes a first step of registering external terminal means connected to the library device, a second step of selecting an operating mode of setting a control operation of permitting the external terminal means registered in the first step to perform the same control as that performed by the control means or an operating mode of permitting the external terminal means to perform control limited with respect to the control operation of the control means; and a third step of controlling the transporting means and/or the recording/reproducing means by the external terminal means based on the operating mode selected in the second step.

In another aspect, the present invention provides a library device including recording/reproducing means for recording or reproducing the information using a removable recording medium, a plurality of housing means that is able to accommodate the recording medium therein, transporting means for transporting the recording medium between an optional housing unit in the housing means and the recording/reproducing means, control means for controlling the transporting means and/or the recording/reproducing means and display means for displaying control contents of the control means. The control means causes the retrieval information for retrieving the identification information of the recording medium to be demonstrated on the display means to perform control to select the recording medium retrieved based on the retrieval information to effect the rewind operation of the recording medium.

In still another aspect, the present invention provides, for a library device including recording/reproducing means for recording or reproducing the information using a removable recording medium, a plurality of housing means that is able to accommodate the recording medium therein, transporting means for transporting the recording medium between an optional housing unit in the housing means and the recording/reproducing means, control means for controlling the transporting means and/or the recording/reproducing means and display means for displaying control contents of the control means, a method for processing a recording medium including a first step of demonstrating the retrieval information for retrieving the identification information of the recording medium on the display means, a second step of inputting the identification information of a desired recording medium in the retrieval information to retrieve the recording medium and a third step of demonstrating the results of retrieval on the display means to select the retrieved recording medium to effect the rewind operation of the recording medium.

In still another aspect, the present invention provides a library device including recording/reproducing means for recording or reproducing the information using a removable recording medium, a plurality of housing means that is able to accommodate the recording medium therein, transporting means for transporting the recording medium between an optional housing unit in the housing means and the recording/reproducing means, and control means for controlling the transporting means and/or the recording/reproducing means. The respective means are accommodated in a plurality of consoles, depending on the console sorts, with the consoles being combined and interconnected to permit relative positions thereof to be changed. The control means allocates logical numbers to the consoles and also allocates logical numbers to the housing units in the consoles so that the allocated logical numbers will be contiguous to the logical numbers of the housing units of the consoles prior to a possible change of the relative positions thereof.

In yet another aspect, the present invention provides a logical number allocating method in a library device including recording/reproducing means for recording or reproducing the information using a removable recording medium, a plurality of housing means that is able to accommodate the recording medium therein, transporting means for transporting the recording medium between an optional housing unit in the housing means and the recording/reproducing means, and control means for controlling the transporting means and/or the recording/reproducing means. The respective means are accommodated in a plurality of consoles, depending on the console sorts. The consoles are combined and interconnected to permit relative positions thereof to be changed. The allocating method includes a first step of demonstrating the relative positions of the consoles on display means and for demonstrating on the display means the locating positions of the respective console prior to change thereof by logical numbers affixed to the respective consoles, a second step of determining desired change positions of the consoles from the physical numbers, a third step of receiving the logical numbers of the consoles desired to be changed, as inputs, and allocating the logical numbers of the changed consoles based on the input logical numbers, and a fourth step of allocating the logical numbers to the respective housing sections in the changed consoles so that the allocated logical numbers of the housing sections will be contiguous to the logical numbers in the housing sections in the consoles prior to change.

According to the present invention, as described above, the library device includes recording/reproducing means for recording or reproducing the information using a removable recording medium, a plurality of housing means that is able to accommodate the recording medium therein, transporting means for transporting the recording medium between an optional housing unit in the housing means and the recording/reproducing means, and control means for controlling the transporting means and/or the recording/reproducing means, with the control means selecting an operating mode of setting a control operation of permitting external terminal means to perform the same control as that performed by the control means or an operating mode of permitting the external terminal means to perform control limited with respect to the control operation of the control means, when the transporting means and/or the recording/reproducing means is controlled by the external terminal means. The transporting means and/or the recording/reproducing means are controlled by the external terminal means based on the operational mode selected by the control means. Thus, any remote operated access can be immediately found to prohibit unauthorized operation by a third party.

Also, in the library device according to the present invention, there are provided recording/reproducing means for recording or reproducing the information using a removable recording medium, a plurality of housing means that is able to accommodate the recording medium therein, transporting means for transporting the recording medium between an optional housing unit in the housing means and the recording/reproducing means, control means for controlling the transporting means and/or the recording/reproducing means and display means for demonstrating control contents of the control means, in which the control means is able to perform control so that the retrieval information for retrieving the identification information of the recording medium is displayed on the display means and the retrieved recording medium is selected based on the retrieval information to effect the rewind operation of the recording medium.

Also, in the library device according to the present invention, there are provided recording/reproducing means for recording or reproducing the information using a removable recording medium, a plurality of housing means that are able to accommodate the recording medium therein, transporting means for transporting the recording medium between an optional housing unit in the housing means and the recording/reproducing means, and control means for controlling the transporting means and/or the recording/reproducing means. The respective means are accommodated in a plurality of consoles, depending on the console sorts, with the consoles being combined and interconnected to permit relative positions thereof to be changed. The control means allocates logical numbers to the consoles, while also allocating logical numbers to the housing units in the consoles so that the allocated logical numbers will be contiguous to the logical numbers of the housing units of the consoles prior to a possible change of the relative positions thereof. Therefore, even if the library system is extended by console addition, the extended library system can be controlled by simple modification of the system.

Also, in a library device according to the present invention, there are provided recording/reproducing means for recording or reproducing the information using a removable recording medium, a plurality of housing means that is able to accommodate the recording medium therein, transporting means for transporting the recording medium between an optional housing unit in the housing means and the recording/reproducing means, and control means for controlling the transporting means and/or the recording/reproducing means, in which the control means selects an operating mode of setting a control operation of permitting external terminal means to perform the same control as that performed by the control means or an operating mode of permitting the external terminal means to perform control limited with respect to the control operation of the control means, when the transporting means and/or the recording/reproducing means is controlled by the external terminal means. The transporting means and/or the recording/reproducing means are controlled by the external terminal means based on the operational mode selected by the control means.

The method for setting an operating mode for a library device including recording/reproducing means for recording or reproducing the information using a removable recording medium, a plurality of housing means that is able to accommodate the recording medium therein, transporting means for transporting the recording medium between an optional housing unit in the housing means and the recording/reproducing means, and control means for controlling the transporting means and/or the recording/reproducing means, according to the present invention, includes a first step of registering external terminal means connected to the library device, a second step of selecting an operating mode of setting a control operation of permitting the external terminal means registered in the first step to perform the same control as that performed by the control means or an operating mode of permitting the external terminal means to perform control limited with respect to the control operation of the control means, and a third step of controlling the transporting means and/or the recording/reproducing means by the external terminal means based on the operating mode selected in the second step. Therefore, a remote controlled access can readily be detected to prevent an unauthorized action by a third party.

Also, the library device according to the present invention includes recording/reproducing means for recording or reproducing the information using a removable recording medium, a plurality of housing means that is able to accommodate the recording medium therein, transporting means for transporting the recording medium between an optional housing unit in the housing means and the recording/reproducing means, control means for controlling the transporting means and/or the recording/reproducing means and display means for displaying control contents of the control means, with the control means causing the retrieval information for retrieving the identification information of the recording medium to be demonstrated on the display means to perform control to select the recording medium retrieved based on the retrieval information to effect the rewind operation of the recording medium.

In addition, the library device according to the present invention includes recording/reproducing means for recording or reproducing the information using a removable recording medium, a plurality of housing means that are able to accommodate the recording medium therein, transporting means for transporting the recording medium between an optional housing unit in the housing means and the recording/reproducing means, and control means for controlling the transporting means and/or the recording/reproducing means, with the respective means being accommodated in a plurality of consoles, depending on the console sorts. The consoles are combined and interconnected to permit relative positions thereof to be changed. The control means allocates logical numbers to the consoles and also allocates logical numbers to the housing units in the consoles so that the allocated logical numbers will be contiguous to the logical numbers of the housing units of the consoles prior to a possible change of the relative positions thereof. Thus, if the system is extended due to console addition, the extended library system can be controlled without the necessity of changing the system significantly.

BRIEF DESCRIPTION OF THE DRAWINGS

Figure 3:
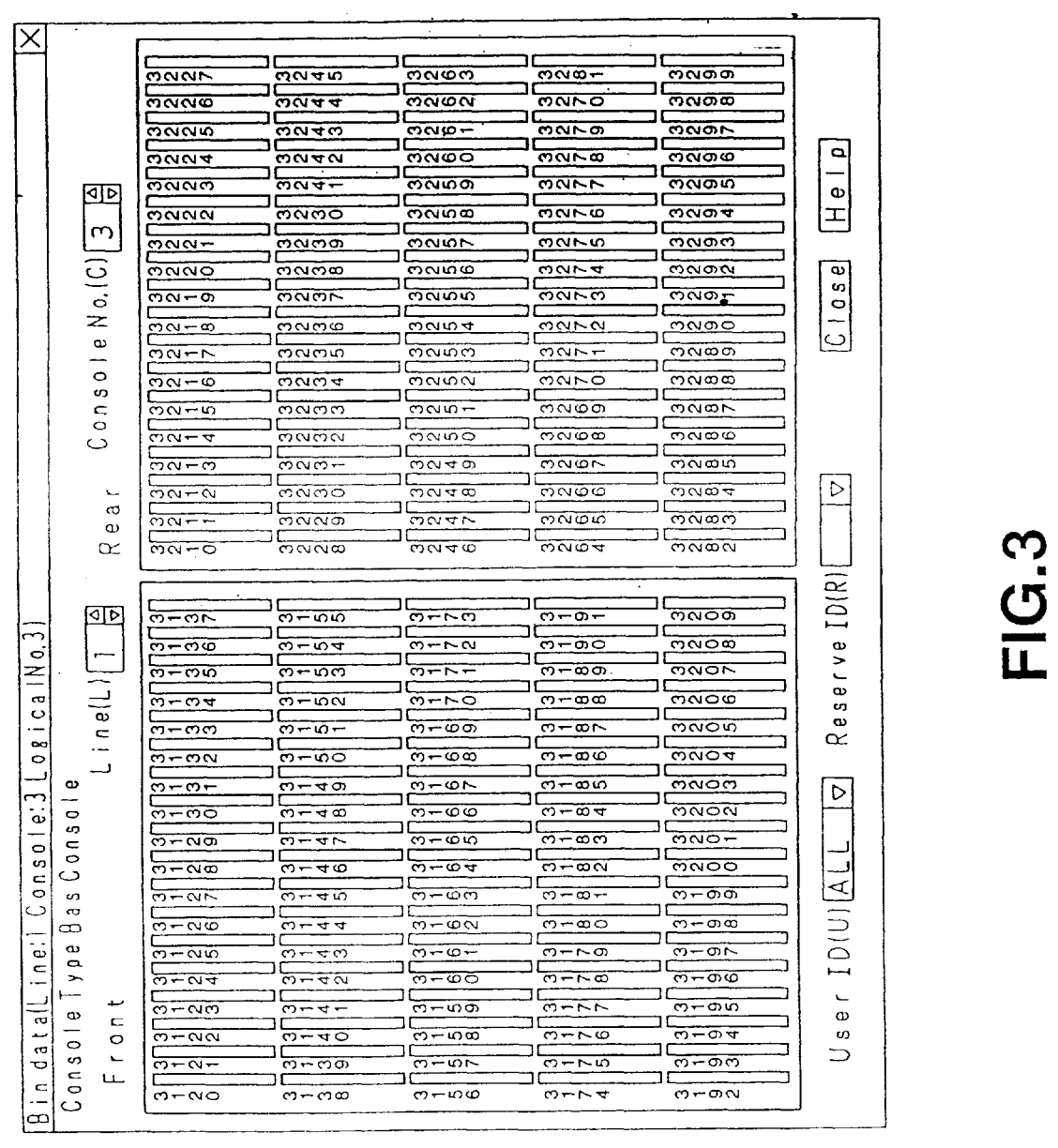

FIG. 3 shows an example of allocation of logical numbers to bins in the console number.

FIG. 52 shows a DMS hours meter window.

FIG. 53 shows a drive hours meter window.

FIG. 54 shows a view log window.

FIG. 57 shows a system information window.

DESCRIPTION OF THE PREFERRED EMBODIMENTS

Figure 1:
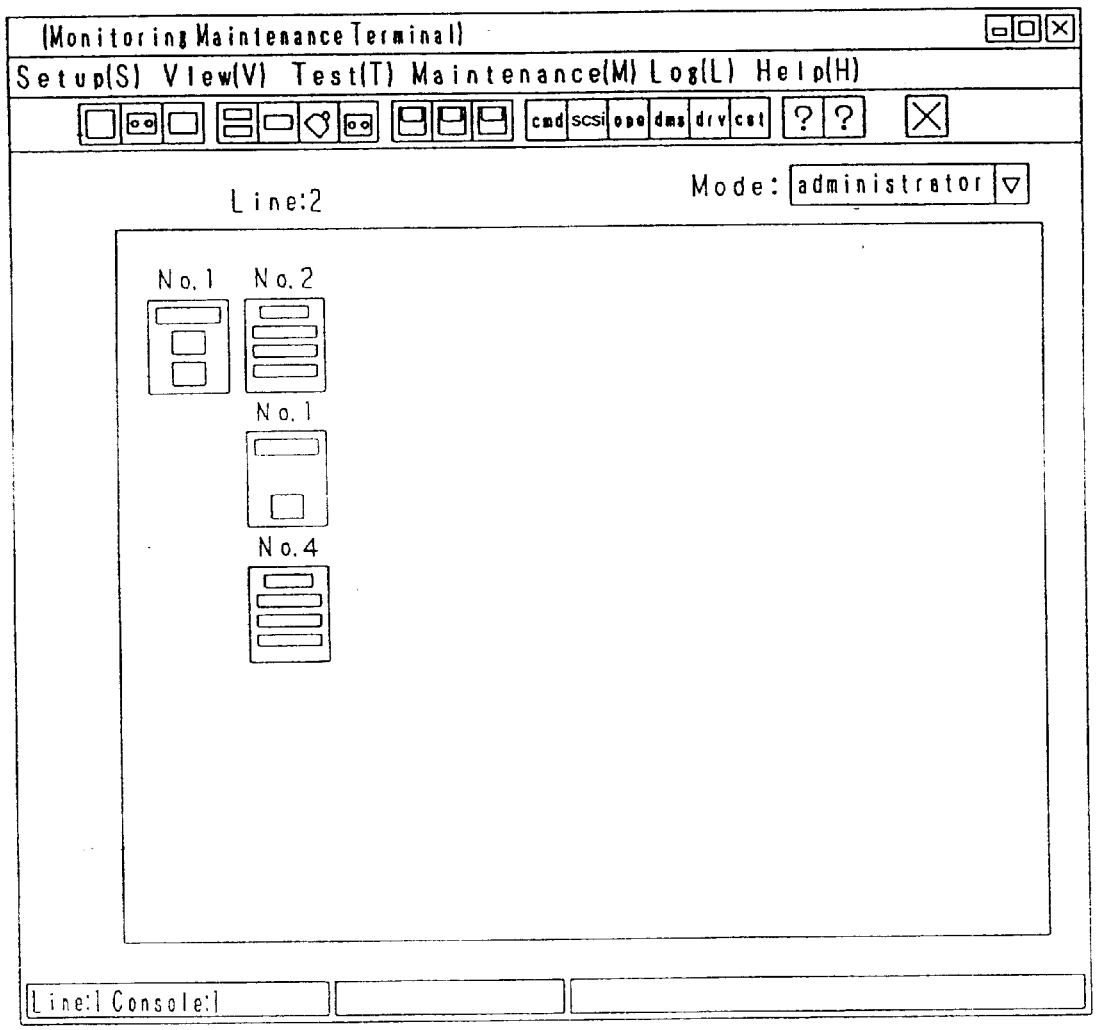
FIG. 1 shows an illustrative structure of a cassette library
Figure 2:
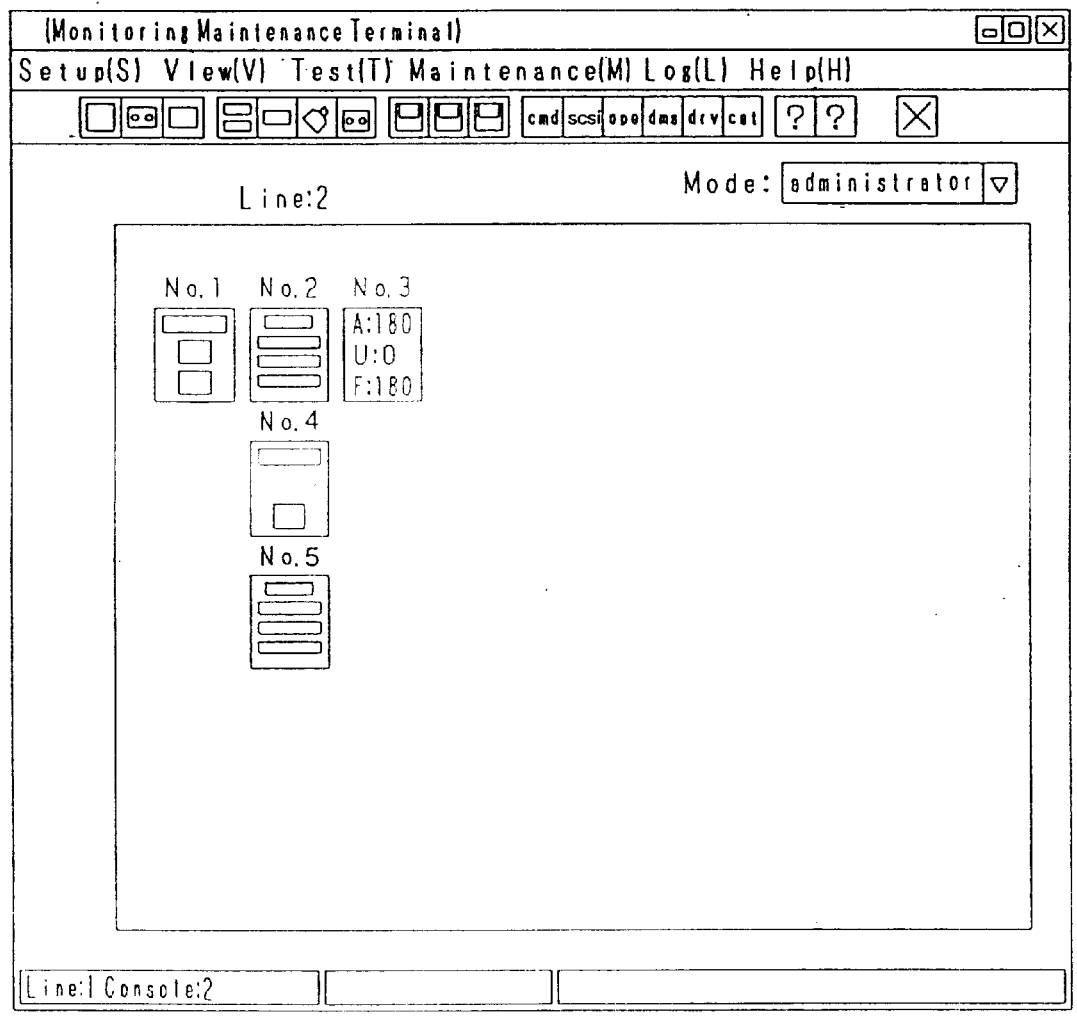
FIG. 2 shows an example of allocation of bin numbers for each console in case of console extension.

Referring to the drawings, preferred embodiments of the present invention will be explained in detail.

1. Basic Structure of Cassette Library System

Figure 4:
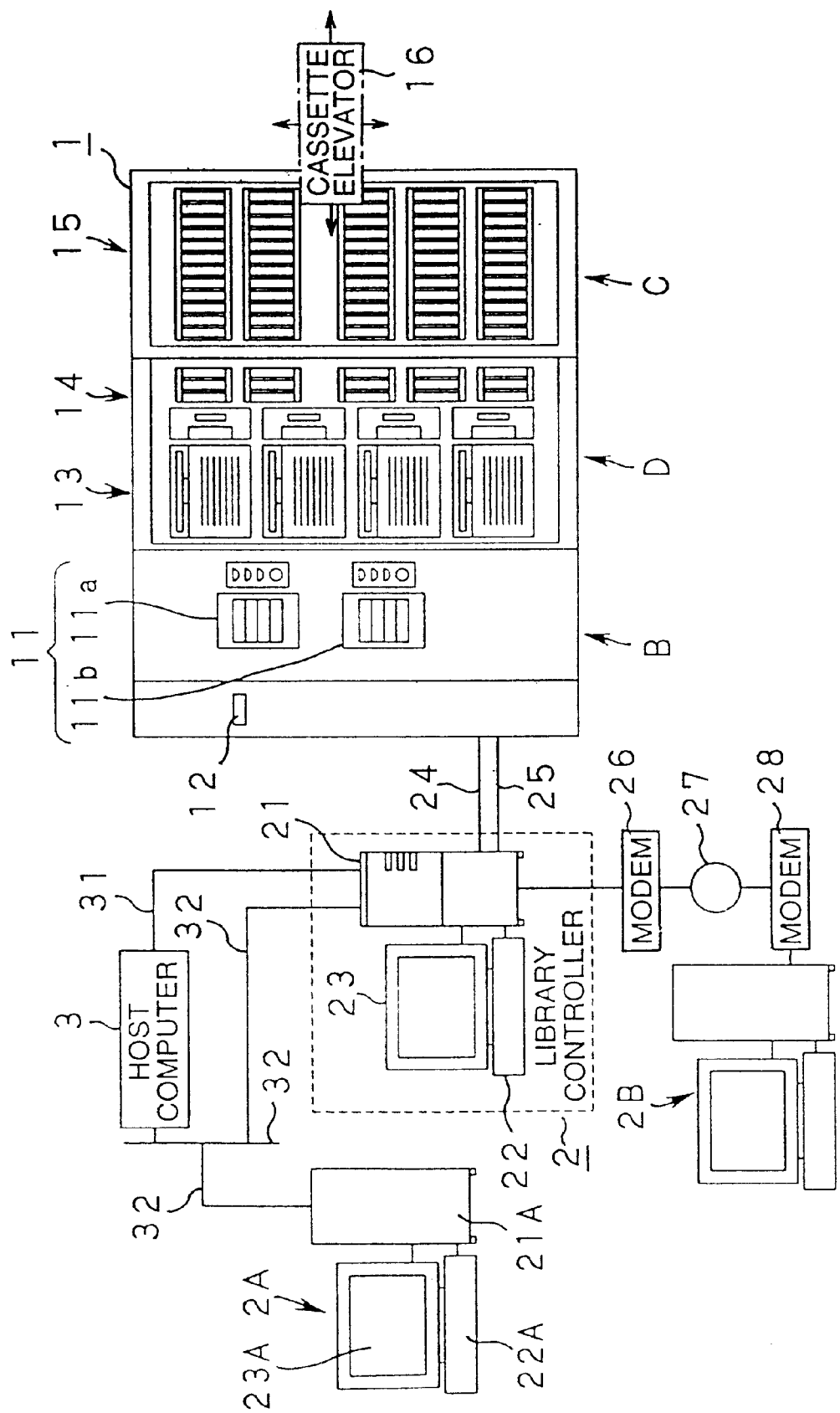
FIG. 4 shows the structure of a cassette library system embodying the present invention.
Figure 5:
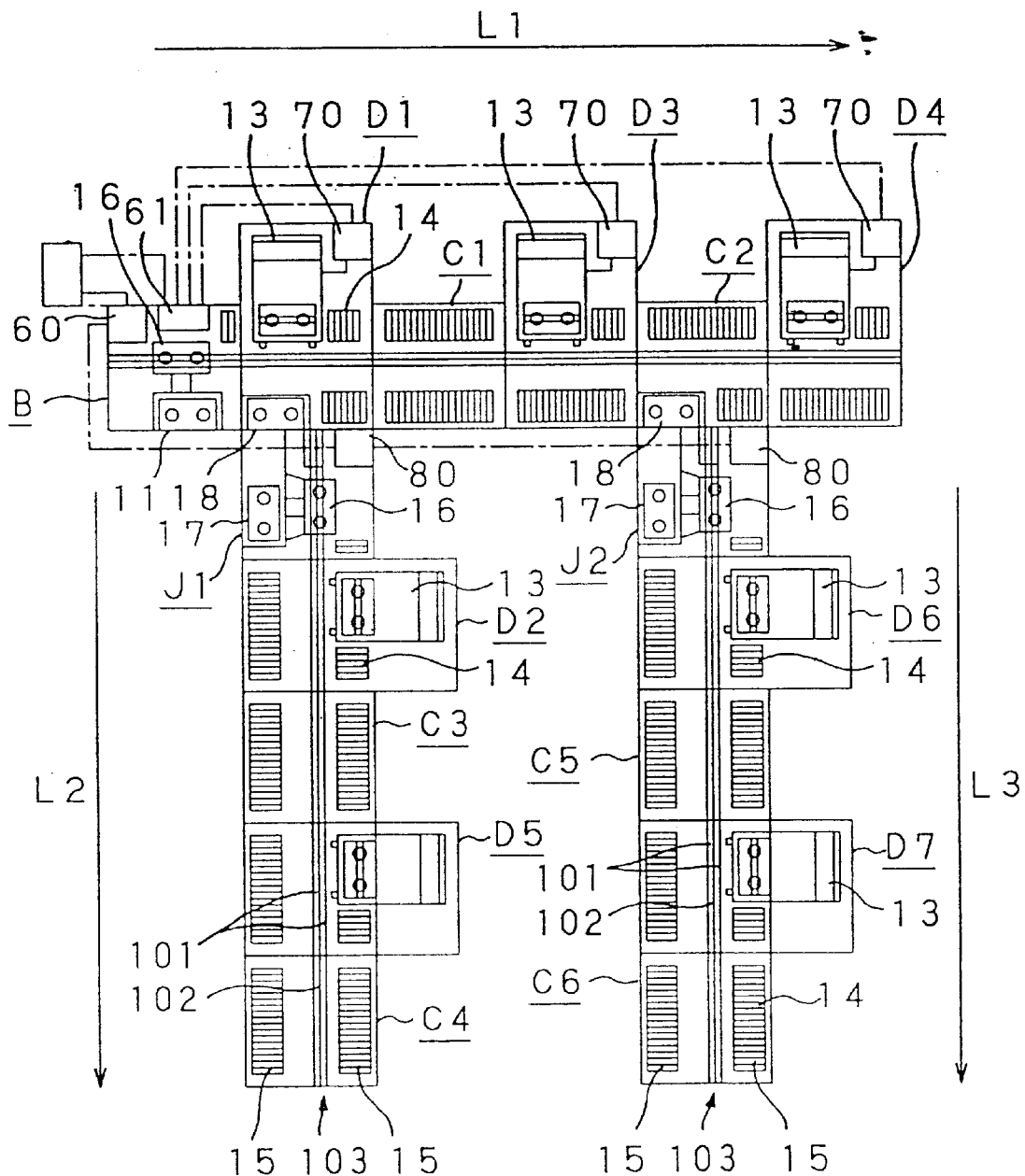
FIG. 5 shows an illustrative structure of a cassette library of the cassette library system.

FIGS. 4 and 5 show a schematic structure of a library system according to an embodiment of the present invention. FIGS. 4 and 5 show schematics of the basic structure of the library system, and the entire structure of the library system, as seen directly from above, respectively.

Referring to FIG. 4, the cassette library system includes a cassette library 1, housing plural video tapes, termed cassette tapes, as recording mediums enclosed in cassettes, and which is adapted to record/reproduce the information using the housed optional cassette tapes, and a library controller 2 for controlling the cassette library 1.

The cassette library 1 includes four consoles, namely a basic console B, a driving console D, a cassette console C and a junction console J, and a cassette elevator 16 adapted to transport the cassettes within the cassette library 1. Each console has a rectangular parallelopipedic shape similar to that of a container. The consoles are selectively interconnected so that the respective positions can be changed. The cassette library 1 can be constructed using part or all of these four sorts of the consoles.

The library controller 2 includes a main controller body unit 21, as a device for controlling the entire cassette library 1, an input device 22 for inputting the information or commands necessary for controlling the main controller body unit 21, such as a mouse, or a keyboard, and a display device 23 connected to the main controller body unit 21 and which is provided with a viewing screen for displaying the information pertinent to control. The main controller body unit 21 is connected to the cassette library 1 by, for example, transmission paths 24, 25 of the RS-232C standard. The main controller body unit 21 can also be connected to a host computer 3, as a client exploiting the cassette library 1, by a transmission path 31 of the SCSI (Small computer System Interface). The main controller body unit 21 can also be connected to the host computer 3 by, for example, a communication network 32 of a prescribed standard, such as Ethernet.

FIG. 4 shows the most fundamental structure of the cassette library 1. In the cassette library 1, the driving console has its lateral side connected to a lateral side of the basic console B, while the cassette console C has its lateral side connected to the opposite lateral surface of the driving console D.

FIG. 5 shows an illustrative overall structure of the cassette library 1 which on the whole is made up of three console strings L1, L2 and L3. The console string L1, extending from a lateral surface of the basic console B to outside, is made up of driving consoles D1, D3 and D4 and cassette consoles C1, C2, in alternate configuration. The console string L2, extending towards the front side of the driving console D1, is made up of driving consoles D2, D5 and cassette consoles C3, C4, in alternate configuration, with interposition of a junction console J1. The console string L3, extending towards the front side of the driving console D2, is made up of driving consoles D6, D7 and cassette consoles C5, Chroma key synthesis device 6, in alternate configuration, with interposition of a junction console J2. In each console string, there is provided a cassette elevator 16. The cassette tapes are exchanged between the respective console strings via a junction port 18 of each of the junction consoles J1, J2.

Referring to FIG. 4, the cassette library system includes a library controller 2A, referred to below as a first remote controller, connected to the library controller 2 over a communication network 32, and a library controller 2B, referred to below as the second remote controller, connected to the telephone network 27 over a modem 28, in order to permit remote control operations.

The first remote controller 2A is configured similarly to the library controller 2, and includes a main controller body unit 21A, an input device 22A such as mouse or keyboard, and a display device 23A connected to the main controller body unit 21A and which has a display screen for displaying the control information. The second remote controller 2B is also configured similarly.

Meanwhile, the connection of the respective consoles is not limited to that shown in FIGS. 4 and 5. For example, in a configuration interconnecting only the basic console B and the driving console D, the basic functions as the cassette library system need to be performed.

Referring to FIG. 4, the basic console B includes an input/output port 11 for taking a cassette tape from the front side and for automatically ejecting the cassette tape from inside the library to outside, and a display unit 12 on the front surface of the basic console B for displaying the various information, such as the control information, concerning the library 1. The basic console B also includes a bar code readout device, not shown, for reading out the identification information (ID) provided on the introduced cassette tape. The input/output port 11 is made up of an upper stage port unit 11a, provided on an upper tier of the basic console B, and a lower stage port unit 11b, provided on the lower tier of the basic console B. The upper stage port unit 11a and the lower stage port unit 11b, adapted for introducing and ejecting cassette tapes, are each provided with plural, e.g., four, input/output ports. The upper stage port unit 11a is a port for permitting a cassette tape to be introduced into the library system. The lower stage port unit 11b can be used for ejecting the cassette tape from the library system. The display unit 12 is comprised of, for example, a liquid crystal display device. Referring to FIG. 5, the basic console B also includes a basic controller 60, connected by a transmission path 24 to the main controller body unit 21 of the library controller 2, and a main drive controller 61, connected via transmission path 25 to the main controller body unit 21, and also connected to a driving control unit 70 of the driving console D.

The driving console D includes plural, e.g., four, driving devices 13, as recording/reproducing apparatus for recording/reproducing the information for the cassette tape, and a cassette housing shelf 14 (bin) having plural housing sections for housing plural cassette tapes. Referring to FIG. 5, the driving console D includes a driving control unit 70 for controlling the driving devices 13.

The cassette console C includes a cassette housing shelf 15 (bin) having plural housing sections for housing plural cassette tapes. In the driving console D and cassette console C, to which are connected junction consoles J, the cassette housing shelves 14, 15 are partially dismounted to permit cassette tape exchange with the junction console J on connecting the junction console J.

The junction console J is used for extending the connection between consoles, and is adapted so that its one lateral surface will be connected to the front or back surface of another console. On a lateral surface of the junction console J, there is provided a junction port unit 18, having a mechanism for exchanging the cassette tapes with the other consoles connected thereto, so that the junction port unit 18 will be at a position in register with the upper stage port unit 11a of the basic console B. On the front surface of the junction console J, there is provided an input/output port unit 17, having the functions similar to those of the input/output port 11 of the basic console B, so that the input/output port unit 17 will be in register with the lower stage port unit 11b of the basic console B. The junction console J also has a basic control unit 80 for controlling the mechanism for cassette tape exchange in the junction port unit 18 and for controlling cassette elevator 16 in an extended console string. The basic control unit 80 is electrically connected to the basic controller 60 of the basic console B. The basic structure of the junction console J is otherwise the same as the basic console B.

In the center area within the inside of each of the basic console B, driving console D, cassette console C and the junction console J, there is provided a transporting area 103 as a space within which the cassette elevator 16 is moved. Within the transporting area 103 is mounted a guide rail 101, as a transport path for the cassette elevator 16, for extending along the transporting direction of the cassette elevator 16. On the lateral side of the guide rail 101 is provided a current conducting rail 102 for supplying the power to the cassette elevator 16.

The cassette elevator 16 is adapted for being fed with the electric power from the current conducting rail 102 in the transporting area 103 and for being thereby moved in the horizontal direction along the guide rail 101 as it holds the cassette tape. The cassette elevator 16 also is adapted for being moved by a vertical movement mechanism, not shown, in each console in the vertical direction (in the up-and-down direction) as it holds the cassette tape. The cassette elevator 16 also has a mechanism for delivery of a cassette tape to each console, although such mechanism is not shown. The cassette elevator 16 also is adapted for transporting and delivering the cassette tape taken from the input/output port 11 of the basic console B to the cassette housing shelf 15 of the cassette console C.

Figure 6:
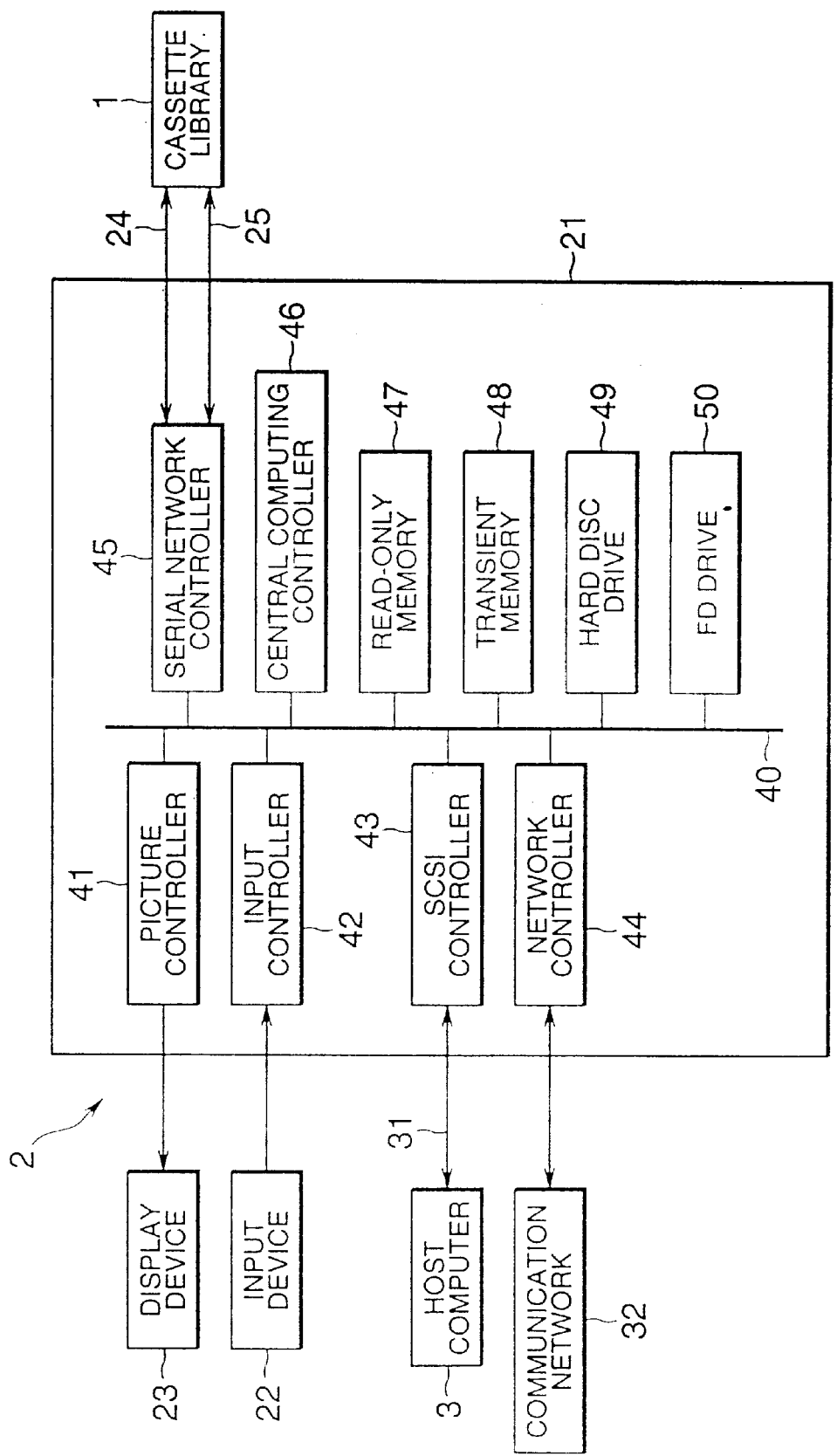
FIG. 6 is a block diagram showing a circuit structure if a library controller in the cassette library system.

FIG. 6 is a block diagram showing the circuit structure of the library controller 2. The library controller 2 includes, in the main controller body unit 21, a picture control unit 41 for controlling the display device 23, an input control unit 42 for controlling the input device 22, an SCSI controller 43 for performing control for connecting the host computer 3 to the library controller 2 under the SCSI standard over the transmission path 31, and a network controller 44 for performing control for interconnecting the communication network 32 and the library controller 2. The block elements in the main controller body unit 21 are interconnected over an internal bus 40.

The library controller 2 also includes a serial network controller 45 for performing control to interconnect the cassette library 1 and the library controller 2 over transmission paths 24, 25 of the RS-232C standard, and a central computing control unit 46, which is inclusive of a central processing unit (CPU), and which is adapted for performing overall control of the library controller 2 and substantial control of the cassette library 1. The library controller 2 also includes a read-only memory 47 having stored therein a basic program necessary for performing basic control of the library controller 2 and a transient memory 48, as a working area used by the central computing control unit 46 executing a program. The library controller 2 also includes a hard disc drive 49 adapted for driving an enclosed hard disc adapted for storage of the system information of the cassette library system, and a floppy disc drive (FD drive) 50 for recording/reproducing the information for a floppy disc. The program for controlling the cassette library 1 is stored in a hard disc driven by the hard disc drive 49. The central computing control unit 46 executes this program to realize the functions of controlling the cassette library 1.

The library controller 2 is adapted to display a picture realizing an interface by the GUI (Graphic User Interface) designed to permit the user to act on the picture using an input device 22 as a control picture on the display device 23.

Figure 7:
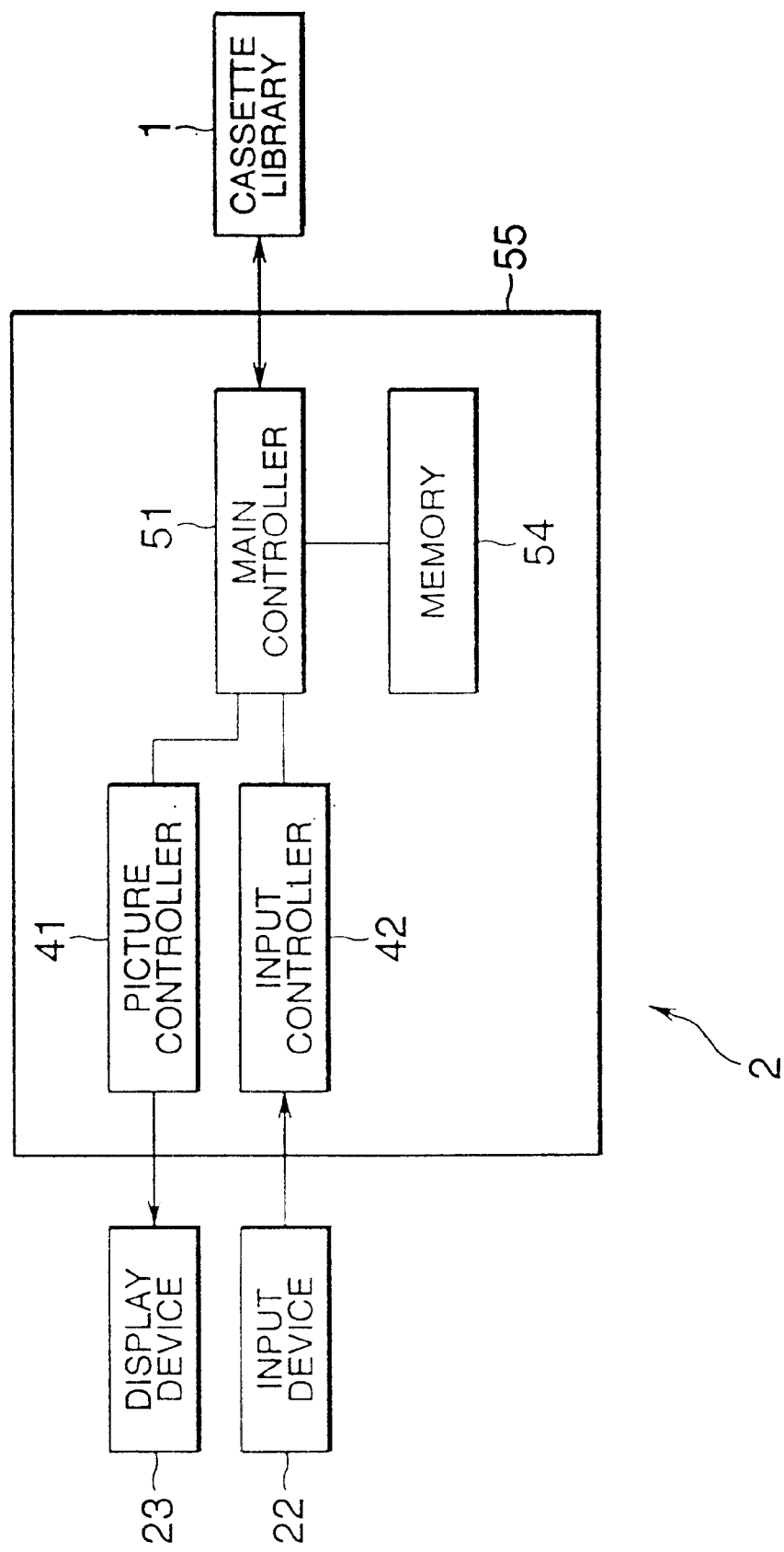
FIG. 7 is a block diagram showing essential portions of the functional structure of the library controller.

FIG. 7 is a block diagram showing essential portions of the functional structure of the library controller 2. The library controller 2 includes a control functional unit 55 for controlling the input device 22, display device 23 and the cassette library 1. The control functional unit 55 includes a main controller 51 for performing overall control of the library controller 2 and substantial control in the cassette library 1, a picture controller 41 connected to the main controller 51 for controlling the display device 23, an input controller 42 connected to the main controller 51 for controlling the input device 22 and a memory 54 for storing the various information such as a database for the system information of the cassette library system.

Figure 8:
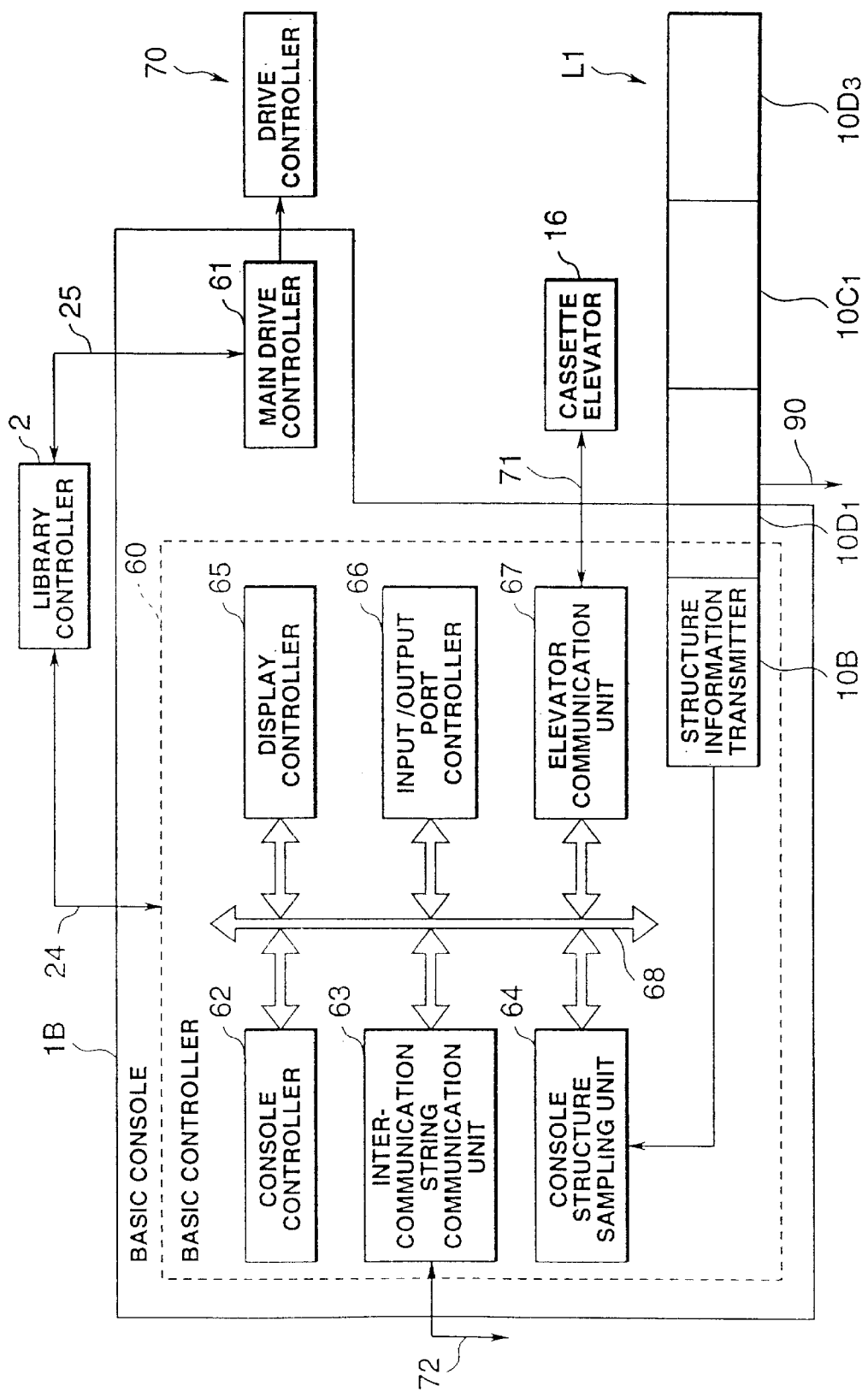
FIG. 8 is a block diagram showing a circuit structure of a basic console of the cassette library.

FIG. 8 is a block diagram showing the circuit structure of the basic console B. The basic console B includes a basic controller 60 for controlling the basic console B itself and for performing transport control of the cassette elevator 16 and a main driving controller 61 connected by a transmission path 25 to the main controller body unit 21 of the library controller 2 and to the driving control unit 70 of the driving console D and which causes the driving control unit 70 to control the data driving device 13. The main driving controller 61 is comprised of, for example, a micro-computer.

The basic controller 60 includes a console controller 62 for performing control of each constituent block of the basic controller 60 and transport control of the cassette elevator 16, and an inter-console-string communication unit 63 for having communication between the extended console strings L2, L3 over a communication line 72. The basic controller 60 also includes a console composition sampling unit 64 for sampling the information on the structure of each console constituting the basic console string L1 having the basic console B and a display controller 65 for performing display control of the display unit 12 (FIG. 4) provided on the front surface of the basic console B. The basic controller 60 also includes an input/output port controller 66 for controlling the cassette tape delivery mechanism in the input/output port 11 (FIG. 4) provided on the front surface of the basic console B, and a cassette elevator communication unit 67 for having control communication by IR rays with the cassette elevator 16. The block elements of the basic controller 60 are interconnected over an internal bus 68. The console controller 62 is comprised of, for example, a microcomputer.

The console composition sampling unit 64 is adapted for sampling the information on the structure of each console from constituent information issuing units 10B, $10D_1$, $10C_1$, $10D_3$, . . . . That is, the constituent information issuing unit 10B of the basic console adds the console constituent information to the information issued by the constituent information issuing units $10D_1$, $10C_1$, . . . , to output the resulting information to the console composition sampling unit 64.

The console controller 62 is configured for issuing to the library controller 2 the information on the console composition in the basic console string L1 obtained by the console composition sampling unit 64 or the information on the console composition in another console string received via the inter-console-string communication unit 63.

Figure 9:
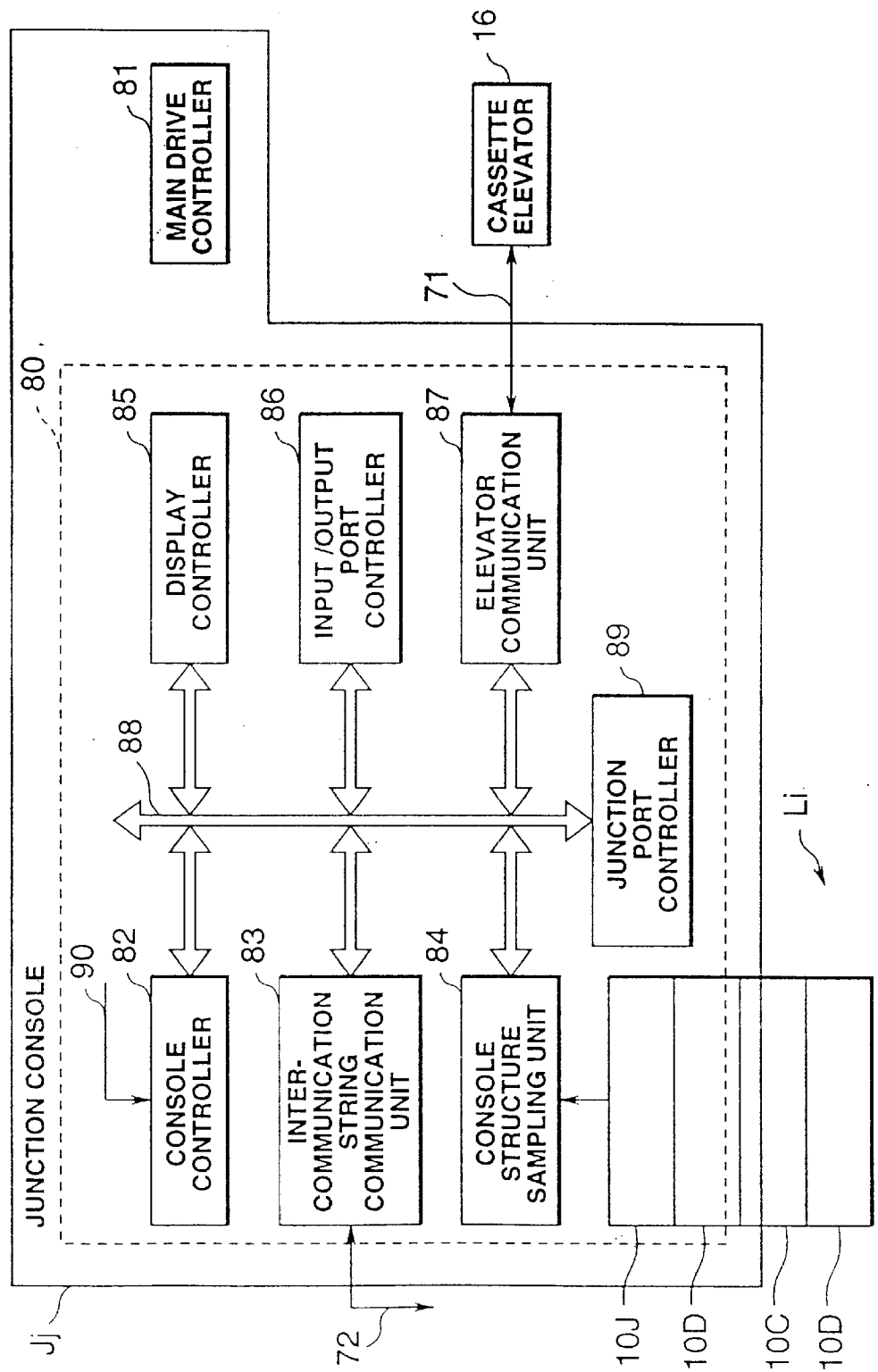
FIG. 9 is a block diagram showing a circuit structure of a junction console of the cassette library.

FIG. 9 shows a block diagram showing the circuit structure of the junction console J. The junction console J includes a basic controller 80 for controlling the junction console J itself and the transport control for the cassette elevator 16 in the extended console string Li (i≧2) and a main driving controller 81 for causing the driving control unit 70 in the extended console string L1 to control the data driving device 13. The main driving controller 81 is used for interfacing between the main driving controller 61 of the basic console B and the driving control units 70 in the plural driving consoles D in case of using a large number of driving consoles D.

The basic controller 80 includes a console controller 82, an inter-console-console composition communication unit 83, a console composition sampling unit 84, a display controller 85, an input/output port controller 86 and a cassette elevator communication unit 87. The console composition sampling unit 84 is adapted for sampling the information on the structure of each console from constituent information issuing units 10J, 10D, 10C, 10D, . . . constituting the extended console string L1. That is, the constituent information issuing unit 10J adds the console constituent information to the information issued by the constituent information issuing units 10D, 10C, . . . , to output the resulting information to the console composition sampling unit 84. The basic controller 80 also includes a junction port controller 89 for controlling the cassette tape exchange mechanism in the junction port unit 18 (FIG. 5) provided on a lateral surface of the junction console J. The block elements of the basic controller 80 are interconnected over an internal bus 88. Meanwhile, the block elements of the basic controller 80 excluding the junction port controller 89 are basically similar in operation to the respective block elements of the basic controller 60 of the basic console B.

The console controller 82 is configured for being fed with the information on the structure from another console string (console string L1 in the embodiment of FIG. 5).

The library controller 2 has the function of recognizing the structure of the cassette library 1 inclusive of the sorts and the type of interconnection of the respective consoles making up the cassette library 1 and of outputting the picture information on the recognized information. When outputting the picture information representing the structure, the library controller 2 is adapted for selectively displaying the sorts of display portions of different sizes of the respective consoles.

The library controller 2 also has the function of recognizing the states of respective portions of the cassette library 1, inclusive of the data driving device 13, housing sections and the cassette elevator 16, and of outputting at least a portion of the information representing the recognized state along with the picture information representing the structure. When outputting the picture information representing the composition or constitution, the library controller 2 is able to make selective display of plural sorts of demonstrations of the information representing the size and the status. of the demonstrated portions of the respective consoles.

The library controller 2 also is responsive to a command designating a pre-set site in the picture information representing the constitution to output the detailed information representing the state pertinent to the designated site.

2. Operation of the Cassette Library System (2-1)

When the library controller 2 is started, a control main picture by the GUI environment is displayed on the display device 23 of the library controller 2. The user performs actuations, using a mouse etc, on the displayed main picture, for doing various setting for controlling the cassette library system.

The library controller 2 is responsive to the requests from the host computer 3 to transmit to the basic console B of the cassette library 1 a command for transferring the desired cassette tape between the input/output port 11 of the basic console B, cassette housing shelves 15 of the cassette console C and the data driving device 13 of the driving console D or a command for causing the data driving device 13 of the driving console D to record/reproduce the information. The command for transferring the cassette tape using the cassette elevator 16 is transmitted over the transmission path 24 to the basic controller 60 of the basic console B. The command for causing the data driving device 13 to record/reproduce the information is transmitted over the transmission path 25 to the main driving controller 61 of the basic console B.

The basic controller 60 controls the cassette elevator 16 based on a command from the library controller 2 received via the transmission path 24. This control is performed by IR light communication via cassette elevator communication unit 67. The cassette elevator 16 executes the transporting operation, under control by the basic controller 60, for transferring and delivering the cassette tape taken from the input/output port 11 of the basic console B to the cassette housing shelf 15 of the cassette console C. In the console string, extended by the junction console J, the basic controller 80 of the junction console J receives the command from the library controller 2 from the basic controller 60 to control the cassette elevator 16 in the extended console string as in the basic controller 60.

The main driving controller 61 controls the driving control unit 70 of the driving console D, under a command from the library controller 2 received from the transmission path 25, to perform control for causing the data driving device 13 to record or reproduce the information. The driving control unit 70 causes the data driving device 13 to record or reproduce the information under control by the main driving controller 61. This records/reproduces the information for the cassette tape.

(2-2)

Display Picture on Startup

Figure 10:
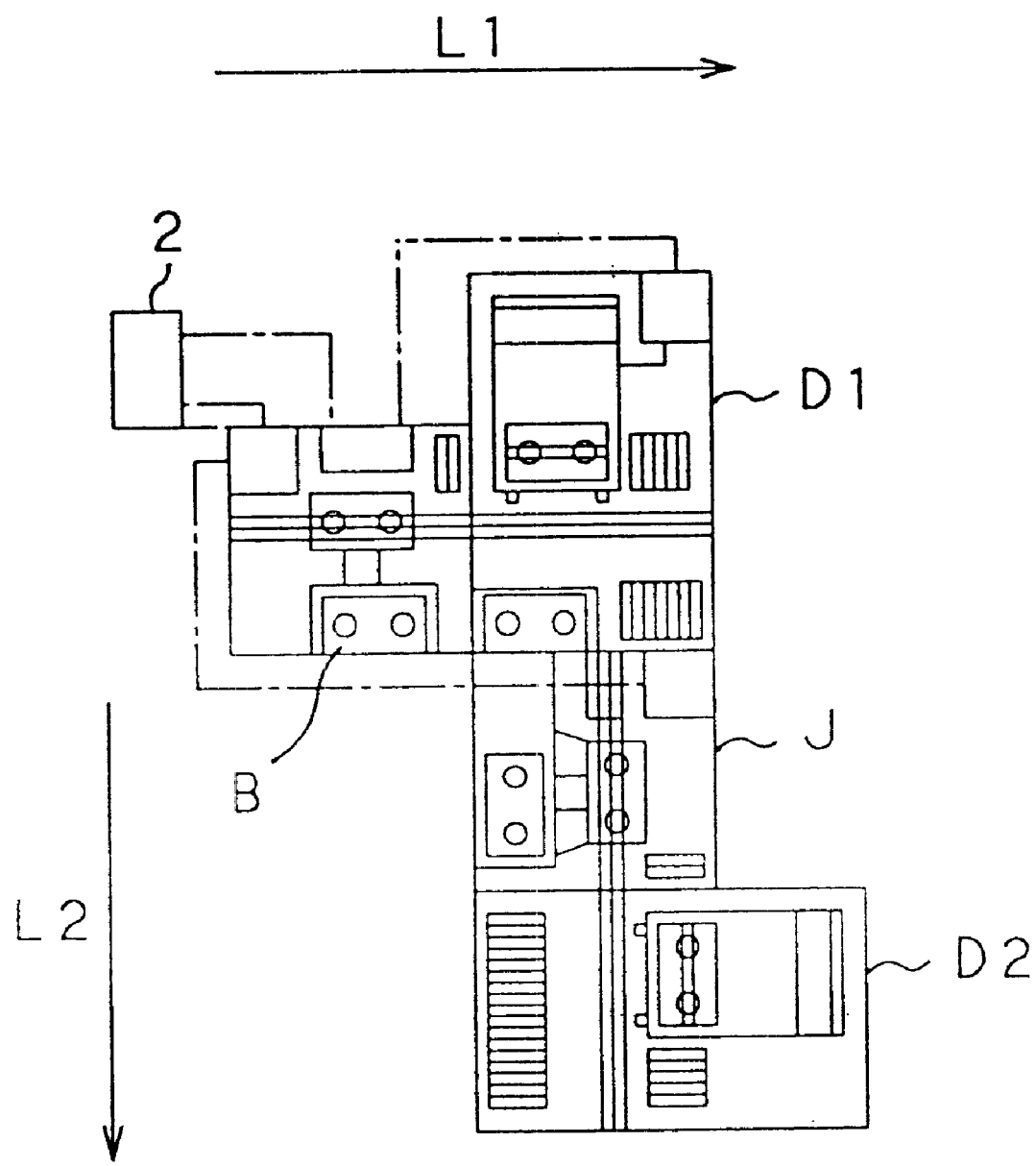
FIG. 10 shows an exemplary structure of the cassette library.

In the following explanation, it is assumed that the cassette library 1 is configured as shown in FIG. 10. That is, the cassette library 1 includes a console string L1, comprised of an interconnection of the basic console B and the driving console D1, and an interconnection of the junction console J and the driving console D2, with the driving console D1 and the junction console J being interconnected so that the console strings L1, L2 will cross each other.

Figure 11:
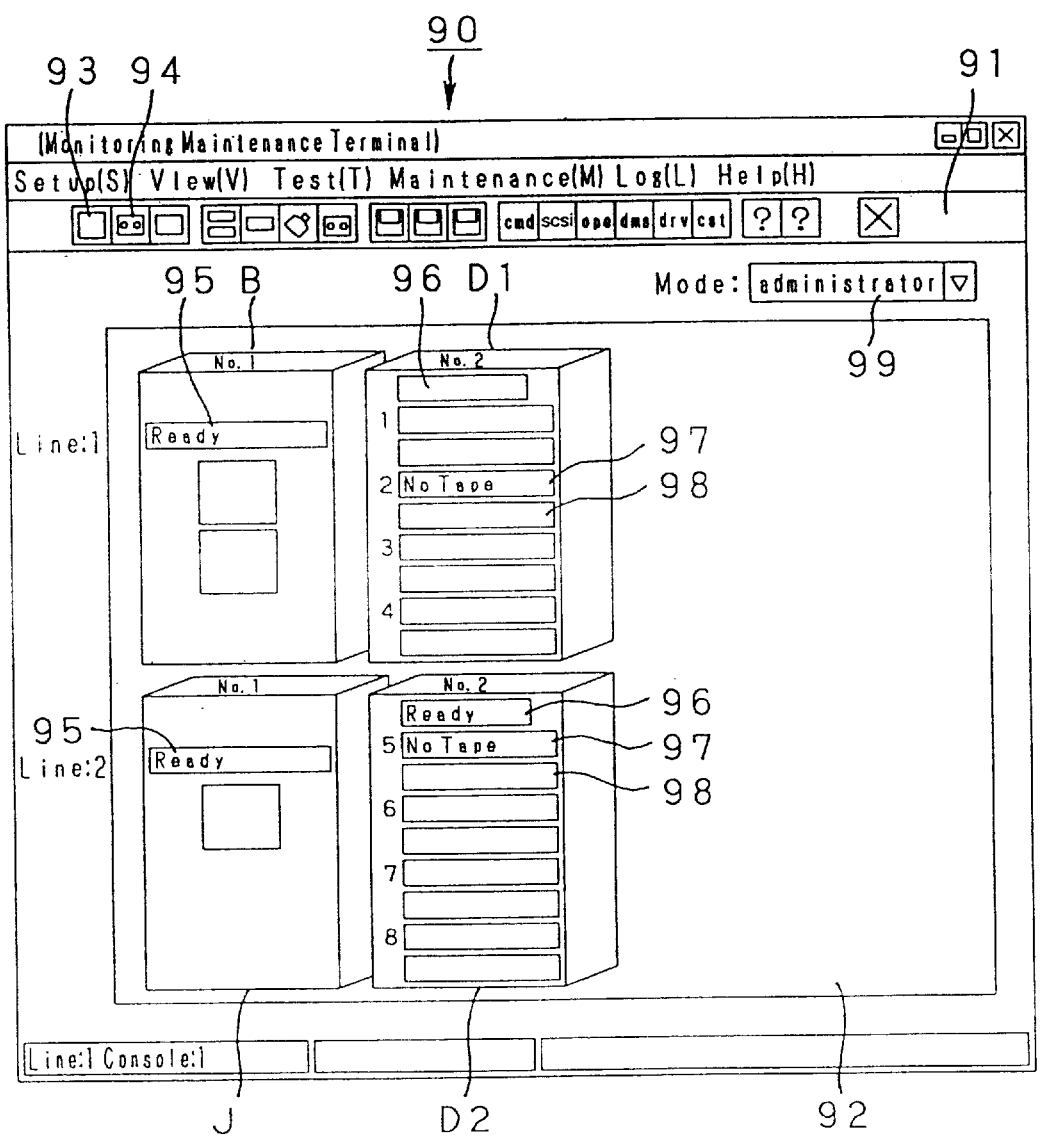
FIG. 11 shows a main picture of a display device of the library controller.

On startup of the library controller 2, a main picture for control 90 is displayed on the display device 23, as shown in FIG. 11. That is, by displaying the picture information simulating the actual console arrangement as the picture information, the user is able to comprehend the constitution of the cassette library 1 or the states of respective portions within the cassette library 1 easily and intuitively.

This main picture for control 90 is comprised of a menu bar region 91 for displaying an icon menu for instructing the control of the cassette library system, and a console composition region 92 showing the basic structure of the cassette library 1. This menu bar region 91 has a bin data button 93 and a cassette data button 94. If the bin data button 93 is clicked, a bin window, which will be explained subsequently in detail, is displayed. If the cassette data button 94 is clicked, a cassette data window is displayed.

On startup, the library controller 2 acquires the information on the current console composition, such as the type of the current console or the state of console interconnection, from the cassette library 1, to display the structure of each console in the console composition region 92 of the main picture for control 90 based on the acquired information.

The main picture for control 90 indicates the structure of the cassette library system 1 on the console string basis. The line 1 [Line:1] and the line 2 [Line:2] denote the console strings L1 and L2, respectively.

The GUI (Graphic User Interface) is arranged on a horizontal line indicating [Line:1] and bears the indication [No.1.] The basic console B indicates the physical console number 1 on the line 1. A status area 95 of the basic console B indicates the main operating state. For example, the status area 95 indicates the operating state of the entire cassette library system and, if there are plural console strings, it indicates the operating state of the cassette elevator 16 in the console string L1. Specifically, the [ready] and [not ready] indicate the operatable state and the non-operatable states of the cassette elevator 16, respectively.

The GUI of the driving console D1 is arranged on a horizontal line indicating [Line:1] and bears the indication [No.1]. The GUI of the driving console D1 indicates the physical console number 2 on the line 1 [Line:1]. The GUI of the driving console D1 has a status area 96, indicating its own operating state, a driving status area 97, indicating the operating state of each internal data driving device 13 and a cassette area 98 indicating the contents of a cassette tape loaded in each data driving device 13. That is, the driving status area 97 and the cassette area 98 bear the indication of the number of the data retrieval units 13.

The status area 96 of the driving console D1 indicates higher priority of the states of the driving console D1. For example, [Fan 1 Stop] indicates that the first fan in the driving console D1 is not in operation.

The driving status area 97 displays a higher priority one of the statuses of the data driving device 13. For example, [Tape In], [No tape], [Write], [Read], [No Use] and [No Communication] indicate that the a cassette tape is charged into the data driving device 13, a cassette tape is not loaded in the data driving device 13, the data driving device 13 is in the writing state, the data driving device 13 is in the read-out state, the data driving device 13 is in the non-use state and that the data driving device 13 is not in communication enabling state or is in a power down state, respectively.

The cassette area 98 indicates the identification information (ID) of the cassette tape housed in the data driving device 13.

The GUI of the junction console J is arrayed on a horizontal direction line of the display of the line 2 [Line: 2] and bears the indication [No.1]. The junction console J is of the physical console number 1 on the line 2. Similarly to the driving console D, the junction console J has a status area 95. The status area 95 displays the operating state of the console string 2 or the junction console J having the higher priority.

The GUI of the driving console D2 is on the horizontal direction line of the display of the line 2 [Line: 2], and bears the indication [No.2]. Therefore, the driving console D2 is of the physical number 2 on the line 2. As in the driving console D1, the GUI of the driving console D2 has a status area 96, a driving status area 97 and a cassette area 98.

The physical console number indicates the physical position of each console in each console string and indicates the numbers 1, 2, 3, . . . affixed to each console of the row. For example, the physical console numbers 1, 2, 3, . . . are affixed to the consoles of a console string 2, beginning from the basic console B as the fundamental console. Similarly, the physical console numbers 1, 2, 3, . . . are affixed to the consoles of the console string 2 beginning from the junction console J. Therefore, there are the same physical numbers, such as [1], in a given console string and another console string.

The logical console number, which will be explained subsequently, denotes the number affixed to each console in a direction traversing the totality of the console strings. Meanwhile, the logical console numbers are affixed mainly in the order of the increasing console string number.

3. Retensioning and Movement of Cassette Tape

For supervising the cassette tapes housed in the cassette library 1, it is possible for the cassette library system to display a cassette data window indicating the information of each cassette tape. Desired cassette tapes can be retained or moved using this window.

The retensioning means temporarily re-winding the wound cassette tape. If the cassette tape is to be stored for prolonged time, the cassette tape needs to be re-wound periodically to prevent transcription of the cassette tape. If recording/reproduction is repeated, the cassette tape is wound in a disorderly state to injure the tape edge. Tape retensioning is effective to prevent this inconvenience.

Figure 12:
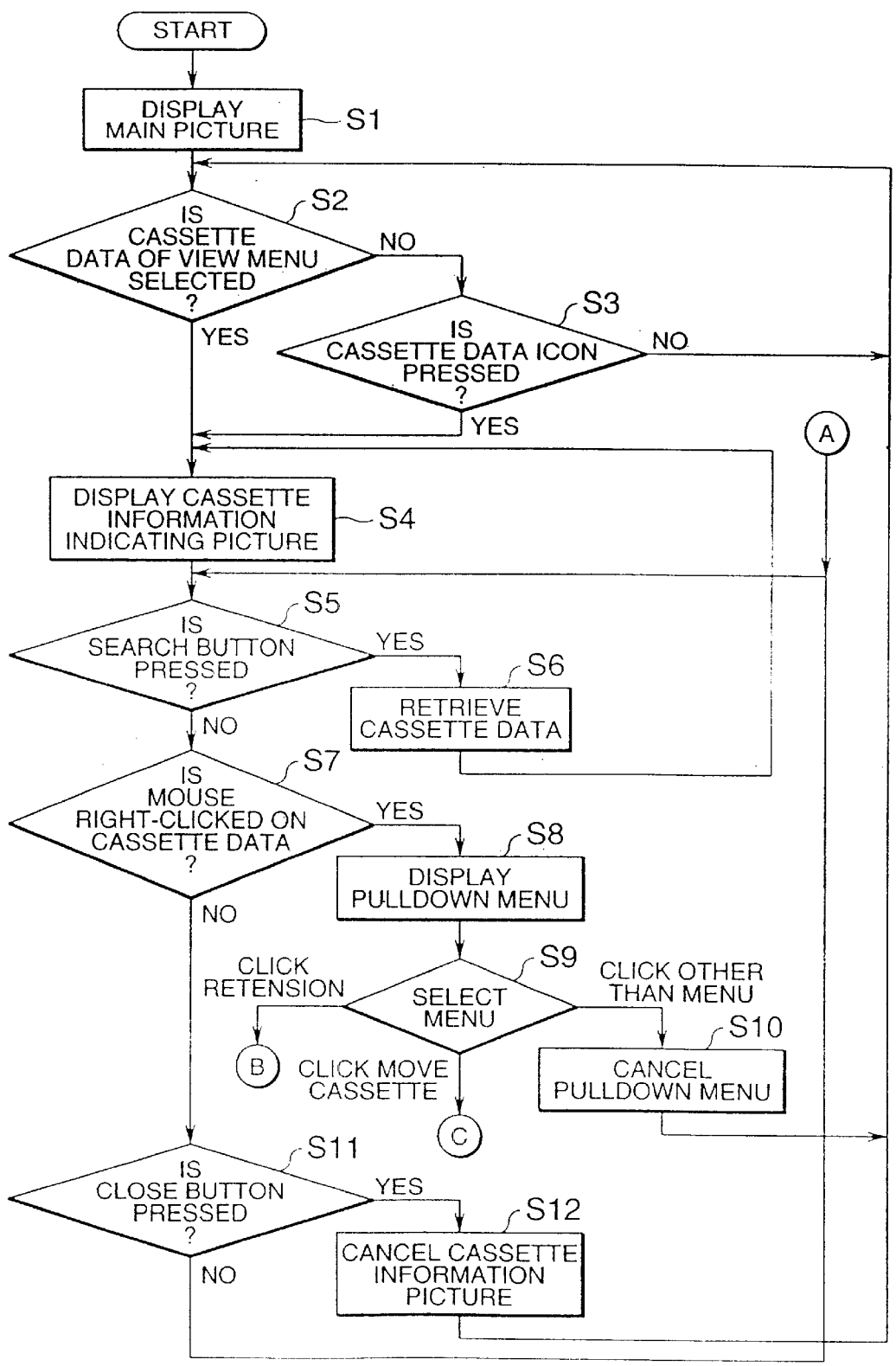
FIG. 12 is a flowchart for illustrating the operational processing of a main controller body unit of the library controller in case of retensioning or movement of a cassette tape.

The processing for retensioning and movement of the cassette tape, performed by the library controller 2, is explained in detail with reference to a flowchart of FIG. 12.

On startup, the main controller body unit 21 of the library controller 2 causes the main picture for control 90 of FIG. 11 to be displayed at step S1 on the display device 23.

At the next step S2, the main controller body unit 21 checks whether or not the item [Cassette Data] of the view menu [View(V)] in the main picture for control 90 has been selected by an input device 22, such as a mouse. Specifically, if the view menu [View(V)] in the main picture for control 90 is clicked, the main controller body unit 21 causes a pull-down menu, not shown, to be displayed on the display device 23 to check whether or not the item [Cassette Data] in the pull-down menu has been selected. If the result of check of step S2 is YES, that is if the item [Cassette Data] has been selected, the main controller body unit proceeds to step S4 and, if the result of check of step S2 is NO, that is if the item [Cassette Data] has not been selected, the main controller body unit proceeds to step S3.

At this step S3, the main controller body unit 21 checks whether or not the cassette data button 94 of the main picture for control 90 has been clicked by the mouse. If the result of decision at this step S3 is YES, that is if the cassette data button 94 has been clicked, the main controller body unit 21 proceeds to step S4 and, if the result of decision at this step S3 is NO, that is if the cassette data button 94 has not been clicked, the main controller body unit 21 reverts to step S2 to re-check whether or not the item [Cassette Data] has been selected.

Figure 13:
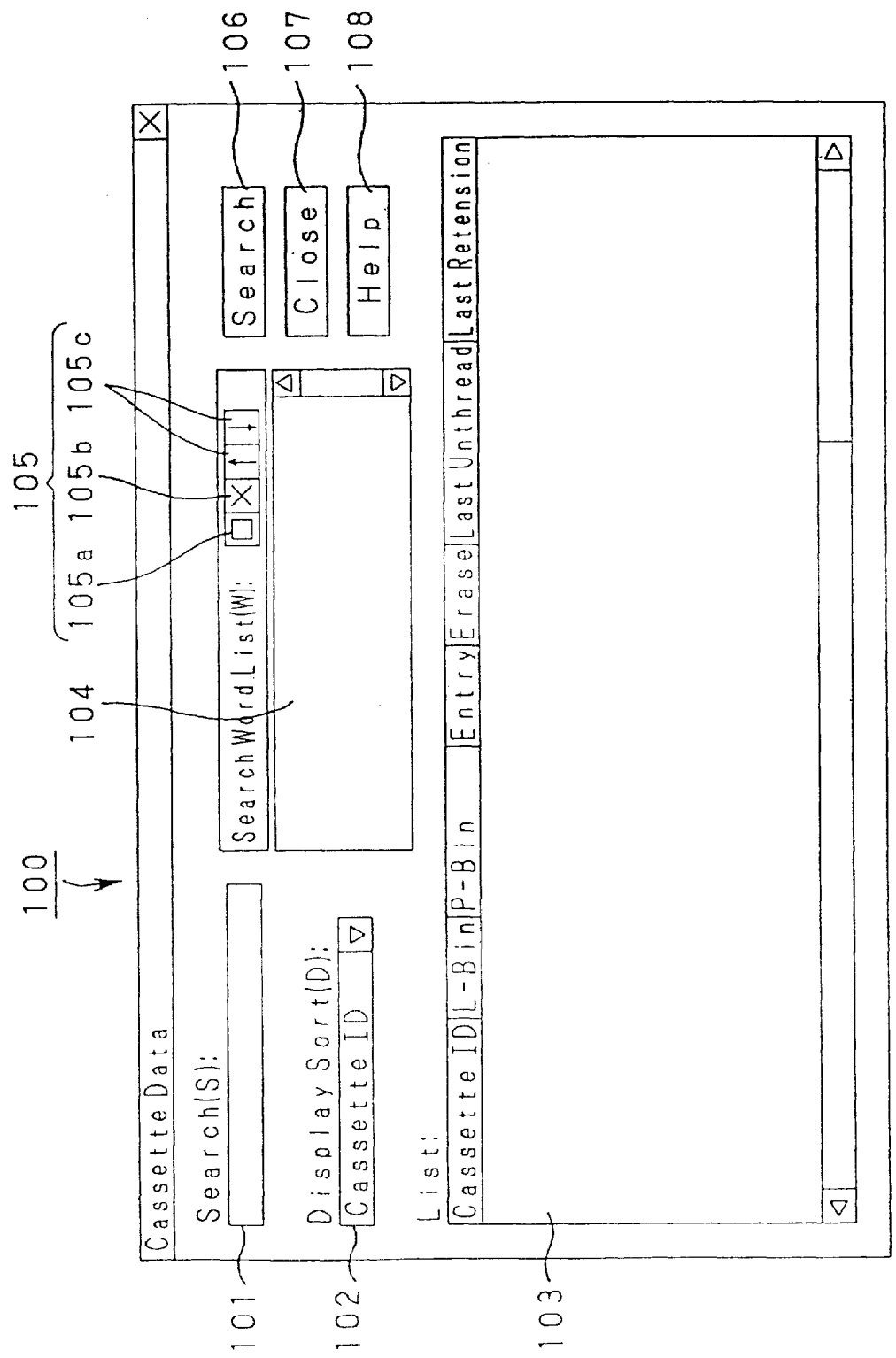
FIG. 13 shows a cassette data window.

At step s4, the main controller body unit 21 causes a cassette information display picture 100, shown in FIG. 13, to be displayed on the display device 23.

The cassette information display picture 100 includes a search text box 101, a search item dropdown list box 102, a display sort dropdown list box 103, a search word list text box 104 and a search word list box 105.

The search text box 101 is used for entering a letter string to be retrieved. Here, the user enters a cassette ID as an object of retrieval. In the search text box 101, an asterisk (*) and a question mark (?) may be used as a wild card. The asterisk (*) and the question mark (?) denote an optional letter string and an optional letter, respectively.

The search item dropdown list box 102 indicates on which item of data of the cassette tape falls the letter string being searched, whether the letter string being searched is to be retrieved by the item cassette ID or by any other item. Here, the letter string is searched by the cassette ID.

The display sort dropdown list box 103 is used for setting the display of the retrieved data. Any one of the cassette ID, logical bin number (L-bin), physical bin number (P-bin), date of cassette entry (Entry), tape initializing data (Erase), last unthread date (last Unthread), last retensioning date (Last ketensioning), number of times of loading (LC), or the volume label (Label), can be selected.

The bin (Bin) means a so-called cassette tape shelf. Each bin is associated with a cassette tape. The logical bin number denotes the serial numbers affixed to the totality of buns of the totality of the consoles. Meanwhile, the logical bin number is affixed not only to the bin but also to the data driving device 13 or to the input/output port 11. The physical bin number means the number for identifying a specified location on the cassette shelf. The physical bin number is made up of, for example, nine digits of 01010301R, wherein the first two digits 01 mean the console string, the next two digits 01 denote the physical console number in the console string, the next two digits 03 denote the tier of the specified console, specifically, a third tier from above. The next two digits 01 denote the first bin on the shelf and R denotes the front side or the back side.

The search word list text box 104 is used for registering letter strings used frequently for retrieval. This registration is executed using the search word list box 105. An addition button 105a is used for displaying a dialog box, not shown, by being clicked with a mouse. If the letter string, frequently used for this dialog box, is entered and a decision button clicked, this letter string is registered on the search word list text box 104. When clicked by the mouse, a deletion button 105*b* deletes the selected letter string in the search word list text box 104. A scroll button 105*c* is used for selecting a desired one of letter strings registered in the search word list text box 104.

When a search button [Search] 106 is clicked with the mouse, retrieval is executed in accordance with the setting contents of the search text box 101 and the search item dropdown list box 102.

At the next step S5, the main controller body unit 21 checks whether or not the search button [Search] 106 on the cassette information display picture 100 has been clicked with the mouse. If the result of check at this step S5 is YES, that is if the search button [Search] 106 has been clicked, the main controller body unit 21 proceeds to step S6. If the result of check at this step S5 is NO, that is if the search button [Search] 106 has not been clicked, the main controller body unit 21 proceeds to step S7.

Before the user clicks the search button [Search] 106, the cassette ID of the cassette tape to be retrieved needs to be entered. Here, [A*] is entered to the search text box 101 and the search item dropdown list box 102 is set to [Cassette ID]. This setting means that the totality of the cassette IDS beginning from [A] are to be searched.

Figure 14:
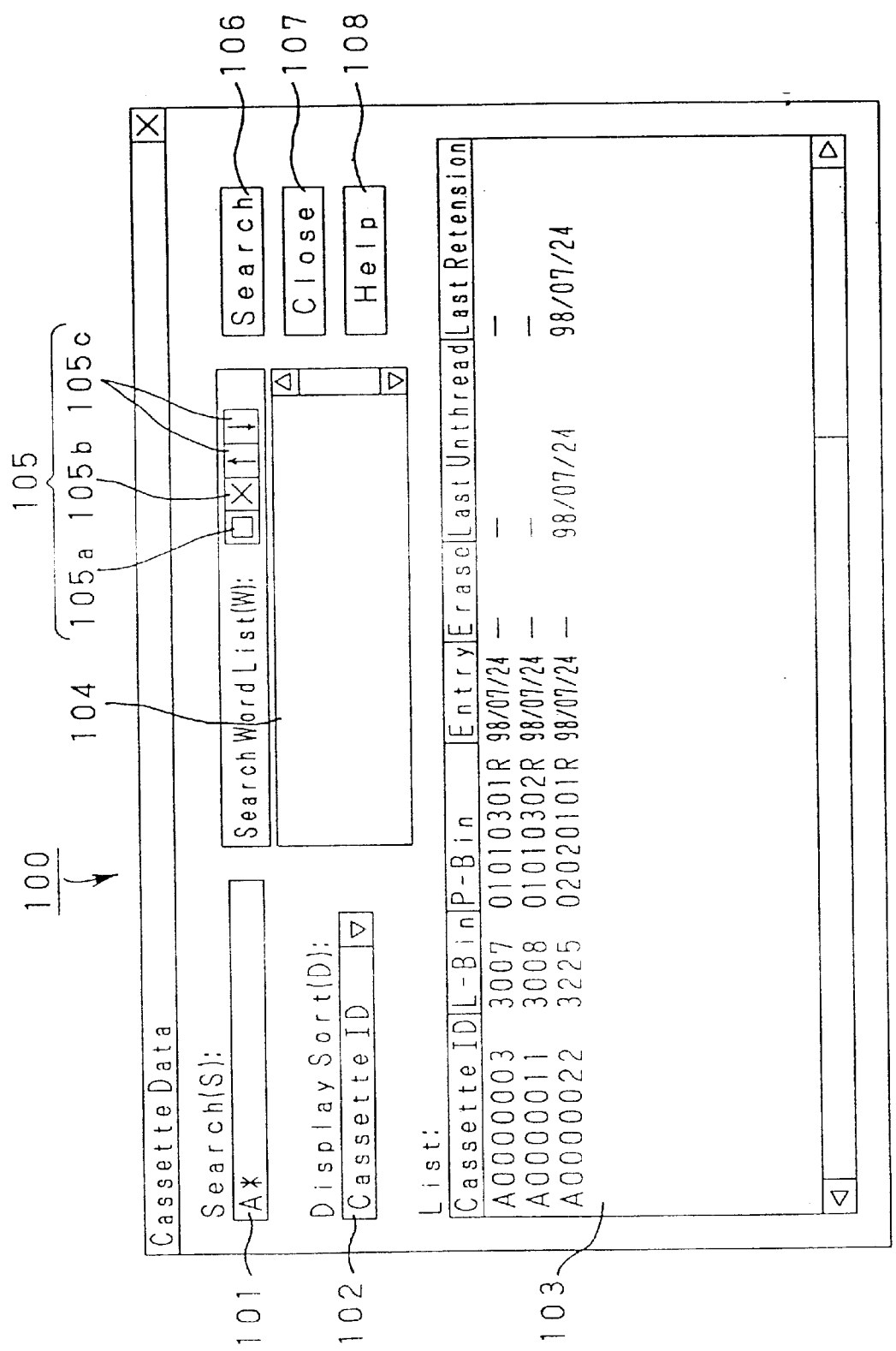
FIG. 14 shows a cassette data window after execution of retrieval.

At step S6, the main controller body unit 21 retrieves the cassette IDS beginning from [A], in accordance with the setting contents. The main controller body unit 21 reverts to step S4 to cause the cassette information to be displayed on the display device 23. At this time, cassette IDS beginning from A are displayed on the display sort dropdown list box 103. FIG. 14 shows the state in which cassette IDS [A0000003], [A0000011] and [A0000022] are indicated on the display sort dropdown list box 103.

At step S7, the main controller body unit 21 checks whether or not one of the cassette IDS indicated on the display sort dropdown list box 103 has been selected and clicked by the mouse. If the result of check at this step S7 is YES, that is if the cassette ID has been clicked, the main controller body unit 21 proceeds to the next step S8. If the result of check at this step S7 is NO, that is if the cassette ID has not been clicked, the main controller body unit 21 proceeds to step S11.

Figure 15:
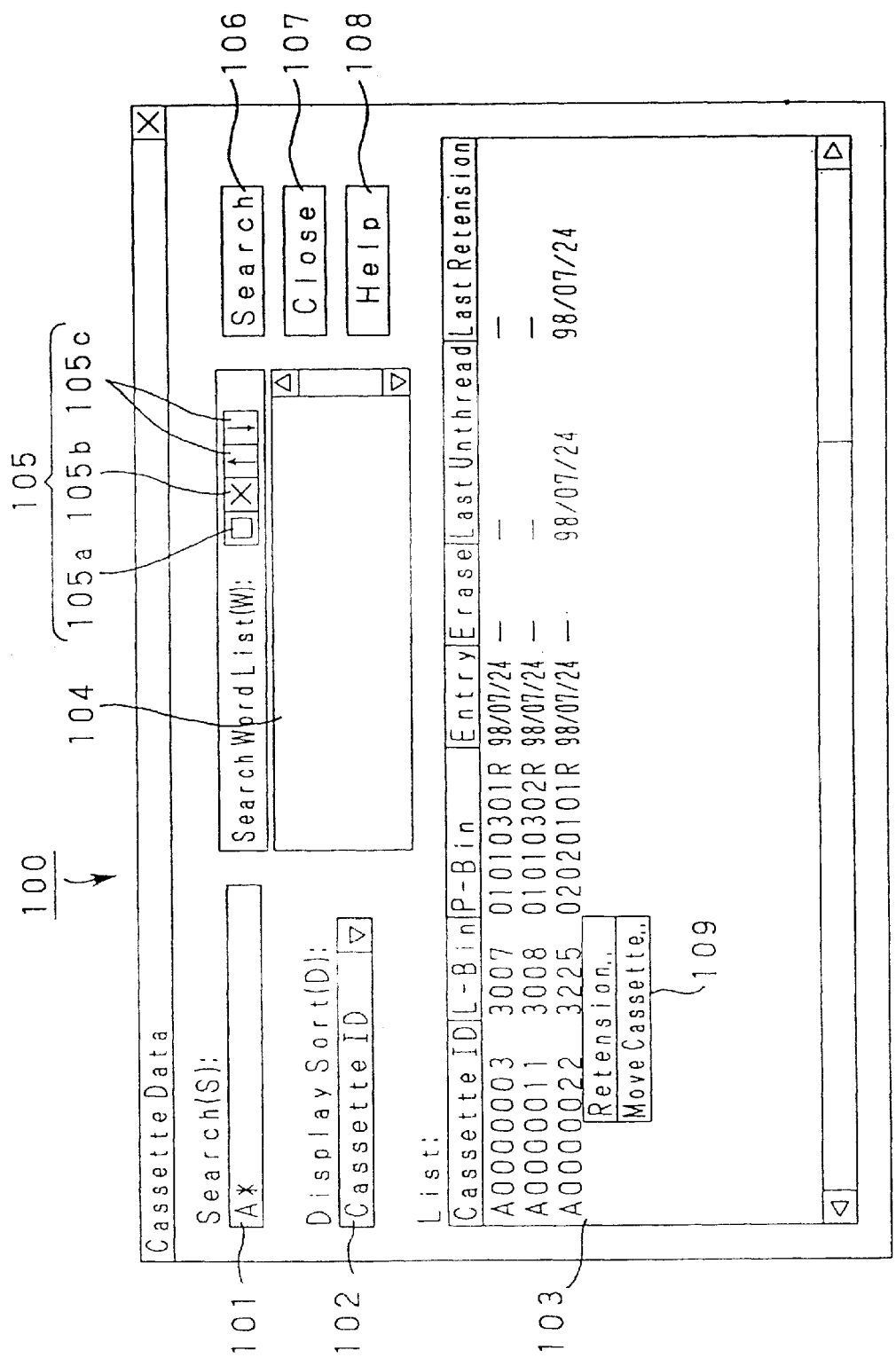
FIG. 15 shows a cassette data window in case of retensioning or movement of a cassette tape after execution of retrieval.

At step S8, the main controller body unit 21 causes a pull-down menu 109 to be displayed on the display device 23, as shown in FIG. 15. If the cassette ID [A0000022] has been selected and clicked, as shown for example in FIG. 15, a pull-down menu 109 indicating the item [Retensioning] and the item [Move Cassette] is displayed.

At the next step S9, the main controller body unit 21 awaits selection of the pull-down menu 109. If, from the state shown in FIG. 15, the item [Retensioning] is clicked, the main controller body unit proceeds to step S21 shown in FIG. 16. If the item [Move Cassette] is clicked, the main controller body unit 21 proceeds to step S31 shown in FIG. 17. If any other menu is selected, the main controller body unit proceeds to the next step S10.

At step S10, the main controller body unit 21 cancels the pull-down menu 109 from the cassette information display picture 100. The main controller body unit 21 then returns to step S5 to re-check whether or not the search button [Search] 106 on the cassette information display picture 100 has been clicked.

Also, at step S11, the main controller body unit 21 checks whether or not a closure button [Close] 107 has been clicked by the mouse. If the result of check at this step S11 is YES, that is if the closure button [Close] 107 has been clicked, the main controller body unit 21 proceeds to the next step S12. If the result of check at step S11 is NO, that is if the closure button [Close] 107 has not been clicked, the main controller body unit 21 returns to step S5 to re-check whether or not the search button [Search] 106 on the cassette information display picture 100 has been clicked.

At step S12, the main controller body unit 21 cancels the cassette information display picture 100 from the display device 23. The main controller body unit 21 then returns to step S2 to re-check whether or not the item [Cassette Data] has been selected.

Figure 16:
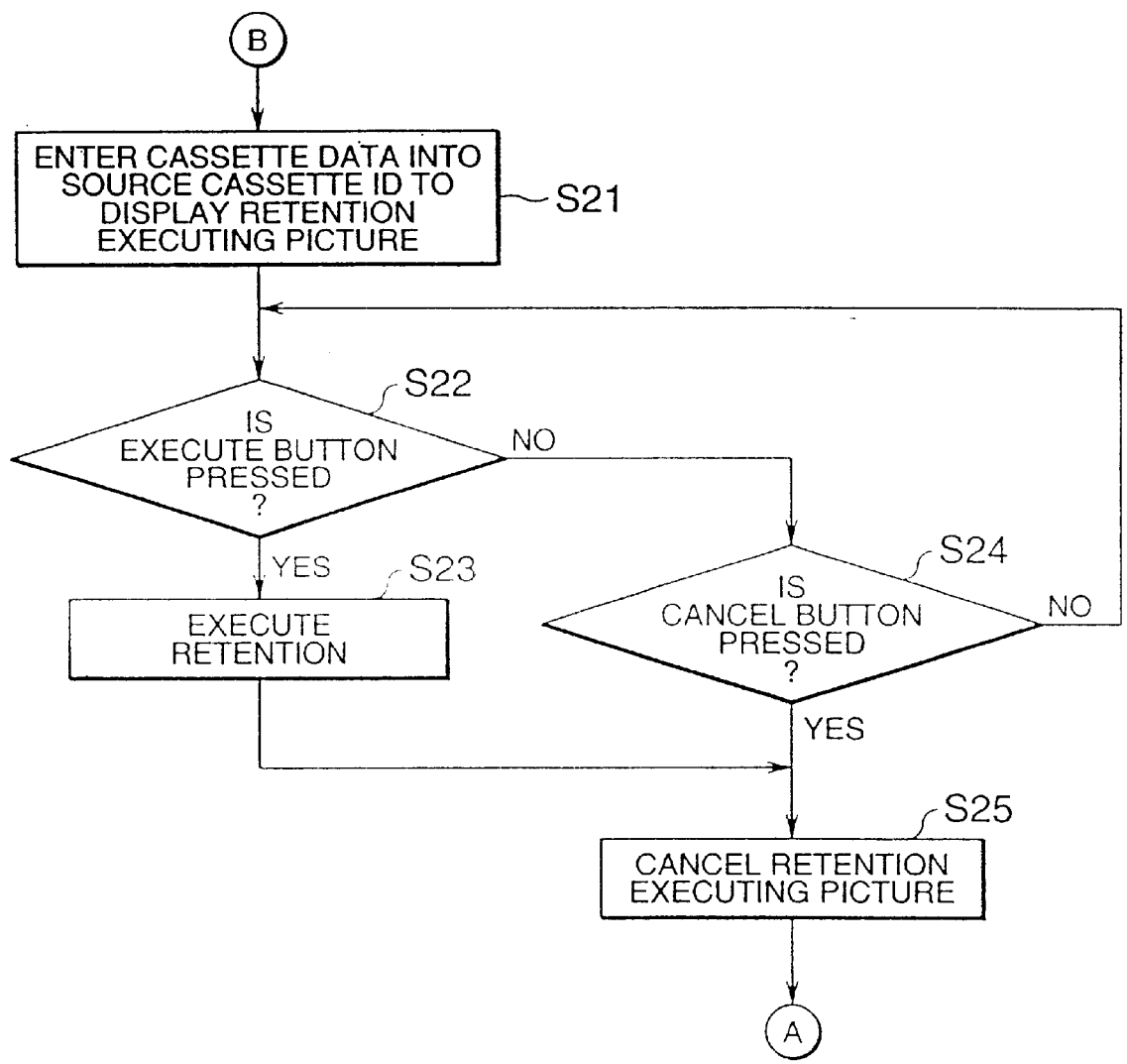
FIG. 16 is a flowchart for illustrating the operational processing of the main controller body unit of the library controller in case of retensioning or movement of a cassette tape.
Figure 18:
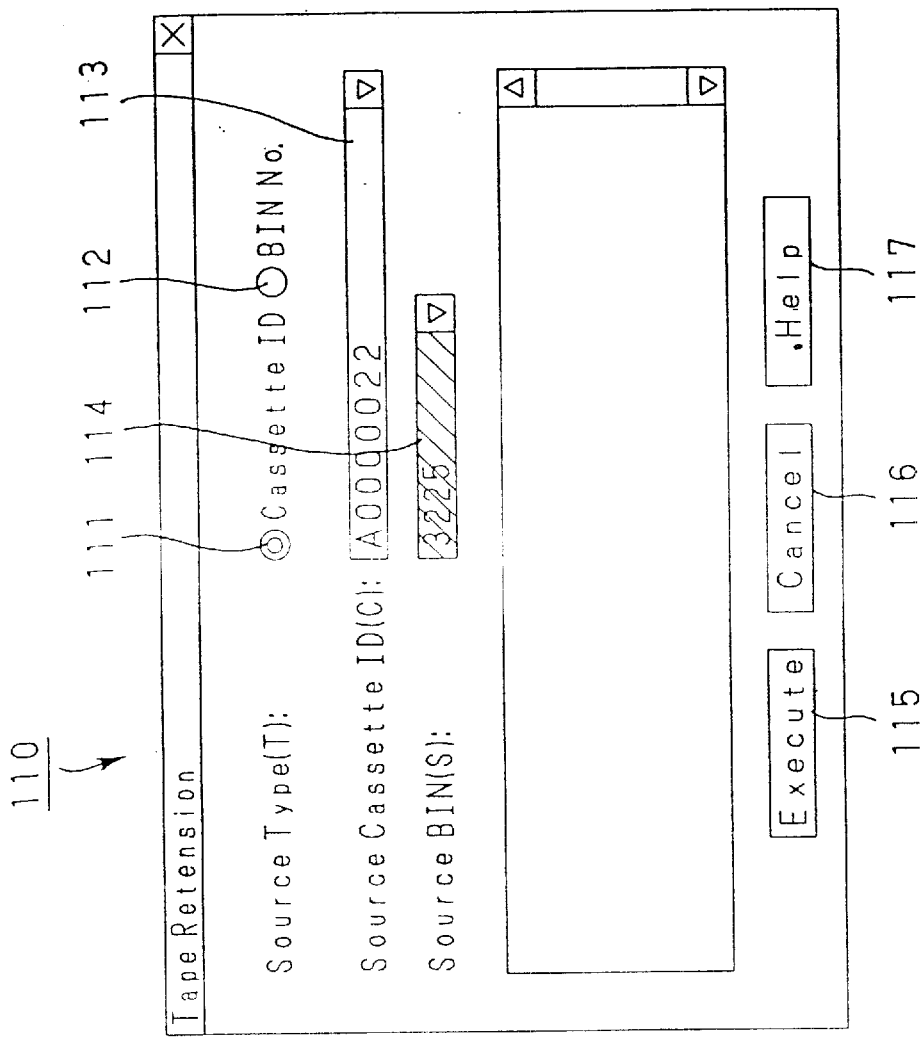
FIG. 18 shows a cassette retensioning window for setting cassette tape retensioning.

If it is decided at step S9 that the retensioning has been clicked, the main controller body unit 21 proceeds to step S21 shown in FIG. 16 to cause a tape retensioning window 110 shown in FIG. 18 to be displayed on the display device 23.

Referring to FIG. 18, the tape retensioning window 110 includes a cassette ID check box 111, a bin number check box 112, a source cassette ID dropdown list box 113, a source bin box 114, indicating the logical bin number of the bin to which belongs the cassette tape, an execute button 115 for starting the execution of the retensioning, a cancel button [Cancel] 116 for cancelling the indication of the tape retensioning window 110 and a help button [Help] for held menu display.

The cassette ID check box 111 and the bin number check box 112 indicate a source type. In one of these boxes is indicated a mark. Depending on the selection by the cassette ID check box 111 or the bin number check box 112, the source bin box 113 specifies the cassette tape for retensioning. The source bin box 114 indicates the cassette tape having the cassette ID selected at step S7.

At the next step S22, the main controller body unit 21 checks whether or not the execute button [Execute] 115 of the tape retensioning window 110 has been clicked. If the result of check at step S22 is YES, that is if the execute button [Execute] 115 has been clicked, the main controller body unit 21 proceeds to the next step S23 and, if otherwise, that is if the execute button [Execute] 115 has not been clicked, the main controller body unit 21 proceeds to step S24.

At step S23, the main controller body unit 21 controls the cassette library 1 so that retensioning will be executed on the cassette tape of the cassette ID selected at step S7. In the cassette library 1, the basic console B controls the cassette elevator 16 to load the cassette tape on a vacant data driving device 13, while controlling the data driving device 13 to rewind the cassette tape and controlling the cassette elevator 16 to return the cassette tape to the original bin.

At step S24, the main controller body unit 21 checks whether or not the cancel button [Cancel] of the tape retensioning window 110 has been clicked by the mouse. If the result of check at this step S24 is YES, that is if the cancel button [Cancel] 116 has been clicked, the main controller body unit 21 proceeds to the next step S25. If the result of check at this step S24 is NO, that is if the cancel button [Cancel] 116 has not been clicked, the main controller body unit 21 reverts to step S22 to re-check whether or not the execute button [Execute] 115 has been clicked.

At the next step S25, the main controller body unit 21 cancels the tape retensioning window 110, as the retensioning execution picture indicated on the display device 23. The main controller body unit 21 reverts to step S5 shown in FIG. 12 to re-check whether or not the search button [Search] has been clicked.

Figure 17:
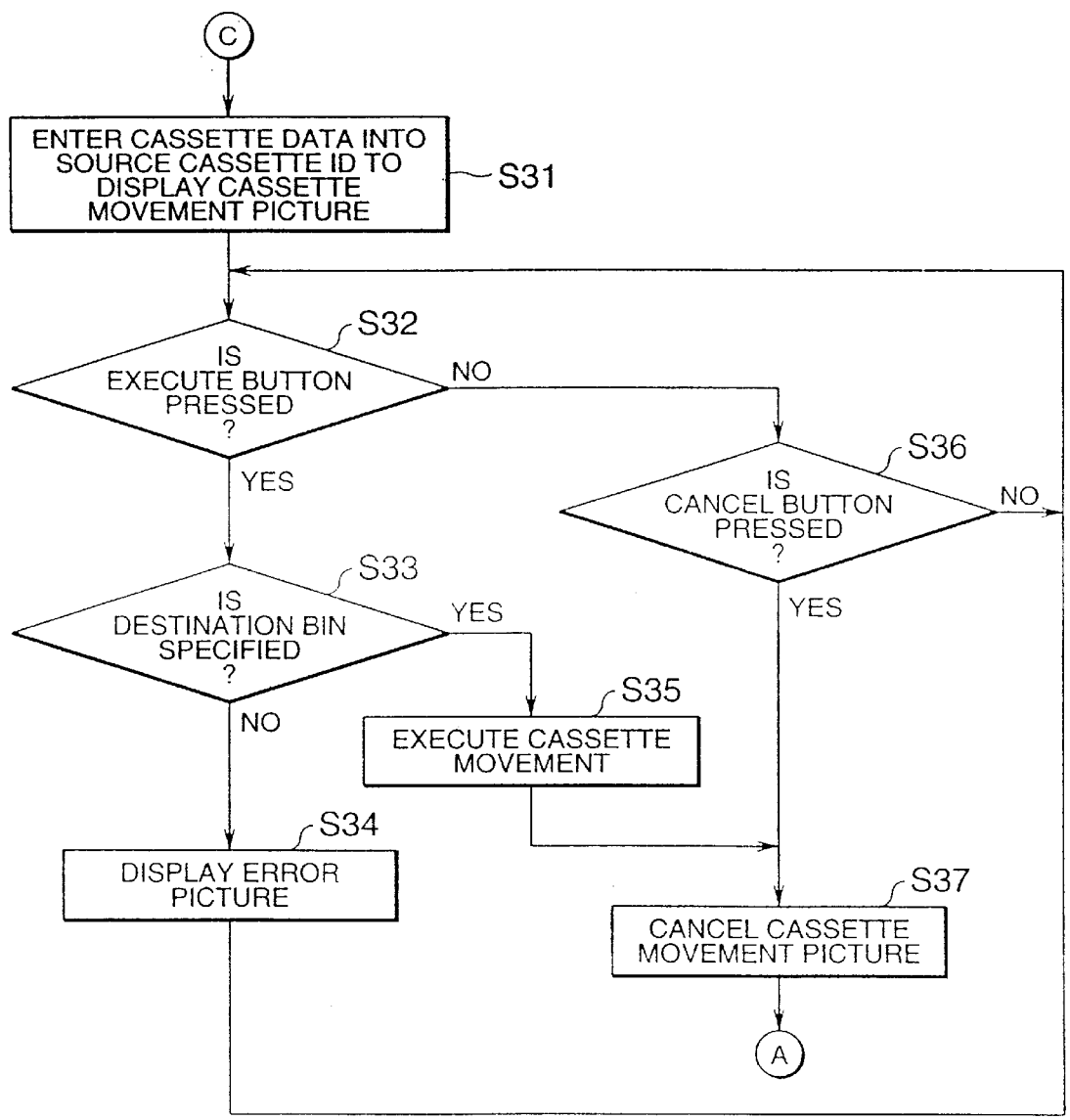
FIG. 17, continuing to FIG. 16, is a flowchart for illustrating the operational processing of the main controller body unit of the library controller in case of retensioning or movement of a cassette tape.
Figure 19:
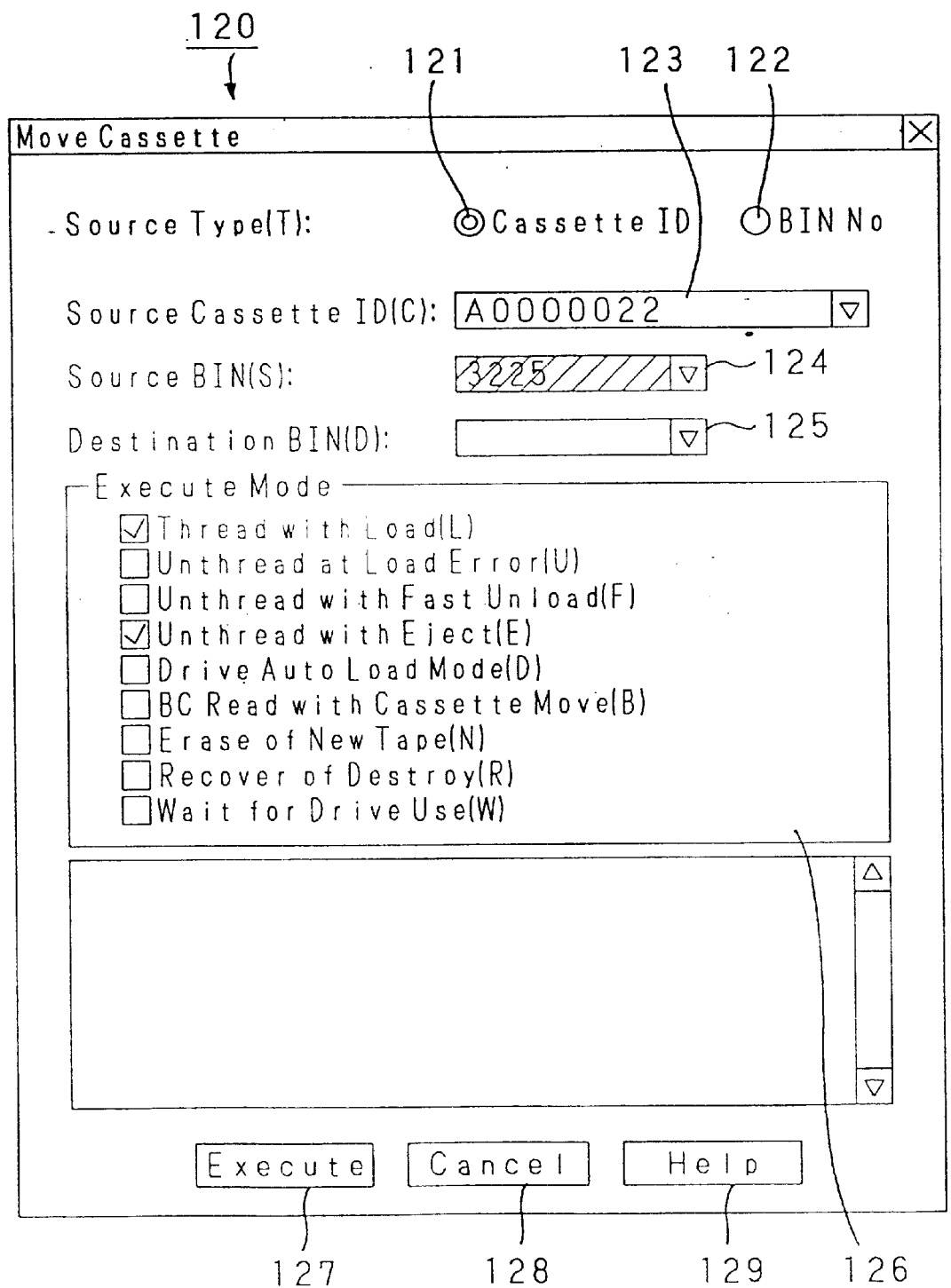
FIG. 19 shows a cassette movement window for causing cassette tape movement.

If the main controller body unit 21 has verified at step S9 that the item [Move Cassette] in the pull-down menu 109 has been clicked, it proceeds to step S31 shown in FIG. 17 to enter cassette data in the source cassette ID to display a cassette move window 120, as a cassette movement picture shown in FIG. 19, on the display device 23.

The cassette move window 120 is used when moving the cassette tape to a desired bin, input/output port or a drive device, such as a tape recorder.

A cassette ID check box 121 and a bin number check box 122, as source type option boxes, make selection whether the cassette tape being moved is specified by the cassette ID or by the bin number. If the cassette tape is specified by the cassette ID, the cassette ID check box 121 is checked by the mouse, whereas, if the cassette tape is specified by the bin number, the bin number check box 122 is checked by the mouse.

In a source cassette ID dropdown list box 123, entry can be made only if the cassette ID check box 121 is selected. It specifies the cassette tape being moved by an input via a mouse etc.

In a source bin dropdown list box 124, entry can be made only if the bin number check box 122 is selected. The cassette tape being moved is specified by an entry by a mouse etc.

A destination bin dropout list box 125 specifies the bin number of the destination of movement of the cassette tape. It specifies the cassette tape being moved by e.g., a mouse entry. It is the bin number, rather than the drive number, that is specified, even supposing that the cassette tape is moved to the driving device.

An execute mode column 126 sets the operational mode that is effective only with respect to movement effected in this dialog box.

The operational mode setting items are hereinafter explained.

The item [Thread with Load] 126 is an item for setting whether the operation up to the cassette tape loading operation is to be performed automatically when the cassette tape is moved to the data driving device 13. The loading means reading out the information in the header of the cassette tape taken up of a take-up reel.

An item [Unthread at Load Error(U)] is an item for setting whether the cassette tape is to be returned to the original bin or left in the data driving device 13 when the cassette tape is moved to the data driving device 13 and an error has been detected in the data driving device 13. If this item is off, the cassette tape is left in the data driving device 13.

An item [Unthread with Eject (E)] is an item for setting whether or not a cassette tape is automatically ejected when it is moved from the data driving device 13.

An item [Unthread with Fast Unload (F)] is an item for setting whether the fast unloading is to be effected when a cassette tape is moved from the data driving device 13. The setting of this item [Unthread with Fast Unload (F)] is effective only if the item [Unthread with Eject (E)] is on.

An item [Drive Auto Load Mode] is an item for setting whether a notice of end of cassette movement is to be made to the library controller 2 as an upper order computer at a time point of termination of cassette tape movement to the data driving device 13. This item is used when the automatic loading mode (the mode of automatically effecting the loading of the cassette tape on the data driving device 13) is set on the data driving device 13. By setting this item [Drive Auto Load Mode], it is possible to notify the library controller 2 of the effect of termination of movement to permit the library controller 2 to move another cassette tape on reception of this notice.

An item [BC Read with Cassette move(B)] is an item for setting whether or not the cassette tape movement is to be discontinued if, when the cassette tape is moved, the bar code attached to the cassette tape is read and the data thus read is not coincident with the database of the library controller 2.

An item [Erase of New Tape (N)] is an item for setting whether or not initialization is to be made if a cassette tape being loaded is found to be a non-formatted tape.

An item [Recover of Destroy (R)] is an item for setting whether or not data in a tape header is to be recovered automatically if, during loading of the cassette tape, [Recover Request] or [Update Flag ON] is detected. This item [Recover of Destroy (R)] is effective only if the item [Thread with Load] is on.

An item [Wait for Drive Use] is an item for setting whether or not a cassette tape not carrying a bar code label and a cassette tape not carrying a bar code is to be used. If this item is off, only a cassette tape that permits the bar code to be read out correctly is used.

In a movement result window 129, there is indicated the result of movement of the cassette tape when the contents of the execute mode column 126 are executed correctly. An execute button [Execute] 127, if clicked, permits the item checked in the execute mode column 126 to be executed by the main controller body unit 21. A cancel button [Cancel] is used for cancelling the display on the cassette move window 120 from the displayed picture.

At the next step S32, the main controller body unit 21 checks whether or not the execute button [Execute] 127 has been clicked. If the result of check at this step S32 is YES, that is if the execute button [Execute] 127 has been clicked, the main controller body unit 21 proceeds to the next step S33. If the result of check at this step S32 is NO, that is if the execute button [Execute] 127 has not been clicked, the main controller body unit 21 proceeds to step Setting device 36.

At step S33, the main controller body unit 21 checks whether or not the destination bin has been specified, that is if the bin number has been inputted to a target bin dropdown list box 125 of the cassette move window 120. If the result of check at step S33 is YES, that is if the bin number has been entered, the main controller body unit 21 proceeds to step S35. If the result of check at step S33 is NO, that is if the bin number has not been entered, the main controller body unit 21 proceeds to the next step S34.

At step S34, the main controller body unit 21 allows an error picture to be displayed on the display device 23. The main controller body unit reverts to step S32 to re-check whether or not the execute button [Execute] 127 has been clicked.

At step S35, the main controller body unit 21 controls the cassette elevator 16 so that the cassette tape will be moved to the specified bin. The main controller body unit then proceeds to step S37.

On the other hand, the main controller body unit 21 checks at step S36 whether or not a cancel button [Cancel] 128 of the cassette move window 120 has been clicked. If the result of check at step S36 is YES, that is if the cancel button [Cancel] 128 has been clicked, the main controller body unit 21 proceeds to the next step S37. If the result of check at step S36 is NO, that is if the cancel button [Cancel] 128 has not been clicked, the main controller body unit 21 reverts to step S32 to re-check whether or not the execute button [Execute] 127 has been clicked.

At step S37, the main controller body unit 21 cancels the cassette move window 120, as a cassette movement picture, displayed on the display device 23. The main controller body unit 21 then reverts to step S5 shown in FIG. 12 to re-check whether or not the search button [Search] 106 of the cassette information display picture 100 has been clicked.

With the above-described cassette library system, it is possible to eliminate the operation so far carried out by an operator, that is the operation of opening the tape retensioning window, retrieving a desired cassette tape, and inputting a cassette ID of the retrieved cassette tape to the tape retensioning window 110. Stated differently, since it is possible to perform cassette tape retensioning setting operation at a time by selecting a desired cassette ID after retrieval of the cassette ID, tape retensioning can be achieved more easily than in the conventional system. Moreover, the cassette tape retensioning information can be displayed on the cassette information display picture 100 on which the desired cassette tape can be retrieved and the date of last retensioning of the cassette tape can be indicated. That is, the information on a cassette in need of maintenance can be retrieved easily within the sole cassette information display picture 100. In addition, cassette tape movement or retensioning can be realized easily via this displayed picture.

4. Console Extension

In the cassette library system, there is no particular limitation to the number of the driving consoles D, cassette consoles C or the junction consoles J, although the number of the basic console B is set. That is, the various consoles can be extended subsequently. In the following explanation, it is assumed that the cassette library 1 of the cassette library system is configured as shown in FIG. 10.

On startup of the library controller 2, the main picture for control 90, showing the console composition from one console string to another, is indicated on the display device 23, as shown in FIG. 11.

Figure 20:
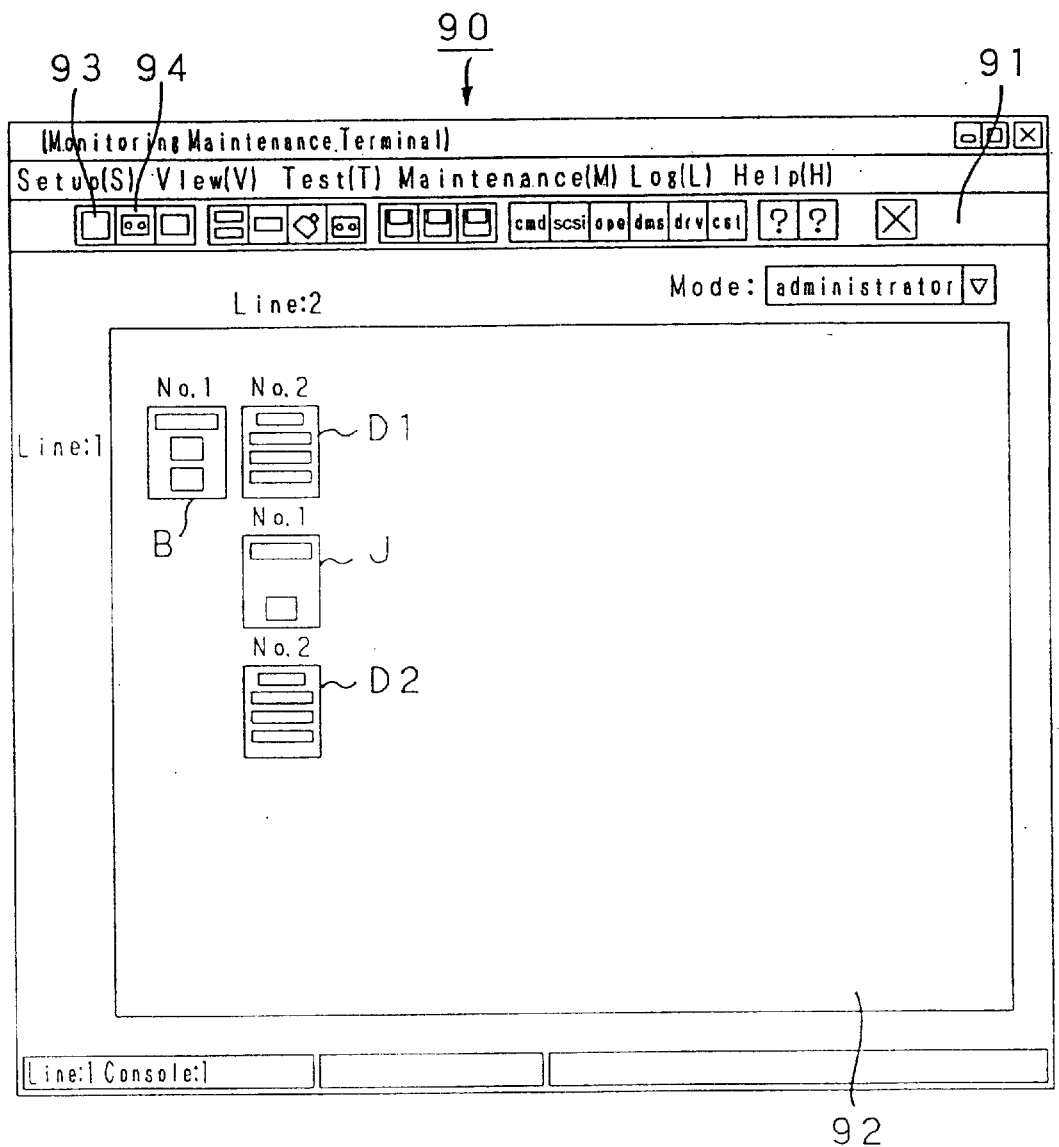
FIG. 20 shows a main main picture in which the structure of the cassette library is shown using small icons.

On the main picture for control 90, the real connecting state of each console of the cassette library 1 is displayed, using small icons, as shown in FIG. 20. In FIG. 20, the basic console B is denoted as No. 1, while the driving console D1 is denoted as No. 2, with the numbers indicating the physical console numbers. This indicates that the basic console B is the physical console number 1 of the console string 1, with the driving console D1 being the physical console number 2 of the console string 2. The junction console J and the driving console D2 are indicated as No. 1 and No. 2, respectively. This indicates that the junction console J is of the physical console number 1 of the console string 2, while the driving console D2 is of the physical console number 2 of the console string 2. That is, the physical console numbers 1, 2, . . . , are affixed to the respective consoles of each console string.

On the main picture for control 90, each console may be indicated by a logical number. It is shown here that the basic console B, driving console D1, junction console J and the driving console D2 are indicated as L No. 1, L No. 2, L No. 3 and L No. 4, respectively, where L Nos indicates the logical numbers, with the logical numbers of the respective consoles being 1, 2, 3 and 4, respectively, as shown in FIG. 21.

Figure 21:
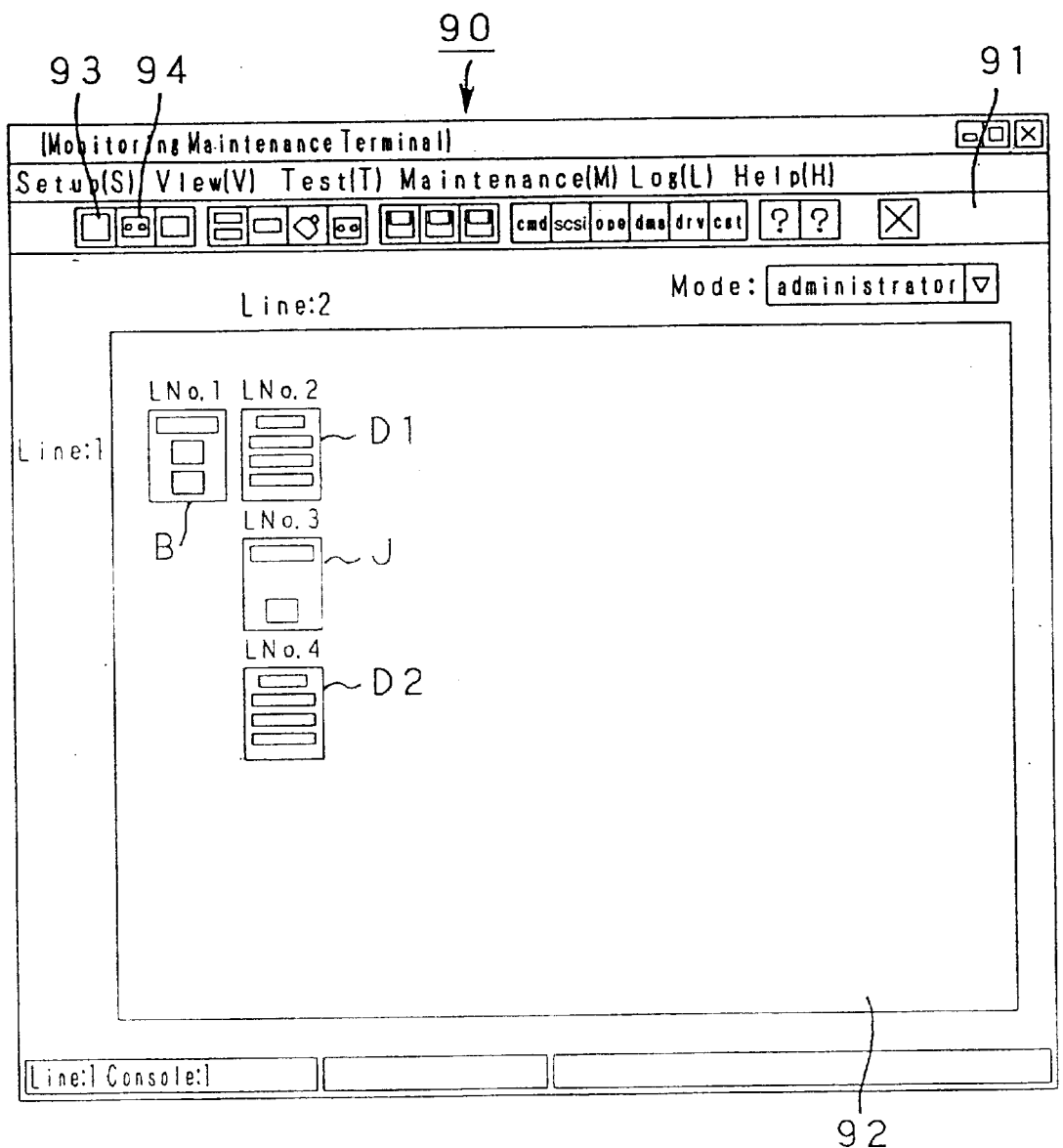
FIG. 21 shows a main picture in case each console is represented by a logical console number.
Figure 22:
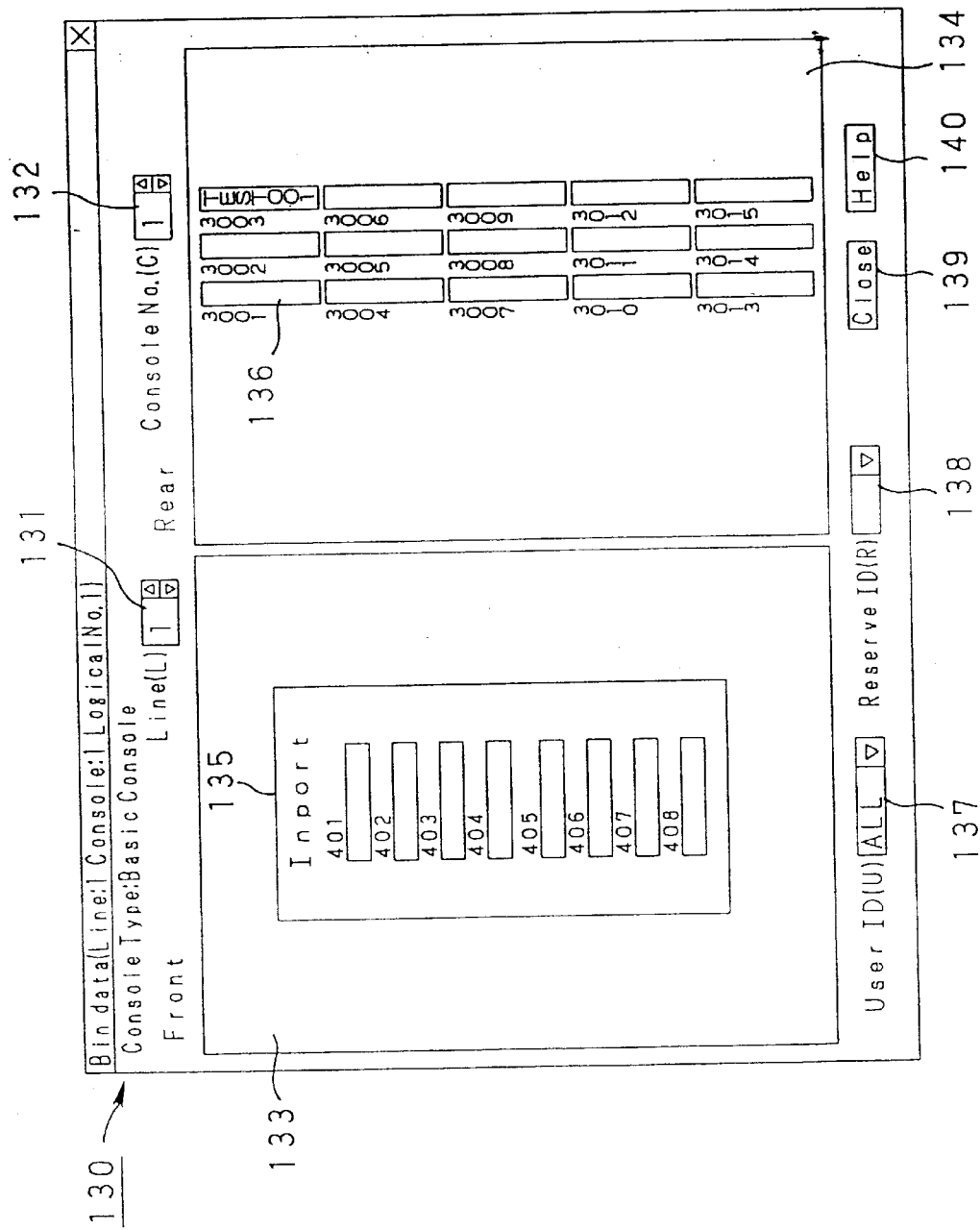
FIG. 22 shows a bin data window for indicating a logical bin number in the basic console.

When a bin data button 93 of the main picture for control 90 shown in FIG. 21 is clicked, there is displayed a bin data window 130, displaying the logical bin number in the console, as shown in FIG. 22.

The bin data window 130 shows the relation between the respective bins of the specified consoles and the associated cassette tapes. In the bin data window 130 are displayed a front side block and a back side block of a console. That is, referring to FIG. 5, each console is made up of a front side block and a back side block, with the cassette elevator 102 in-between. These two blocks are displayed in a front display area 133 and in a rear display area 134 in the bin data window 130, respectively.

A line number box 131 is used for selecting a console string of a console to be displayed. A console number box 132 is used for selecting the physical console number of a console in the console string selected in the line number box 131. FIG. 22 shows the physical console number 1 in the console string 1, that is the basic console B.

A front display area 133 displays the GUI 135 of the input/output port 11 shown in FIG. 4, that is an in-port 135. The in-port 135 includes eight ports that can input/output a cassette tape. Each port is set so as to start with a logical bin number 401. Therefore, the logical bin numbers from 401 to 408 are affixed to the respective ports of the in-port 135.

In a rear display area 134, 15 cassette bins 136 are displayed. The logical bin number of the cassette bin starts with 3001. Since the basic console B has 15 bins on the rear side, FIG. 22 shows the state in which logical bin numbers of from 3001 to 3015 are affixed to the respective cassette bins 136. The [TEST_001 ] is displayed for the cassette bin 136 having the logical bin number 3003. The [TEST_001 ] indicates a cassette ID of a cassette tape housed in the cassette bin. The cassette ID is recorded on a label attached to the cassette tape. Thus, the absence of the cassette ID on the cassette bin indicates that no cassette tape is housed or a cassette ID on the label has not been read out.

In order to check the occupied state of each bin, a user ID box 137 selects the user ID of an initiator occupied here. The bin occupied by the selected user ID is represented by the yellow background. If [ALL] is selected, the totality of pertinent occupied bins can be displayed.

In order to check the occupied state of each pin, a reserve ID box 138 selects a reserve ID of the occupied bin. A close [Close] button 139 cancels the bin data window 130.

If [2] is entered to the console number box 132 and an execute key, not shown, is actuated, a logical bin number of the driving console D1, bearing the physical console number 2 of the console string 1, is displayed on the bin data window 130.

Specifically, there are displayed, in the front display area 133, a junction 141 indicating the GUI of the junction port controller 18 and 79 cassette bins 142.

Figure 23:
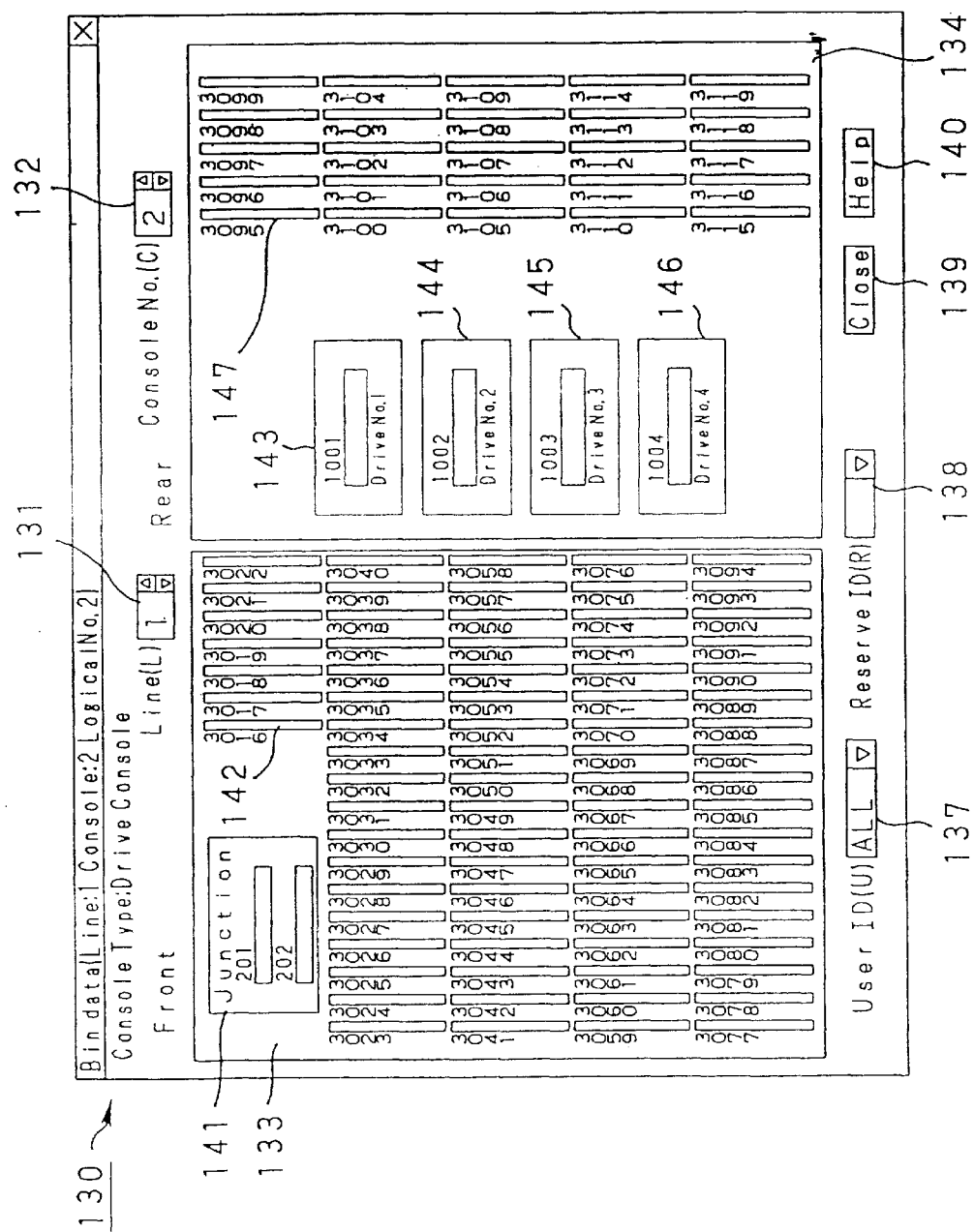
FIG. 23 shows a bin data window indicating the logical bin number in a driving console D1.

The junction port unit 18 is used to exchange cassette tapes between it and the junction console J1, and is constructed to change the direction of the cassette tapes, arranged parallel to the direction of the console string L2, to a direction parallel to the console string L1, substantially through a right angle, to enable cassette tape exchange, as shown in FIG. 5. The driving console D1 has a junction 141, as shown in FIG. 23, in order to permit ejection or insertion of the cassette tapes transported by the junction port unit 18. The junction 141 has two ports. The junction ports begin with the logical bin number 201, so that the logical bin numbers of the respective ports of the junction 141 are 201, 202.

The logical bin numbers of the cassette bin 142 are 3016 to 3094. Thus, the last logical bin number 3015 of the cassette bin of the basic console B is contiguous to the first logical bin number 3016 of a cassette bin 142 of the driving console D1.

In the rear display area 134, driving devices 143, 144, 145 and 146 and 25 cassette bins 147 are displayed.

The drive device 143 shows the state in the driving console D1, as do the remaining drive devices 144 etc. The logical bin numbers of the drive device starts with 1000. In the embodiment shown in FIG. 23, four data driving device 13 are included in the driving console D1.

The logical bin numbers of the cassette bin 147 are 3095 to 3119. Therefore, the logical bin numbers of the cassette bins in the driving console D1 are serial numbers from 3016 to 3119.

Figure 24:
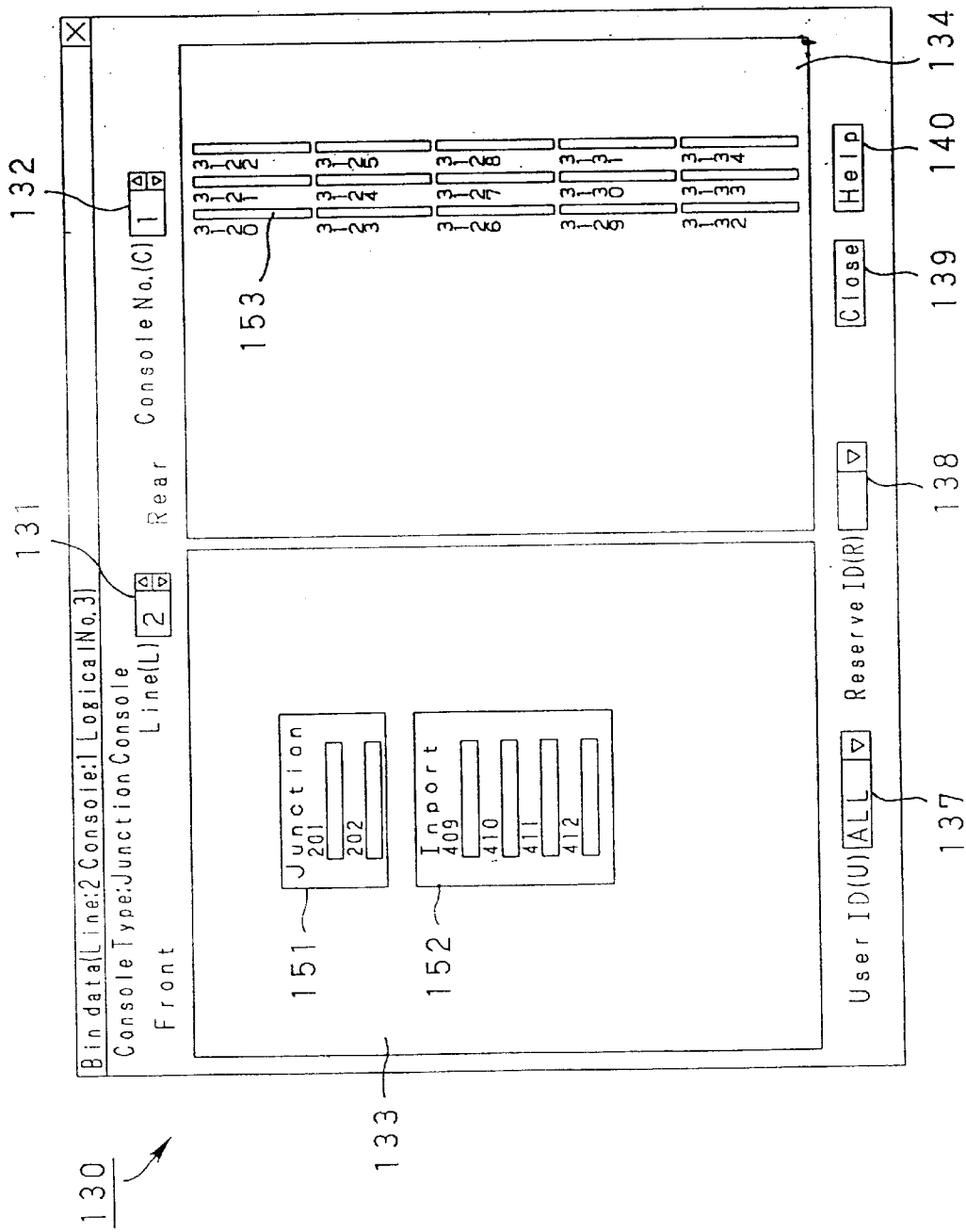
FIG. 24 shows a bin data window indicating the logical bin number in a driving console J.

If [2] and [1] are entered in the line number box 131 and the console number box 132, respectively, and the execute key is actuated, there is indicated a logical bin number of a junction console J of the console string 2 and the physical console number of 1, as shown in FIG. 24.

Specifically, the junction 151 indicating the GUI of the junction port controller 18 and the in-port 152 indicating the GUI of the input/output port 11 are displayed on the front display area 133.

The junction port controller 18 operates to deliver a cassette tape, transferred by the cassette elevator 102 in the direction of the console string L2, to the driving console D1, as it changes the transfer direction of the cassette tape, so that the delivered cassette tape is changed in its transfer direction and transferred by the cassette elevator 102 in the direction of the console string L1. The junction port controller 18 is able to move two cassette tapes. The junction port controller 18 is made up of two bins, a motor, a belt and a gearing. The gearing is run in rotation by the driving of the motor so that the power of rotation is transmitted to a belt, whereby the cassette tape is moved as it is changed in its direction to the junction console J and the driving console D1. The same applies for the reverse direction. The junction port controller 18 has two bins carrying the logical numbers 201, 202.

The in-port 152 is used for inserting the cassette tape from outside and is made up of four bins to each of which is allotted a logical number. The logical bin numbers of the respective bins of the in-port 152 are 409 to 412, as shown in FIG. 24.

In the rear display area 134 are displayed 15 cassette bins 153. The logical bin numbers of the cassette bins 153 are 3120 to 3134. Therefore, the logical bin number 3119 in the driving console DI is contiguous to the first logical bin number 3120 in the junction console J.

Figure 25:
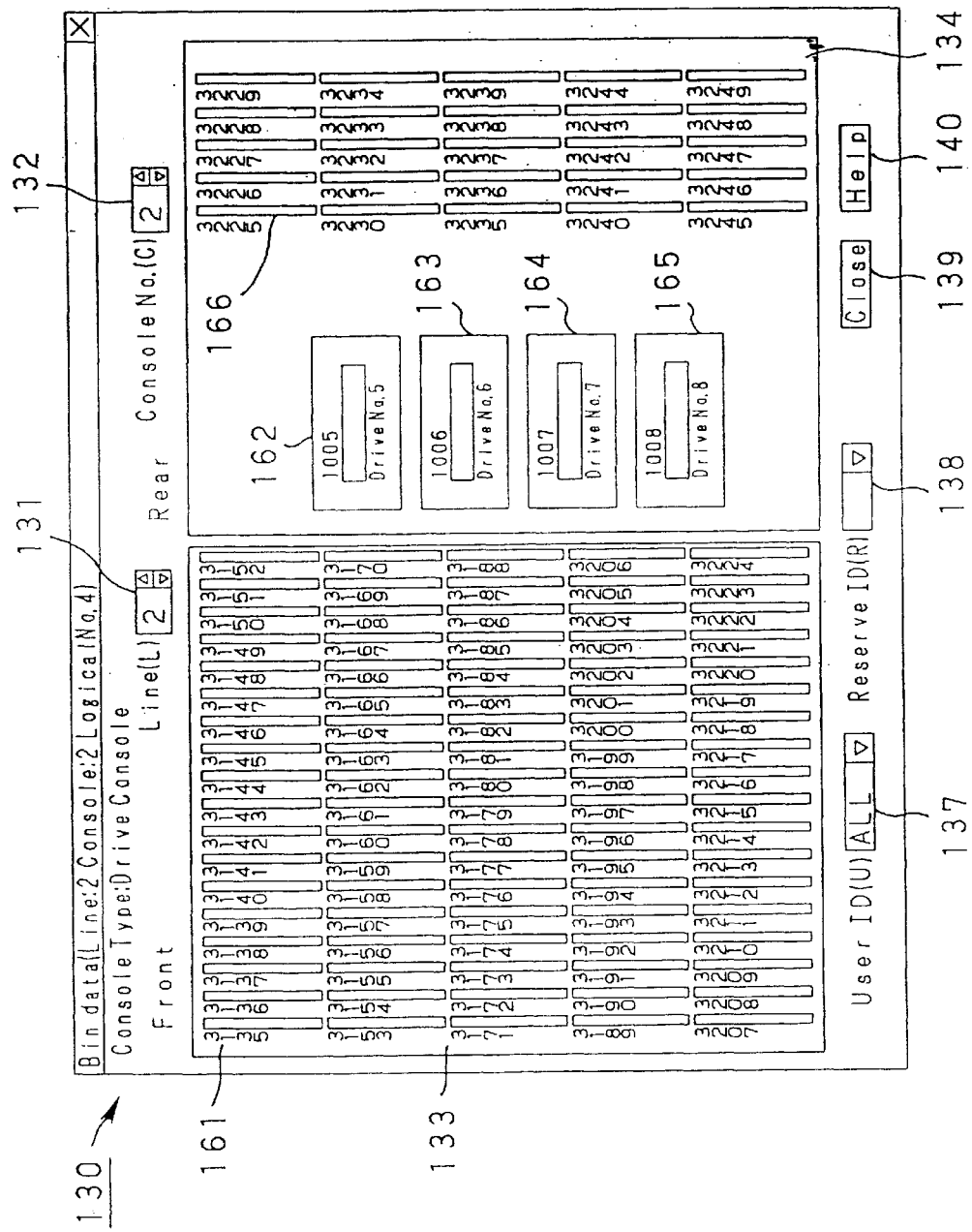
FIG. 25 shows a bin data window indicating the logical bin number in a driving console D2.

If [2] is entered to the console number box 132, and the execute key is actuated, there is displayed in the bin data window 130 the logical bin number of the driving console D2 which is of the console string 2 and of the physical console number of 2, as shown in FIG. 25.

Specifically, 90 cassette bins 161 are displayed in the front display area 133. The logical bin numbers of the cassette bin 161 are 3135 to 3224. Thus, the last logical bin number 3134 in the junction console J is contiguous to the first logical bin number 3135 in the driving console D2.

The rear display area 134 includes four driving devices 162 to 165, such as data recorders, and 25 cassette bins 166.

The drive device 162, displayed on the rear display area 134, shows the state of the data driving device 13 in the driving console D2. The same holds for the other driving devices 163 etc. The driving devices 162 to 165 are of the logical bin numbers of 1005, 1006, 1007 and 1008, respectively.

The cassette bins 166 are of the logical bin numbers of from 3135 to 3224 on the front side and of 3225 to 3249 on the rear side.

(4-2) Console Extension (Addition) Processing

The processing for adding the logical bin numbers of consoles on console extension is explained with reference to FIGS. 26 to 34.

Figure 26:
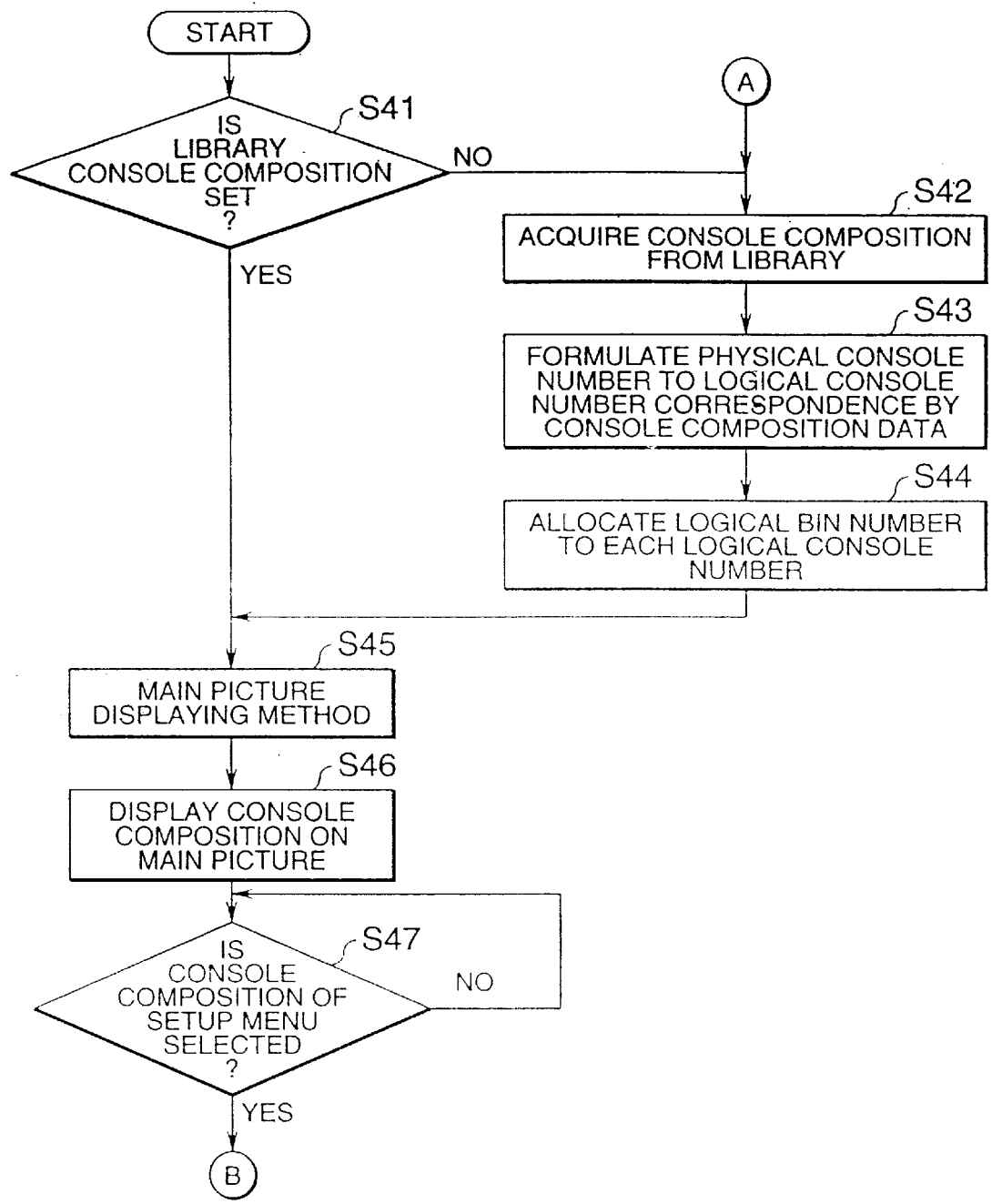
FIG. 26 is a flowchart for illustrating the processing operation of the main controller body unit in case of extending a console to the cassette library.
Figure 27:
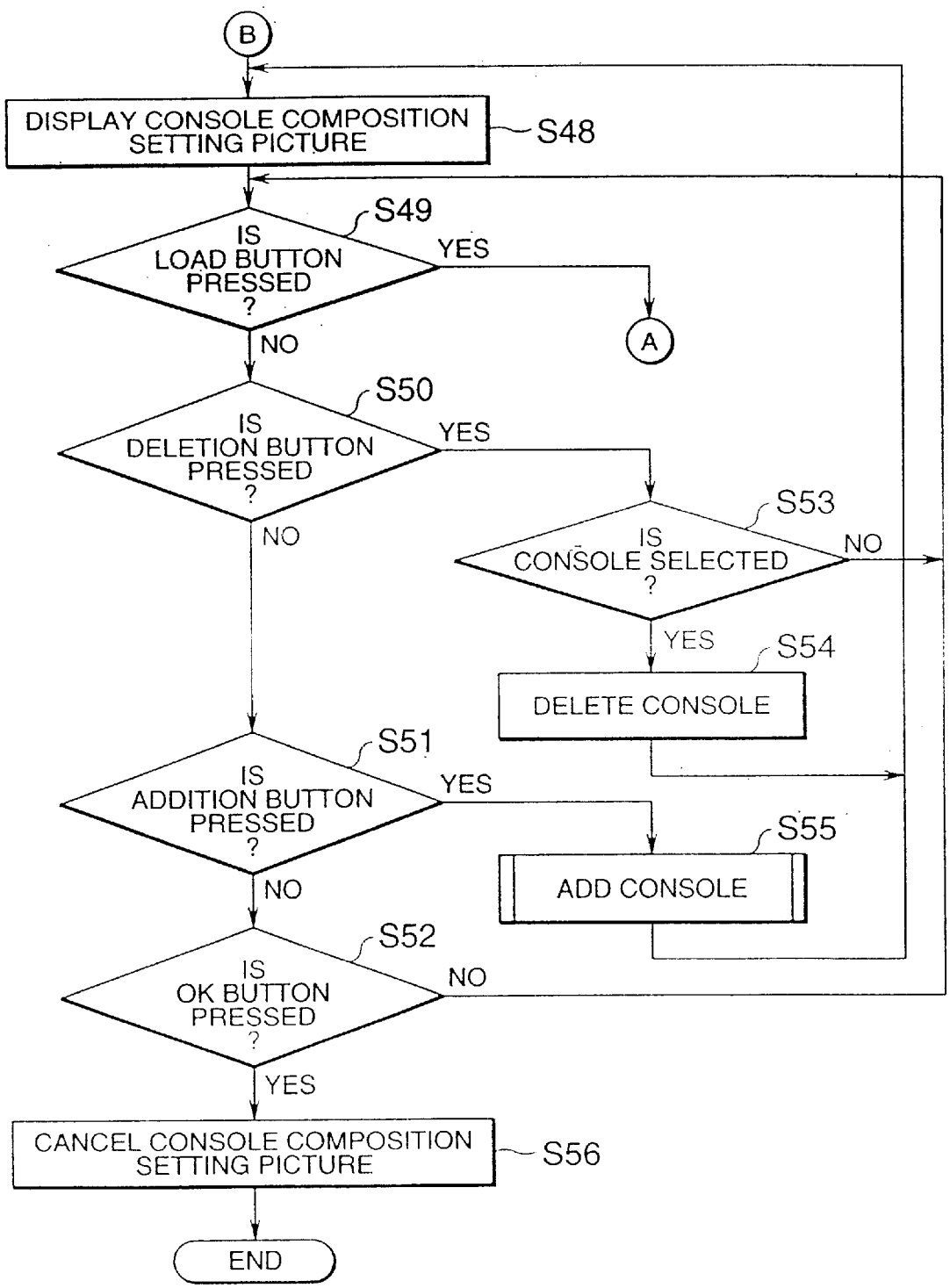
FIG. 27 is a flowchart for illustrating the processing operation of the main controller body unit in case of extending a console to the cassette library.
Figure 28:
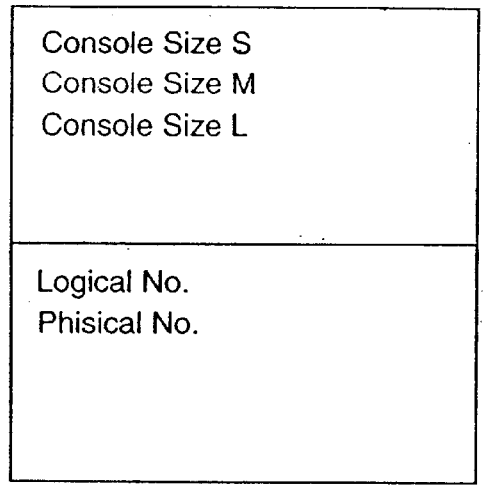
FIG. 28 shows a selective menu pop-up screen.

FIGS. 26 and 27 show flowcharts for the processing of adding the logical bin numbers for the consoles.

On startup of the library controller 2, the main controller body unit 21 in the library controller 2 checks at S41 whether or not the console composition of the cassette library 1 has been set. If the result of check at this step S41 is YES, that is if the console composition in the cassette library 1 has been set, the main controller body unit 21 proceeds to step S45. If the result of check at this step S41 is NO, that is if the console composition in the cassette library 1 has not been set, the main controller body unit 21 proceeds to the next step S42.

At this step S42, the main controller body unit 21 acquires the console composition of the cassette library 1.

At the next step S43, the main controller body unit 21 associates the physical console numbers with the logical console numbers by data indicating the console composition. Specifically, the logical console numbers are allocated to the respective consoles in the order of lines 1, 2, 3, . . . . First, the physical console numbers are allocated in the line 1 in the order of the physical console numbers 1, 2, 3, . . . . Then, in the line 2, the ensuing logical console numbers are allocated in the order of the physical console numbers 1, 2, 3, . . . . If the consoles are connected as shown for example in FIG. 1, the logical console numbers 1, 2, 3 are sequentially allocated from the line 1, while the logical console numbers are allocated from the line 1 to form serial numbers.

At the next step S44, the main controller body unit 21 allocates the logical bin numbers up to the last number, from one logical console number to another. Here, the above-mentioned logical numbers are allocated to the bins in the totality of consoles. The logical bin numbers are allocated in the order of the logical console numbers.

At the next step S45, the main controller body unit 21 displays the main picture for control 90 on the display device 23.

At the next step S46, the main controller body unit 21 displays the console configuration on the main picture for control 90 responsive to the actuating input. If there is made an actuating input for a M size console configuration, the main controller body unit 21 displays the main picture for control 90 shown in FIG. 11. If there is made an actuating input of the console configuration of the S size physical console number, the main controller body unit 21 displays the main picture for control 90 shown in FIG. 20, whereas, if there is made an actuating input of the console configuration of the S size logical number, the main controller body unit 21 displays the main picture for control 90 shown in FIG. 21. For changing the size, physical number of the logical number, a cursor is put on a marginal portion other than the display portion of the console, on the main picture for control 90 shown for example in FIG. 21, and the mouse is right-clicked. This displays a selection menu pop-up shown in FIG. 28. In the pop-up, there is displayed a selection menu of the physical and logical numbers for the L-size, in addition to that for the S size and the M-size, mentioned above. In FIG. 11, one line for the L-size is shown. The number is indicated in a desired size by selecting an item desired to be displayed on the main picture for control 90 by a cursor.

Figure 37:
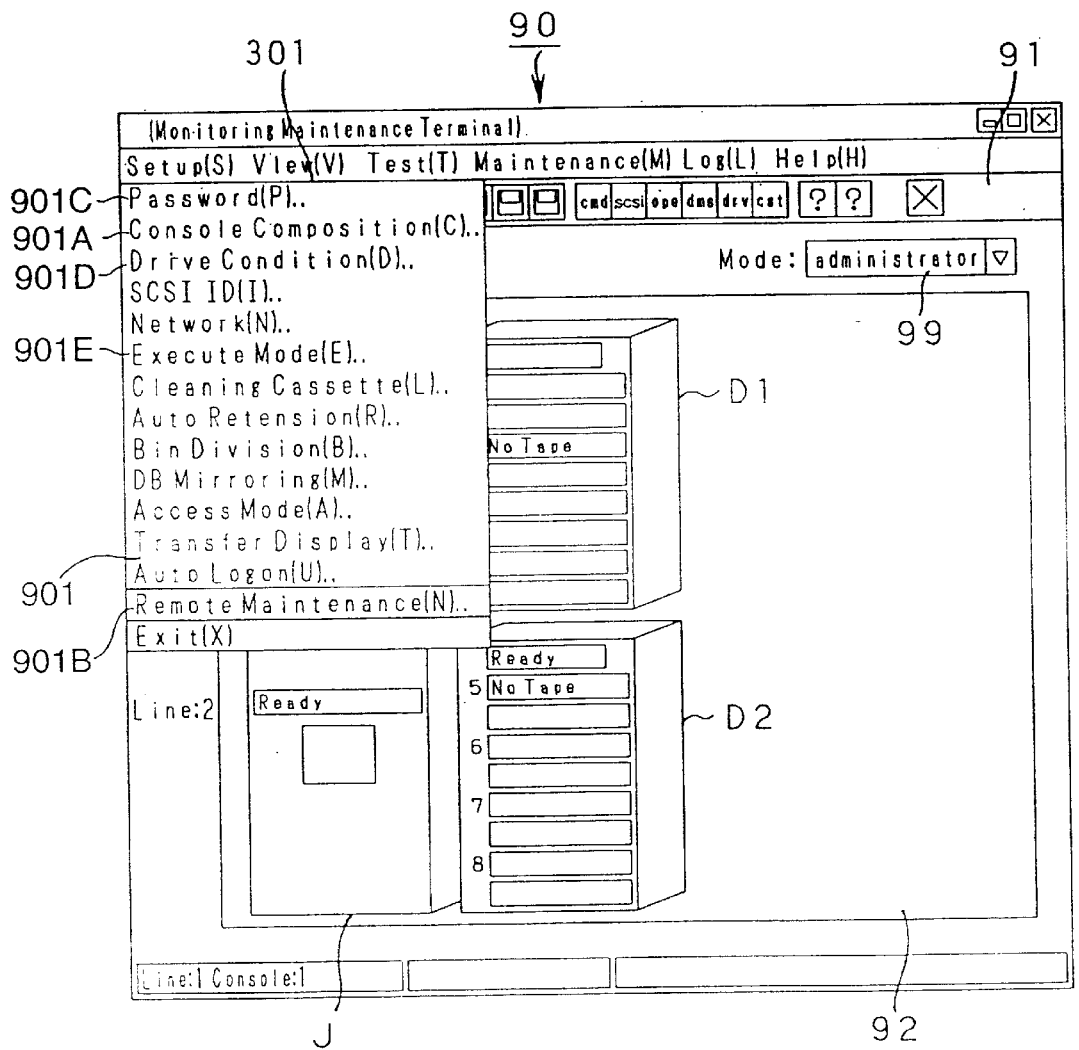
FIG. 37 shows a console setting structure picture.

At the next step S47, the main controller body unit 21 checks whether or not an item [Console Composition] of the setup menu [Setup(S)] of the main picture for control 90 has been selected. If the result of check at step S47 is YES, that is if the item [Console Composition] has been selected, the main controller body unit 21 proceeds to step S48 shown in FIG. 27. If the result of check at step S47 is NO, that is if the item [Console Composition] has not been selected, the main controller body unit 21 repeats the check of step S47. Specifically, if the setup menu [Setup(S)] of the main picture for control 90 has been selected, as shown in FIG. 37, a pull-down menu 901 is displayed. It is then checked whether or not an item [Console Composition(C)] 901 A in the pull-down menu 901 has been selected.

Figure 29:
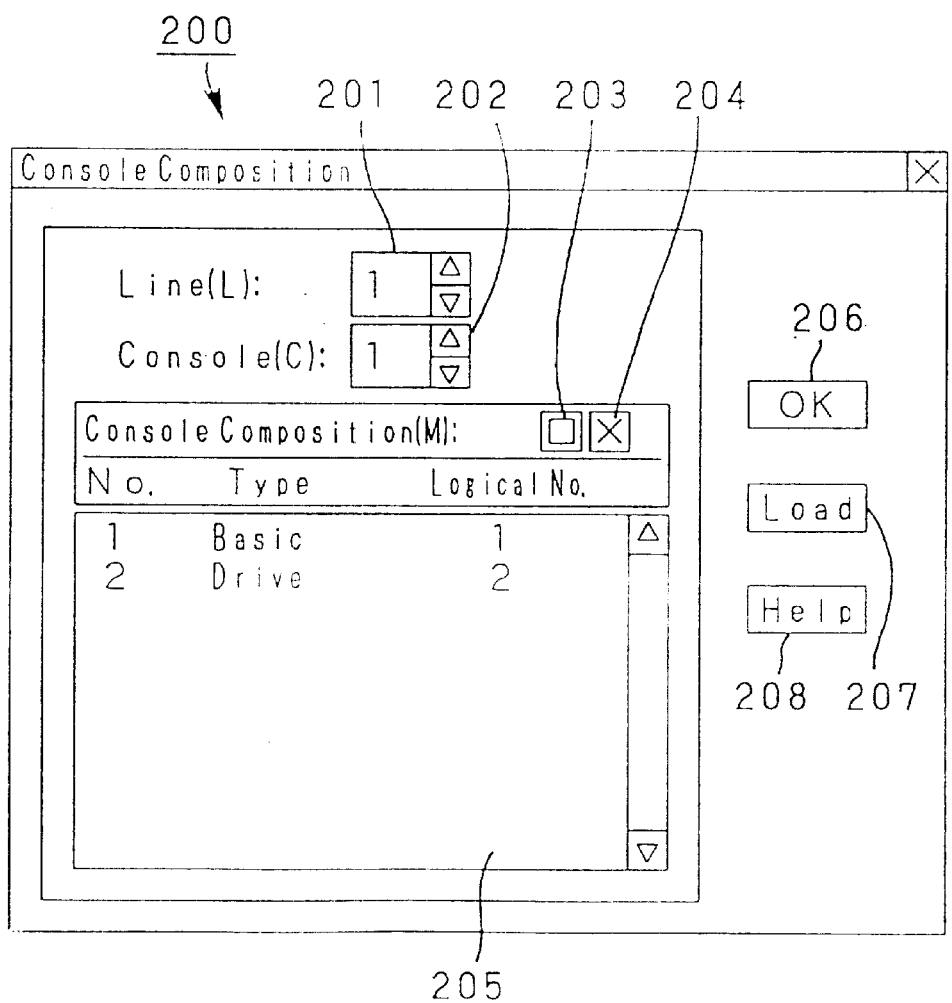
FIG. 29 shows a console setting structure picture.

At step S48 shown in FIG. 27, the main controller body unit 21 causes a console setting composition picture 200 shown in FIG. 29 to be displayed on the display device 23. That is, if the item [Console Composition] of the setup menu [Setup(S)] of the main picture for control 90 has been selected, the console setting composition picture 200 shown in FIG. 29 is displayed.

The console setting composition picture 200 has a line box 201 for specifying a line of a console to be extended, a console box 202 for specifying the physical console number of a console to be extended, an addition button 202 for specifying the physical console number of the console to be extended, an addition button 203 for additionally registering console to be extended, a deletion button 204 for deleting a console, a console composition display area 205, an OK button 206 for setting the setting contents, a load button [Load] 207 and a help button [Help] 208 for help menu display.

The console setting composition picture 200 is a picture for setting to which console the extended console is to be connected. That is, the console setting composition picture 200 is used for setting to which console of which line the console for extension is to be connected. If, for example, the respective consoles are connected as shown in FIG. 20, and a console is to be extended to the console of the console number 2 of the line 1, that is to the driving console D1, [1] and [2] are entered to the line boxes 201 and 202, respectively. If desired to extend the console to the driving console D2, [2] and [3] are inputted to the line boxes 201 and 202, respectively.

At the next step S49, the main controller body unit 201 checks whether or not the load button [Load] 207 of the console setting composition picture 200 has been clicked. If the result of decision at this step S49 is YES, that is if the load button [Load] 207 has been clicked, the main controller body unit reverts to step S42 of FIG. 26 to acquire the console composition of the cassette library 1. If the result of decision at this step S49 is NO, that is if the load button [Load] 207 has not been clicked, the main controller body unit 21 proceeds to the next step S50.

At step S50, the main controller body unit 21 decides whether or not the deletion button 204 of the console setting composition picture 200 has been clicked. If the result of decision at this step S50 is YES, that is if the deletion button 204 has been clicked, the main controller body unit 21 proceeds to step S53 to perform processing for deletion. If the result of decision at this step S50 is NO, that is if the deletion button 204 has not been clicked, the main controller body unit 21 proceeds to the next step S51.

At step S51, the main controller body unit 21 decides whether or not the addition button 203 of the console setting composition picture 200 has been clicked. If the result of decision at this step S51 is YES, that is if the addition button 203 has been clicked, the main controller body unit 21 proceeds to step S56. If the result of decision at this step S51 is NO, that is if the addition button 203 has not been clicked, the main controller body unit 21 proceeds to the next step S52.

At step S52, the main controller body unit 21 decides whether or not the OK button 206 of the console setting composition picture 200 has been clicked. If the result of decision at this step S52 is YES, that is if the OK button 206 has been clicked, the main controller body unit 201 proceeds to step S56. If the result of decision at this step S52 is NO, that is if the OK button 206 has not been clicked, the main controller body unit 21 reverts to step S49 to re-check whether or not the load button [Load] 207 has been clicked.

At step S53, the main controller body unit 21 decides whether or not there is any selected console among the consoles displayed on a console composition display area 205. If the result of decision at this step S53 is YES, that is if there is the selected console, the main controller body unit 21 proceeds to the next step S54. If the result of decision at this step S53 is NO, that is if there is no selected console, the main controller body unit 21 reverts to step S49 to re-check whether or not the load button [Load] 207 of the console setting composition picture 200 has been clicked.

At step S54, the main controller body unit 21 executes the processing of deleting the selected console from the composition of the cassette library 1. The main controller body unit 21 then reverts to step S48 to display on the display device 23 the console setting composition picture 200 in which the selected console is deleted from the composition of the cassette library 1.

When it is verified that the addition button 203 has been clicked at step S51, the main controller body unit 21 proceeds to step S55 to perform the processing of adding the console. The main controller body unit 21 reverts to step S48 to display on the display device 23 the console setting composition picture 200 to which the console has been added.

Figure 30:
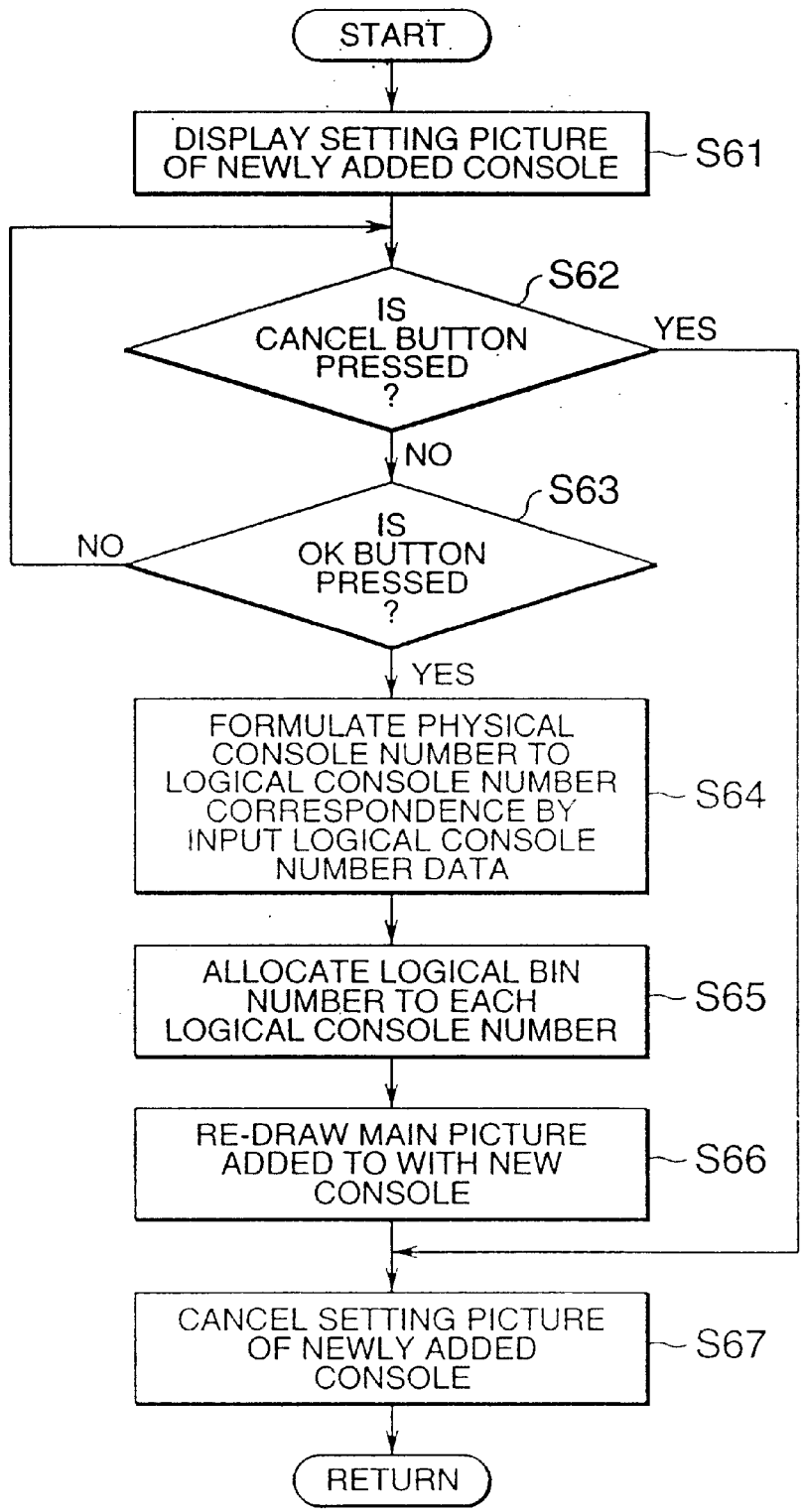
FIG. 30 is a flowchart of a subroutine for illustrating the processing operation of the main controller body unit in case of console extension in the cassette library.

At step S55, the main controller body unit 21 executes the subroutine processing of steps S61 and the following steps shown in FIG. 30 to perform console addition processing.

Figure 31:
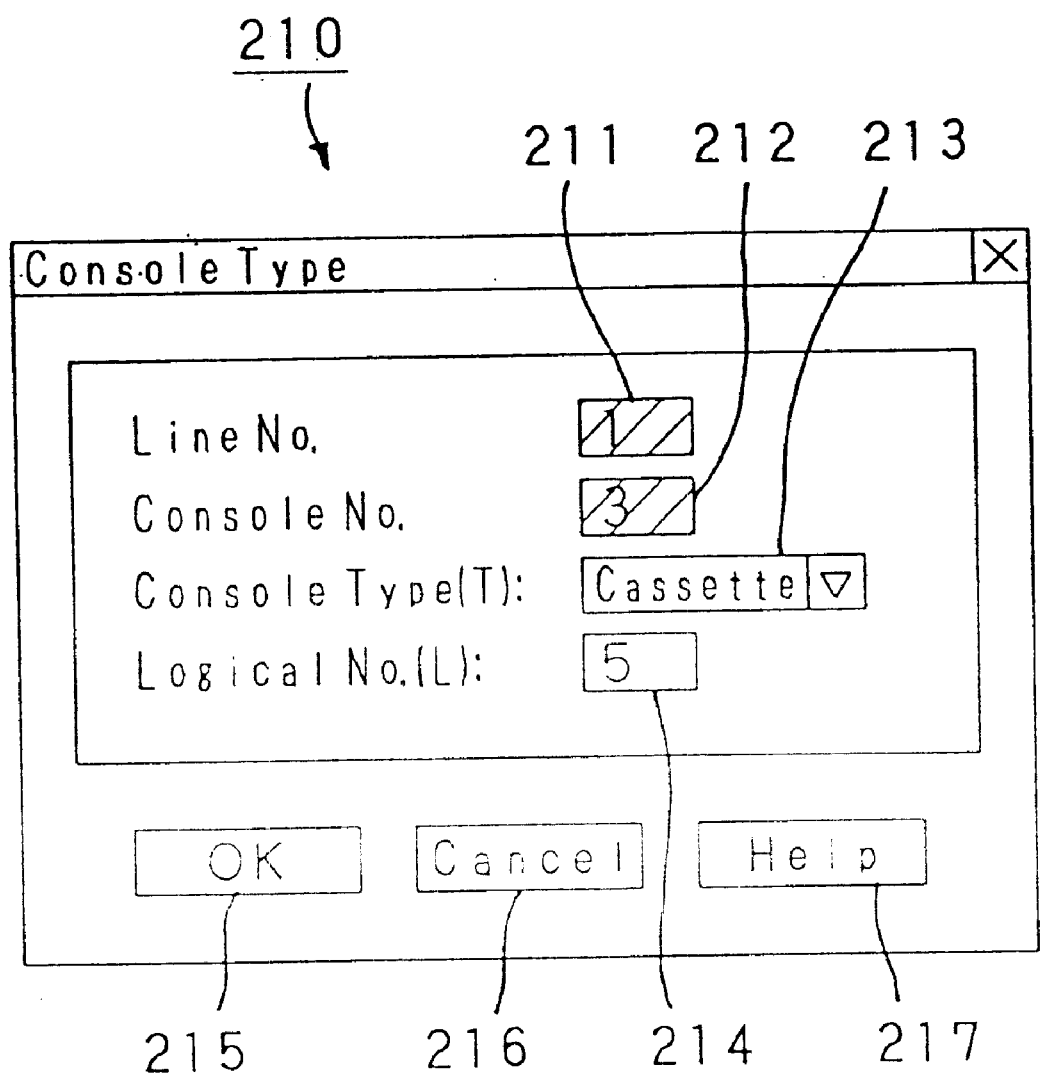
FIG. 31 shows a new addition console setting display picture.

That is, at step S61, the main controller body unit 21 causes a new addition console setting display picture 210 of FIG. 31 to be displayed on the display device 23. The new addition console setting display picture 210 is displayed by selecting the addition button 203 of the console setting composition picture 200 of FIG. 29 by a cursor. Specifically, a console of the source of connection of the console desired to be added is set on the console setting composition picture 200 and subsequently the new addition console setting display picture 210 is displayed for allocating the logical number of the console for addition.

The new addition console setting display picture 210 includes a line number (Line No.) box 211 for displaying a line number, a console number (Console No.) box 212 for displaying the console number, a console type (Console Type) box 213 for selecting the console type, a logical console number (Logical No.) box 214, an OK button 215, a cancel button [Cancel] 216 and a help [Help] button 217 for help menu display.

The line number (Line No.) Box 211 is adapted to display the same console string number as that entered to the line box 201 shown in FIG. 29. The user is not permitted to enter a numerical figure. The console number (Console No.) box 212 is adapted to display the same numerical figure as that in the console box 202. However, entry by the user is not permitted. The console type (Console Type) box 213 is used for selecting the type of the console to be added. In the logical console number (Logical No.) box 214, the user is able to select and input a logical console number. That is, the logical console number can be set to a desired value and registered by the user.

At step S62, the main controller body unit 21 decides whether or not the cancel button [Cancel] 216 of the new addition console setting display picture 210 has been clicked. If the result of check at step S62 is YES, that is if the cancel button [Cancel] 216 has been clicked, the main controller body unit 21 proceeds to step S67. If the result of check at step S62 is NO, that is if the cancel button [Cancel] 216 has not been clicked, the main controller body unit 21 proceeds to the next step S63.

At step S63, the main controller body unit 21 decides whether or not the OK button 215 of the new addition console setting display picture 210 has been clicked. If the result of decision at this step S63 is YES, that is if the OK button 215 has been clicked, the main controller body unit 21 proceeds to the next step S64. If the result of decision at this step S63 is NO, that is if the OK button 215 has not been clicked, the main controller body unit 21 reverts to step S62 to re-check whether or not the cancel button [Cancel] 216 has been clicked.

At step S64, the main controller body unit 21 associates the physical console numbers and the logical console numbers with each other, based on the data of the logical console numbers inputted to the logical console number (Logical No.) box 214.

At the next step S65, the main controller body unit 21 allocates the logical bin numbers from one logical console number to another.

Figure 32:
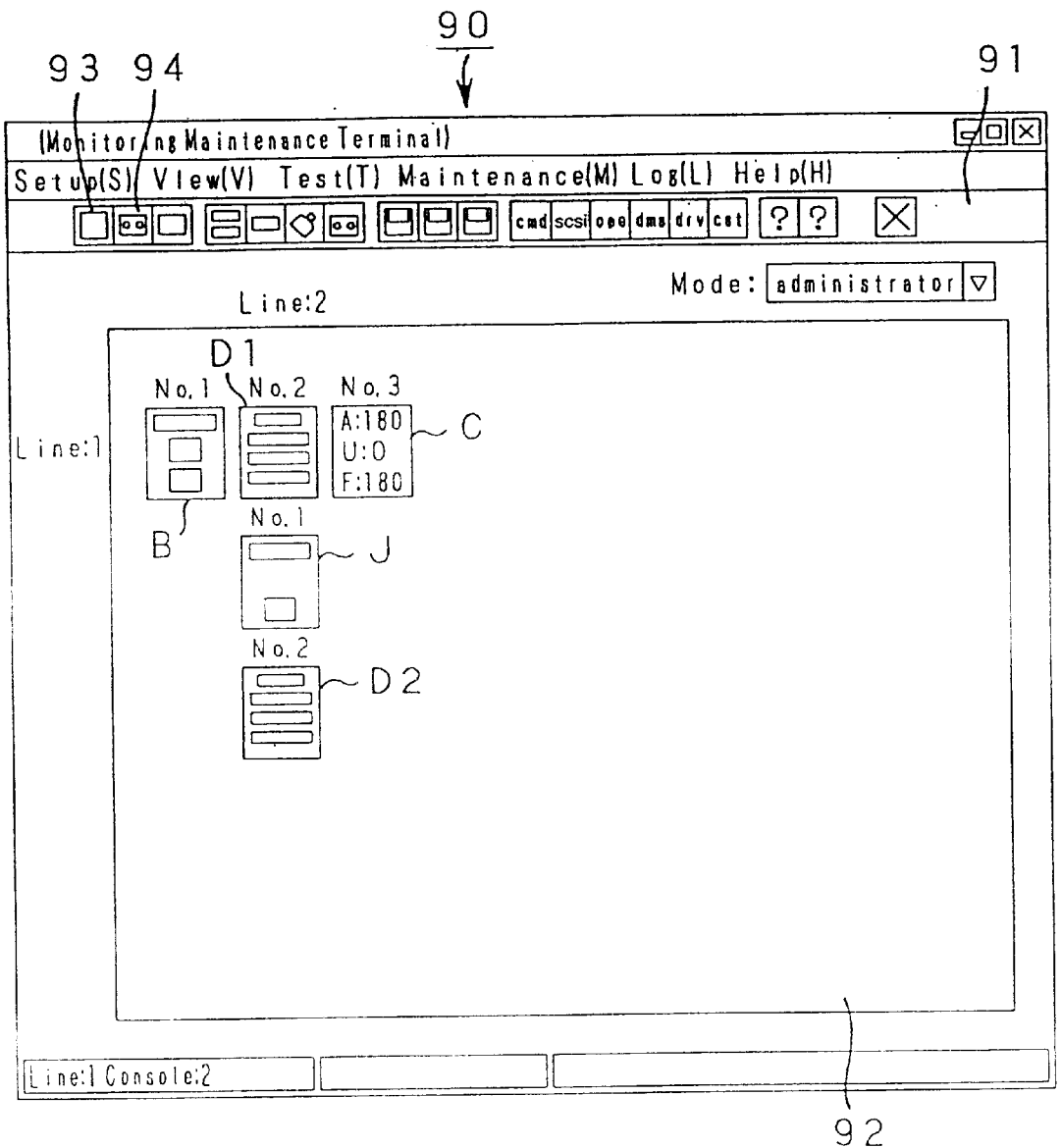
FIG. 32 shows a main picture after extension of a cassette console.

At the next step S66, the main controller body unit 21 displays on the display device 23 the main picture for control 90 indicating the added cassette console C, as shown in FIG. 32. That is, the main picture for control 90 of FIG. 20, to which is added the cassette console C, is displayed.

On the main picture for control 90, the newly added cassette console C is displayed as the physical console number 3 of the console string 1, as shown in FIG. 32. Meanwhile, in the cassette console C, [A:180] indicates that a sum total of 180 cassette tapes have been stored, while [U:0] indicates that 0 cassette tape is being used, that is recorded/reproduced and [F:180] indicates that there are 180 cassette tapes not in use.

At step S67, the main controller body unit 21 cancels the new addition console setting display picture 210 of FIG. 31, displayed on the display device 23. The main controller body unit 21 then reverts to step S48 shown in FIG. 27 to cause the console setting composition picture 200 to be newly displayed on the display device 23.

If the main controller body unit 21 decides at step S52 of FIG. 27 that the OK button 206 of the console setting composition picture 200 has been clicked, the main controller body unit 21 proceeds to step S56 to cancel the console setting composition picture 200 indicated on the display device 23 to terminate the processing.

Figure 33:
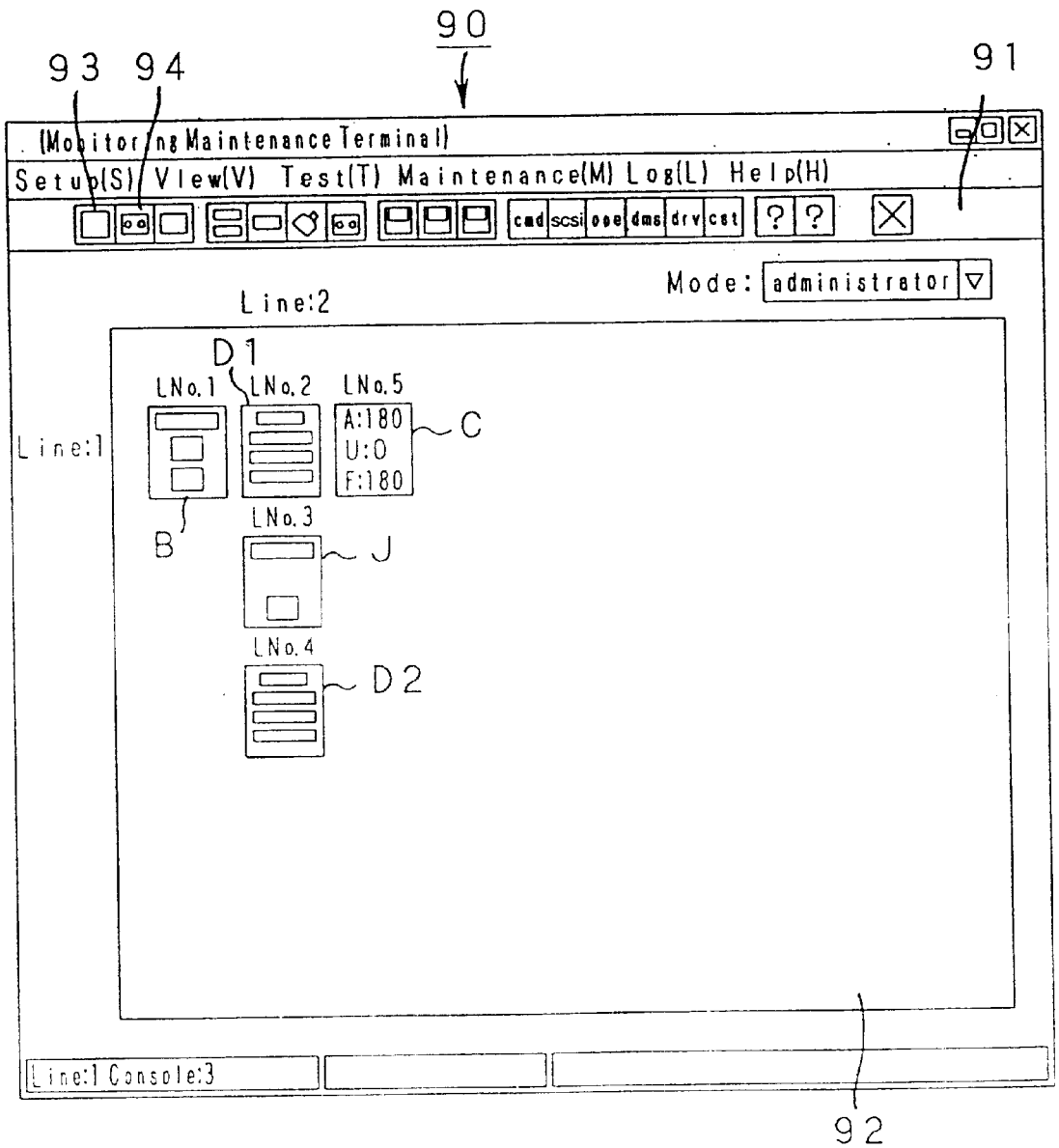
FIG. 33, similarly to FIG. 32, shows a main picture after extension of a cassette console.

By the above processing, the main picture for control 90 shown in FIG. 33 is displayed.

The main picture for control 90 shows the respective consoles by the logical console numbers. That is, the basic console B has the logical console number of 1, while the driving console D1 has the logical console number of 2. The junction console J has the logical console number of 3 and the driving console D2 has the logical console number of 4, in the same way as in FIG. 21. That is, if the cassette console C is added, the logical console number prior to addition is not changed.

Figure 34:
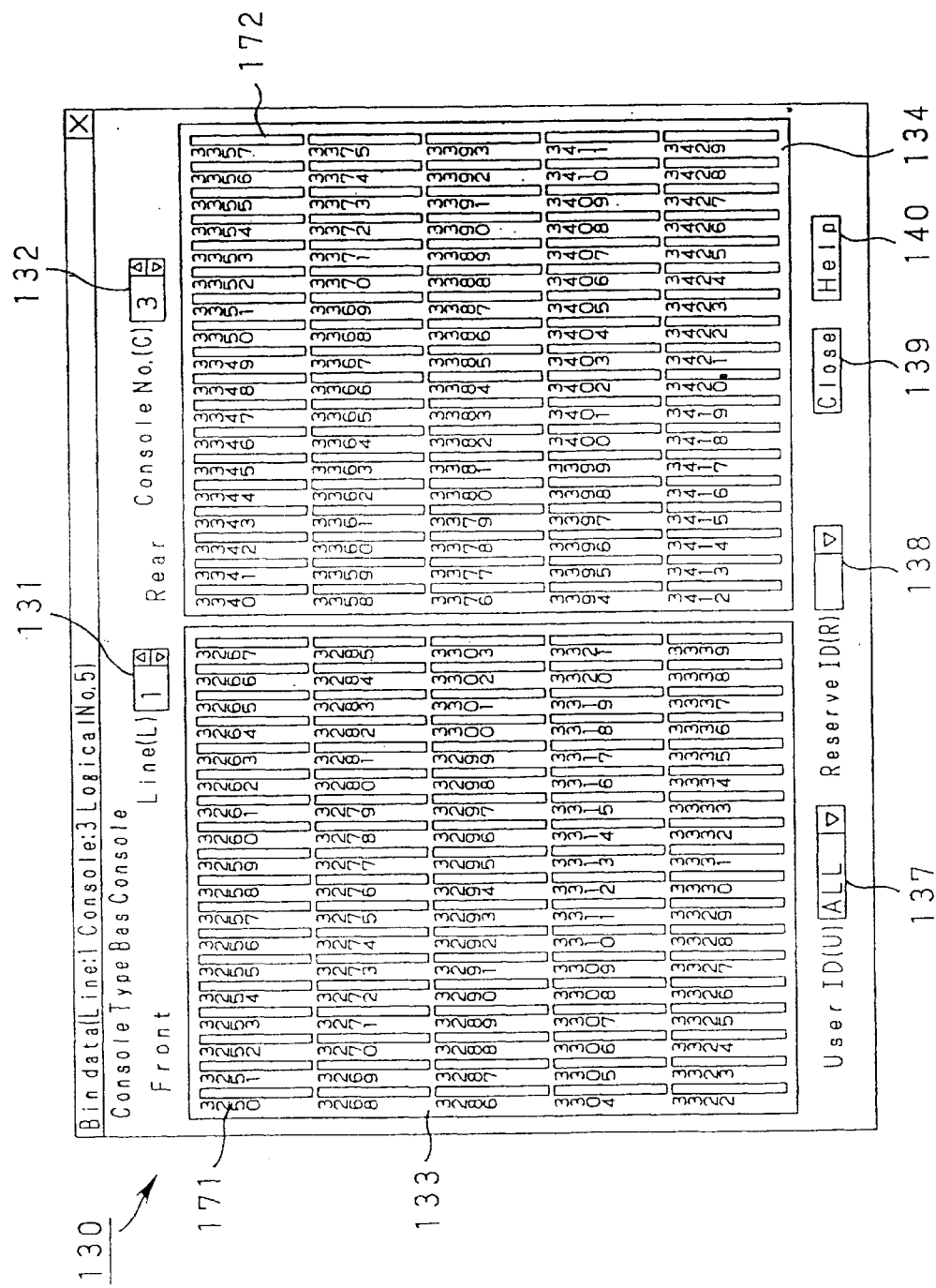
FIG. 34 shows a bin data window showing a logical bin number of the cassette console.

FIG. 34 shows a pin data window 130 of the added cassette console C. The pin data window 130 displays 90 cassette bins 171 on the front display area 133, while displaying 90 cassette bins 172 on the rear display area 134.

The cassette bins 171 of the front display area 133 are of the logical bin numbers of 3250 to 3339. That is, these logical bin numbers are consecutive logical bin numbers to the logical bin number 3249 of the cassette bin of the driving console D2 shown in FIG. 25. The cassette bins 172 of the rear display area 134 are of the logical bin numbers of 3340 to 3429.

That is, since the last logical bin number 3249 in the driving console D2 of the logical console number 4 is consecutive to the logical bin number of the cassette console C having the added logical console number 5, the previously allocated console logical bin numbers remain unchanged, even if new consoles are added. Therefore, there is no necessity of the logical bin numbers registered in the library controller 2. This permits the cassette console C to be controlled easily without significantly changing the upper-order application in the library controller 2.

Figure 35:
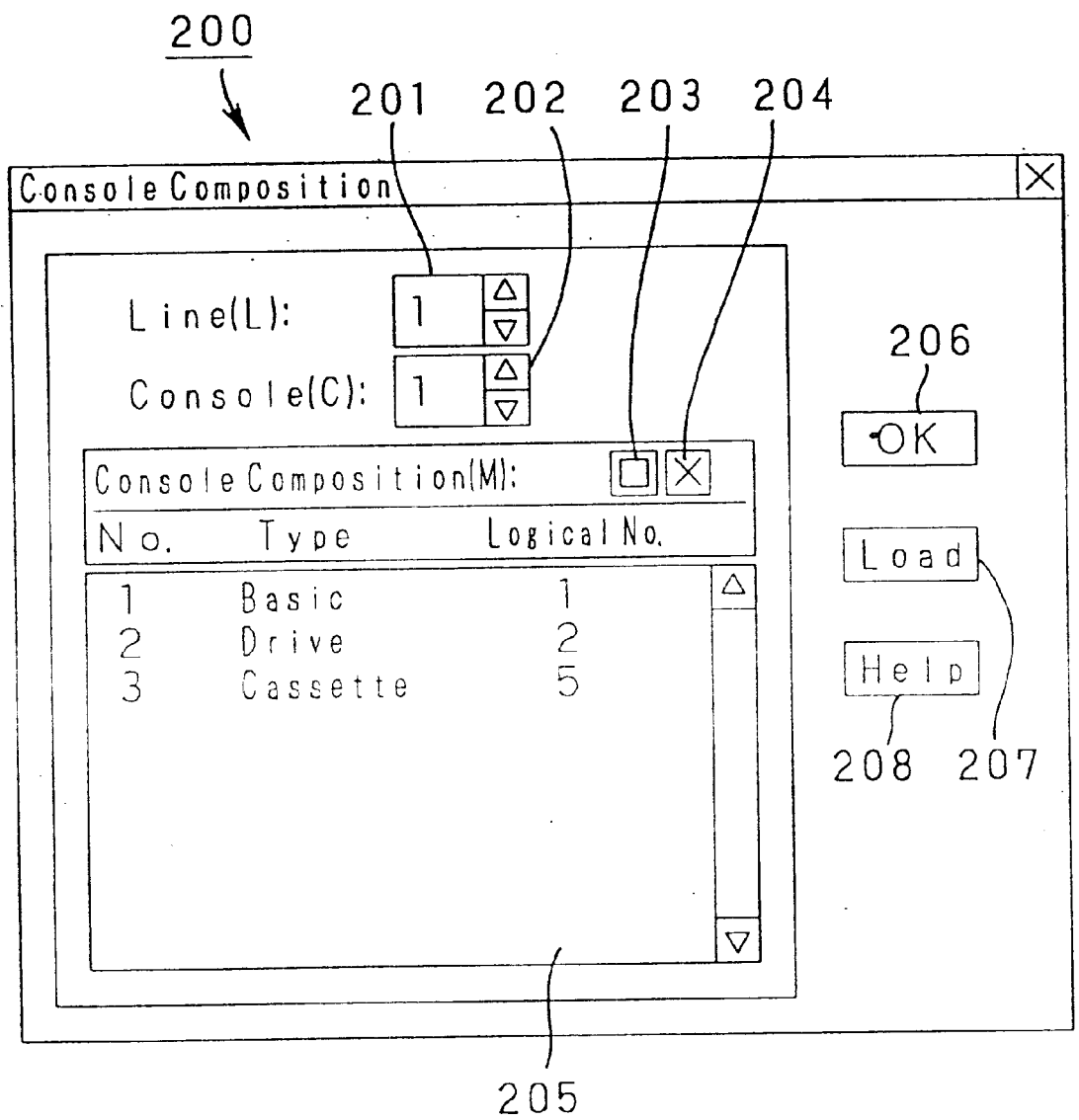
FIG. 35 shows a console setting structure picture.

If a new console is added to the console string 1, it is sufficient if the console setting composition picture 200 is displayed to perform console addition processing, described above, as shown in FIG. 35.

The above-described functions can be used not only for extending the consoles but also for adding new consoles between the consoles or changing the logical console number or the logical bin number depending on the application in use.

5. Remote Control (5-1) Host Side Processing

The cassette library system is configured not only for remote-controlling the cassette library 1 but also for preventing unauthorized action by a third party during remote control. In connection with the processing for preventing unauthorized action at the time of a remote control operation from the remote controllers 2A, 2B, as shown in FIG. 5, first of all, the processing of the library controller 2 and that of the remote controllers 2A, 2B, is explained.

First, the processing for prevention of unauthorized operation of the library controller 2 on remote control is explained in detail with reference to FIGS. 36 to 43.

Figure 36:
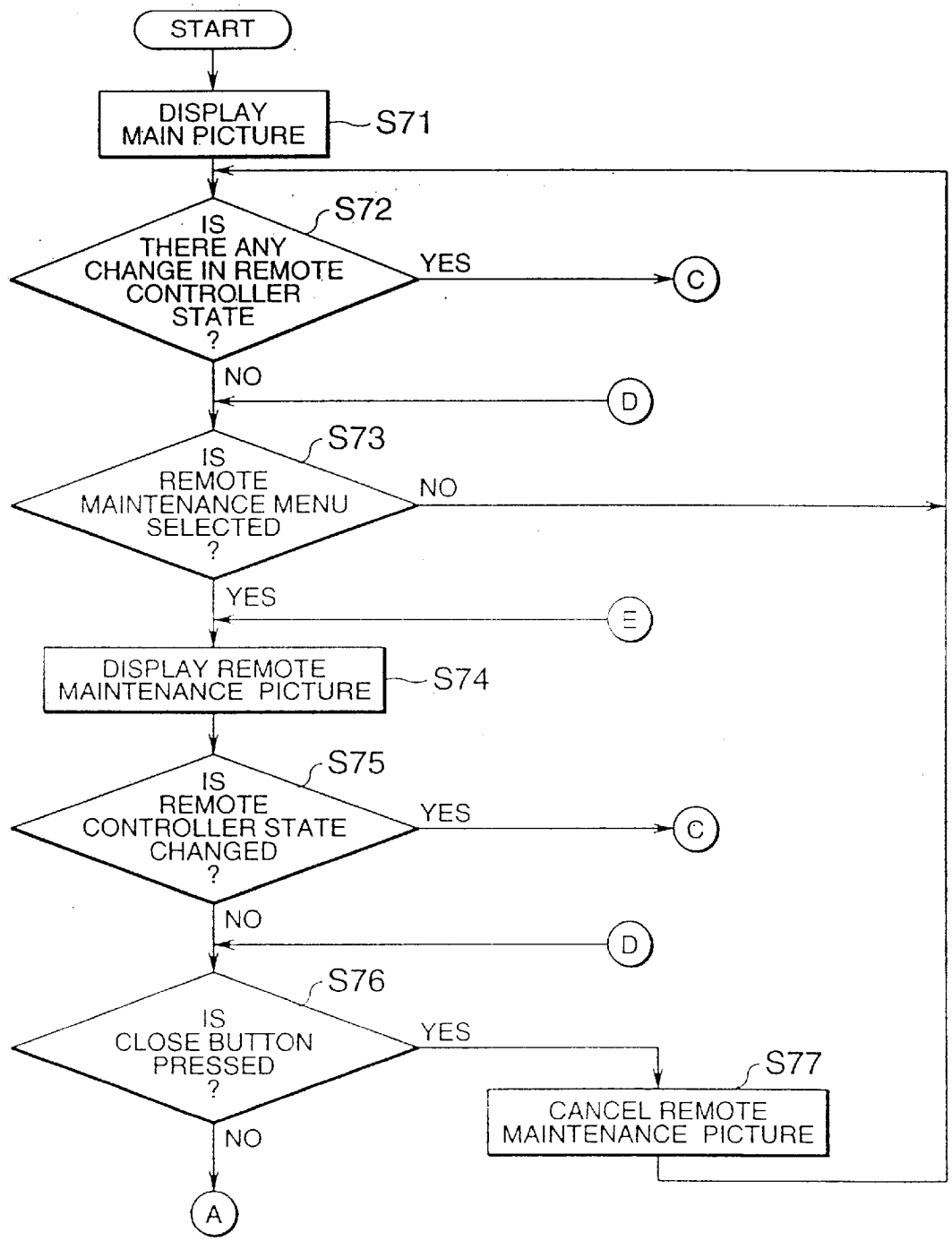
FIG. 36 is a flowchart for illustrating the operational processing of the main controller body unit at the time of remote control.

On startup of the library controller 2, the main controller body unit 21 of the library controller 2 executes the processing as from step S71 shown in FIG. 36.

At step S71, the main controller body unit 21 causes the main picture for control 90 of FIG. 11 to be displayed on the display device 23.

At the next step S72, the main controller body unit 21 checks whether or not there is any change caused in the state of the first remote controller 2A. If the result of decision at this step S72 is YES, that is if there has been any change in the state of the first remote controller 2A, the main controller body unit 21 proceeds to step S101 shown in FIG. 41. If the result of decision at this step S72 is NO, that is if there has been no change in the state of the first remote controller 2A, the main controller body unit 21 proceeds to the next step S73. This status change in the first remote controller 2A is checked depending on whether or not a connection or disconnection request signal has been inputted from the first remote controller 2A to the library controller 2.

At step S73, the main controller body unit 21 checks whether or not a remote maintenance menu has been selected from the main picture for control 90. If the result of check at this step S73 is YES, that is if the remote maintenance menu has been selected, the main controller body unit 21 proceeds to step S74 and, if otherwise, reverts to step S72. Specifically, the main controller body unit 21 checks whether or not the setup menu [Setup(S)] on the main picture for control 90 has been clicked to display the pull-down menu 901, and the item [Remote Maintenance (N)] 901B has been clicked, as shown in FIG. 37.

Figure 38:
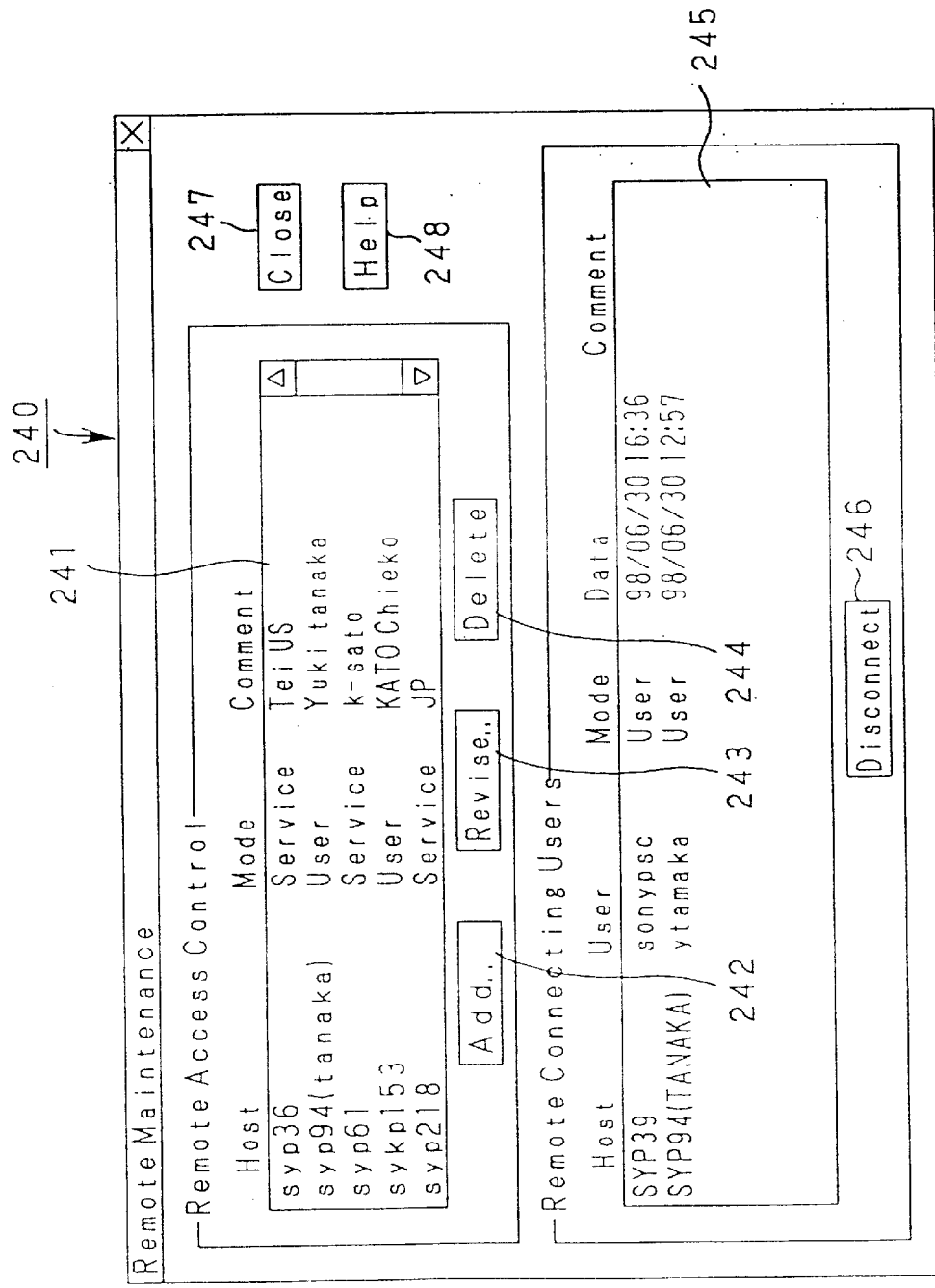
FIG. 38 shows a remote maintenance picture.

If the item [Remote Maintenance(N)] 901B has been clicked, the main controller body unit 21 proceeds to step S74 to display a remote maintenance picture 240 of FIG. 38 on the display device 23.

The remote maintenance picture 240 includes a remote access control [Remote Access Control)] list box 241, an addition [Add] button 242, a change [Revise] button 243, a deletion [Delete] button 244, a remote connection user (Remote Connecting Users) list box 245, a disconnect [Disconnect] button 246, a close button [Close] button 247 for closing the picture, and a help [Help] button 248 for help menu display.

In the remote access control list box 241, there is displayed a list of host names of the remote controllers registered in the main controller body unit 21, permitted modes, that is service mode or user mode, and comments. The service mode or user mode are provided for the modes in order to differentiate the control contents between the host as set in the service mode and the host as set in the user mode, as will be explained subsequently in detail.

The add button [Add] 242 is used when additionally registering a new remote controller in the main controller body unit 21. If the add button [Add] 242 is clicked, a remote access control dialog box, as later explained, is displayed.

The change [Revise] button 243 is used when the previously registered remote controller is selected from the remote access control list box 241 to change the contents of the remote controller.

The deletion [Delete] button 244 is used when the previously registered remote controller is selected from the remote access control list box 241 for deleting the selected remote controller.

In the remote connection user list box 245, the host name of the remote controller currently accessing the main controller body unit 21, user name (login name of the remote controller), mode, date and time of connection, and comments inputted by the user of the remote controller at the time of the connection.

The disconnect [Disconnect] button 246 is used for selecting the currently accessed remote controller from the remote connection user list box 245 to cause forced access disconnection.

At step S75, the main controller body unit 21 decides whether or not there has been any change in the state of the first remote controller 2A. If the result of check at this step S75 is YES, that is if there is any change in the status of the first remote controller 2A, the main controller body unit 21 proceeds to step S101 shown in FIG. 42. If the result of check is NO, that is if there is no change in the status of the first remote controller 2A, the main controller body unit 21 proceeds to step S76. That is, if a request signal for connection or disconnection is inputted from the remote controllers 2A, 2B, the main controller body unit 21 proceeds to step S101 and, if otherwise, to step S76.

At step S76, the main controller body unit 21 checks whether or not the close button [Close] button 247 of the remote maintenance picture 240 shown in FIG. 38 has been clicked. If the result of check at this step S76 is YES, that is if the close button [Close] button 247 has been clicked, the main controller body unit 21 proceeds to step S77. If otherwise, the main controller body unit proceeds to step S78 shown in FIG. 79.

At step S77, the main controller body unit 21 cancels the remote maintenance picture 240 indicated on the display device 23. The main controller body unit 21 then reverts to step S72 to re-check whether or not there is any change in the status of the first remote controller 2A.

Figure 39:
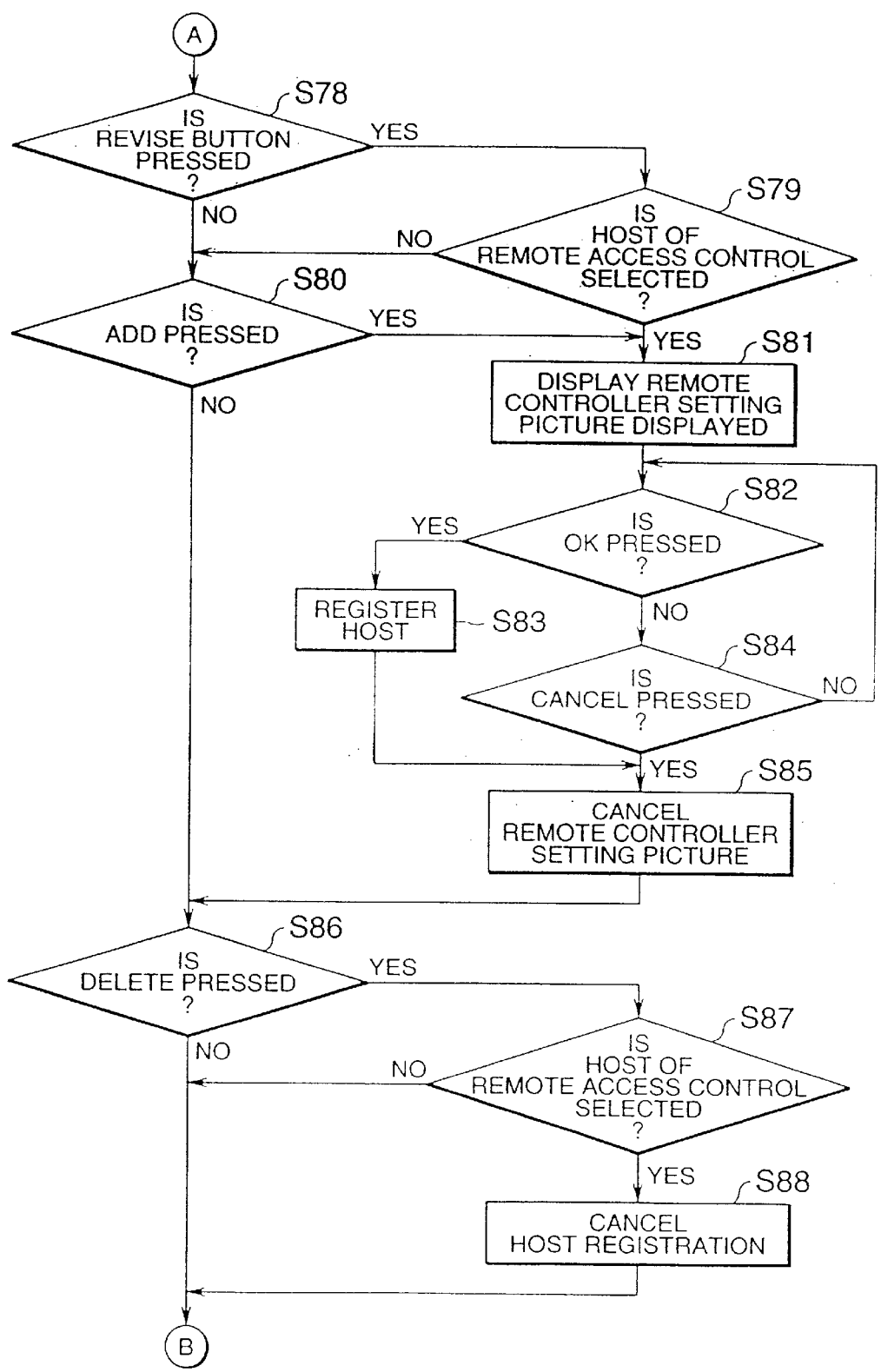
FIG. 39 is a flowchart for illustrating the operational processing of the main controller body unit at the time of remote control.

At step S78, shown in FIG. 39, the main controller body unit 21 checks whether or not the change [Revise] button 243 in the remote maintenance picture 240 has been clicked. If the result of check at this step S78 is YES, that is if the change [Revise] button 243 has been clicked, the main controller body unit 21 proceeds to step S79. If the result of check at this step S78 is NO, that is if the change [Revise] button 243 has not been clicked, the main controller body unit 21 proceeds to step S80.

At step S79, the main controller body unit 21 checks whether or not any host registered in the remote access control list box 241 has been selected. If the result of check at this step S79 is YES, that is if any host has been selected, the main controller body unit 21 proceeds to step S81. If the result of check at this step S79 is NO, that is if no host has been selected, the main controller body unit 21 proceeds to the next step S80.

At step S80, the main controller body unit 21 checks whether or not the addition [Add] button 242 in the remote maintenance picture 240 has been clicked. If the result of check at this step S80 is YES, that is if the addition [Add] button 242 has been clicked, the main controller body unit 21 proceeds to the next step S81. If the result of check at this step S80 is NO, that is if the addition [Add] button 242 has not been clicked, the main controller body unit 21 proceeds to S86.

Figure 40:
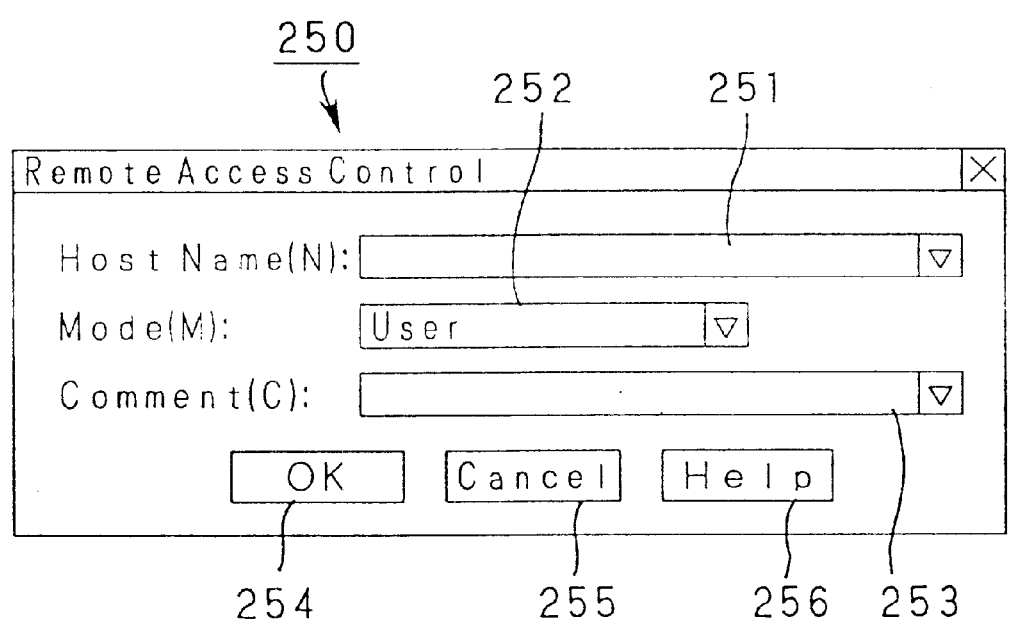
FIG. 40 shows a remote access control dialog box.
Figure 41:
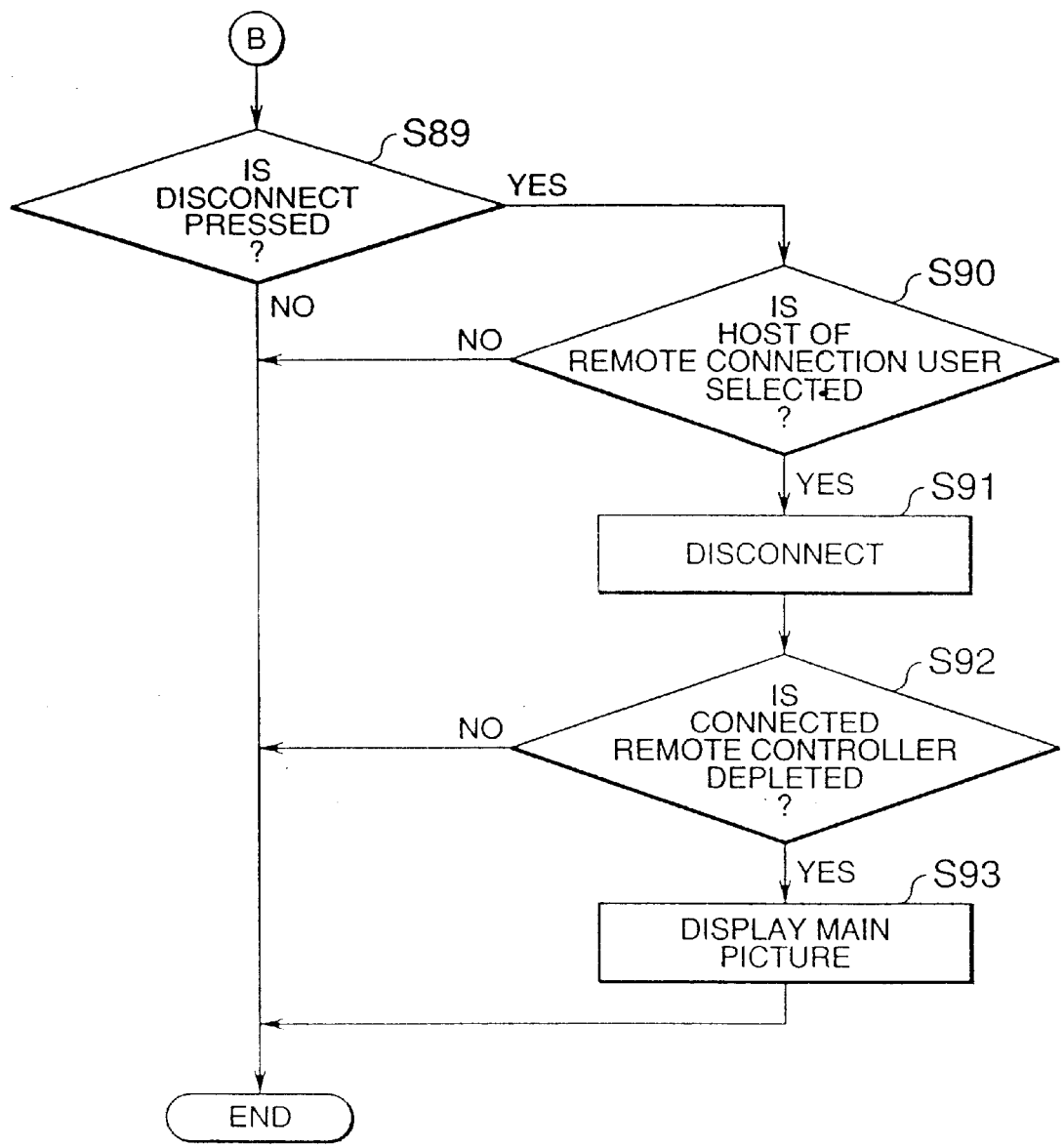
FIG. 41 is a flowchart for illustrating the operational processing of the main controller body unit at the time of remote control.

At step S81, the main controller body unit 21 causes a remote controller setting picture, that is the remote access control (Remote Access Control) dialog box 250 of FIG. 40, to be displayed on the display device 23. That is, if the addition [Add] button 242 of the remote maintenance picture 240 shown in FIG. 38 is clicked with a mouse, the remote access control dialog box 250 is displayed.

The remote access control dialog box 250 is used for registering and changing the remote controller that is accessible to the main controller body unit 21. That is, if a host etc in the remote access control list box 241 of the remote maintenance picture 240 is selected and the addition [Add] button 242 clicked, the remote controller is changed. If no selection is made in the remote access control list box 241 and the addition [Add] button 242 is clicked, the remote controller is registered. The remote access control dialog box 250 includes a host name [Host Name] dropdown list box 251, a mode [Mode] dropdown list box 252, a comment (Comment) dropdown list box 253, an OK button 254, a cancel button [Cancel] 255 and a help button for help menu display, as shown in FIG. 40.

The host name dropdown list box 251 is used for specifying a host name for a remote controller for registration.

The mode dropdown list box 252 is used for selecting an operating mode, permitted for the remote controller to be registered, from the user mode, service mode and the disable mode. The user mode mainly means an operating mode for confirming the host-side processing on the remote controller side. It is not possible for the remote controller to perform the processing affecting the operation of the library system, such as the setting of the cassette library 1. The service mode mainly means an operating mode in which the processing substantially equal to that on the host side can be performed. In this service mode, it is possible to perform the operation substantially equivalent to the operation of a supervisor operating the library controller 2, such as setting or actuation of the cassette library 1 by the remote controller. The disable mode is such an operating mode in which the remote controller is transiently registered in the remote access control list box 241 and access is allowed temporarily, while remote accessing is not allowed as a principle.

The comment dropdown list box 253 is used for inputting a comment to the remote controller. The comment inputted to the comment dropdown list box 253 is displayed on the remote access control list box 241.

At step S82, the main controller body unit 21 checks whether or not necessary data is entered in the respective items of the remote access control dialog box 250 and the OK button 254 has been clicked. If the result of check at this step is YES, that is if the OK button 254 has been clicked, the main controller body unit 21 proceeds to step S83. If the result of check at this step is NO, that is if the OK button 254 has not been clicked, the main controller body unit 21 proceeds to step S84.

At step S83, the main controller body unit 21 registers the host name, entered to the host name dropdown list box 251, or the operational mode entered to the mode dropdown list box 252, on a recording medium of the main controller body unit 21, such as a hard disc or a semiconductor memory. The main controller body unit 21 then proceeds to step S85.

Since the operational mode can be registered in the remote controller, that is able to perform remote control, it is possible to set the service mode for a trustworthy remote control user, and to set user mode for a less trustworthy remote control user. Thus, the remote control user is able to perform an operation depending on the creditability with the host side.

It is also possible to set a disable mode, to prohibit remote control as a principle and to permit remote control if a demand is raised from a remote controller. In this case, since the remote controller has been registered in the remote access control list box 241, the main controller body unit 21 can immediately permit remote accessing.

At step S84, the main controller body unit 21 checks whether or not the cancel button [Cancel] 255 of the remote access control dialog box 250 has been clicked, that is whether or not the cancel button [Cancel] 255 has been clicked with a mouse. The cancel button [Cancel] 255 of the remote access control dialog box 250 is clicked with the mouse if it is desired to close the remote access control dialog box 250 without registering the input item of the remote access control dialog box 250. If the result of decision at step S84 is YES, that is if the cancel button [Cancel] 255 is clicked, the main controller body unit 21 proceeds to the next step S85. If the result of decision at step S84 is NO, that is if the cancel button [Cancel] 255 is not clicked, the main controller body unit 21 reverts to step S82 to re-check whether or not the OK button 254 has been clicked.

At step S85, the main controller body unit 21 closes the remote access control dialog box 250, which is the remote device setting picture indicated on the display device 23. If the remote access control dialog box 250 is closed, the remote maintenance picture 240 is displayed.

At step S86, the main controller body unit 21 checks whether or not the deletion [Delete] button 244 of the remote maintenance picture 240 has been clicked. If the result of check at this step S86 is YES, that is if the deletion [Delete] button 244 has been clicked, the main controller body unit 21 proceeds to the next step S87. If the result of check at this step S86 is NO, that is if the deletion [Delete] button 244 has not been clicked, the main controller body unit 21 proceeds to step S89 shown in FIG. 41.

At step S87, the main controller body unit 21 checks whether or not the host registered in the remote access control list box 241 has been selected. If the result of check at this step S87 is YES, that is if the host has been selected, the main controller body unit 21 proceeds to the next step S88. If the result of check at this step S87 is NO, that is if the host has not been selected, the main controller body unit 21 proceeds to step S89.

At step S88, the main controller body unit 21 deletes the registration of the selected host from the remote access control list box 241. The main controller body unit 21 then proceeds to step S89 shown in FIG. 41.

At step S89, the main controller body unit 21 checks whether or not the disconnect button [Disconnect] 246 has been clicked. If the result of check at this step S89 is YES, that is if the disconnect button [Disconnect] 246 has been clicked, the main controller body unit 21 proceeds to the next step S90. If the result of check at this step S89 is NO, that is if the disconnect button [Disconnect] 246 has not been clicked, the remote control processing is terminated.

At step S90, the main controller body unit 21 checks whether or not the host indicated on the remote connection user list box 245 of the remote maintenance picture 240 has been selected. If the result of check at this step S90 is YES, that is if the host is selected, the main controller body unit 21 proceeds to the next step S91. If the result of check at this step S90 is NO, that is if the host is not selected, the remote control processing is terminated.

At step S91, the main controller body unit 21 interrupts the connection to the first remote controller 2A.

At the next step S92, the main controller body unit 21 checks whether or not the first remote controller 2A in the connected state is eliminated from the remote connection user list box 245, that is if the access is positively interrupted from the first remote controller 2A. If the result of check at this step S92 is YES, tat is if the first remote controller 2A in the connected state is eliminated from the remote connection user list box 245, the main controller body unit 21 proceeds to the next step S93. If the result of check at this step S92 is NO, that is if the first remote controller 2A in the connected state is eliminated from the remote connection user list box 245, the remote control processing is terminated.

At step S93, the main controller body unit 21 causes the main picture for control 90 of FIG. 11 to be displayed on the display device 23 to terminate the remote control processing. If, after the end of the remote control processing, the remote control processing is again executed, the processing is started as from step S75.

Figure 42:
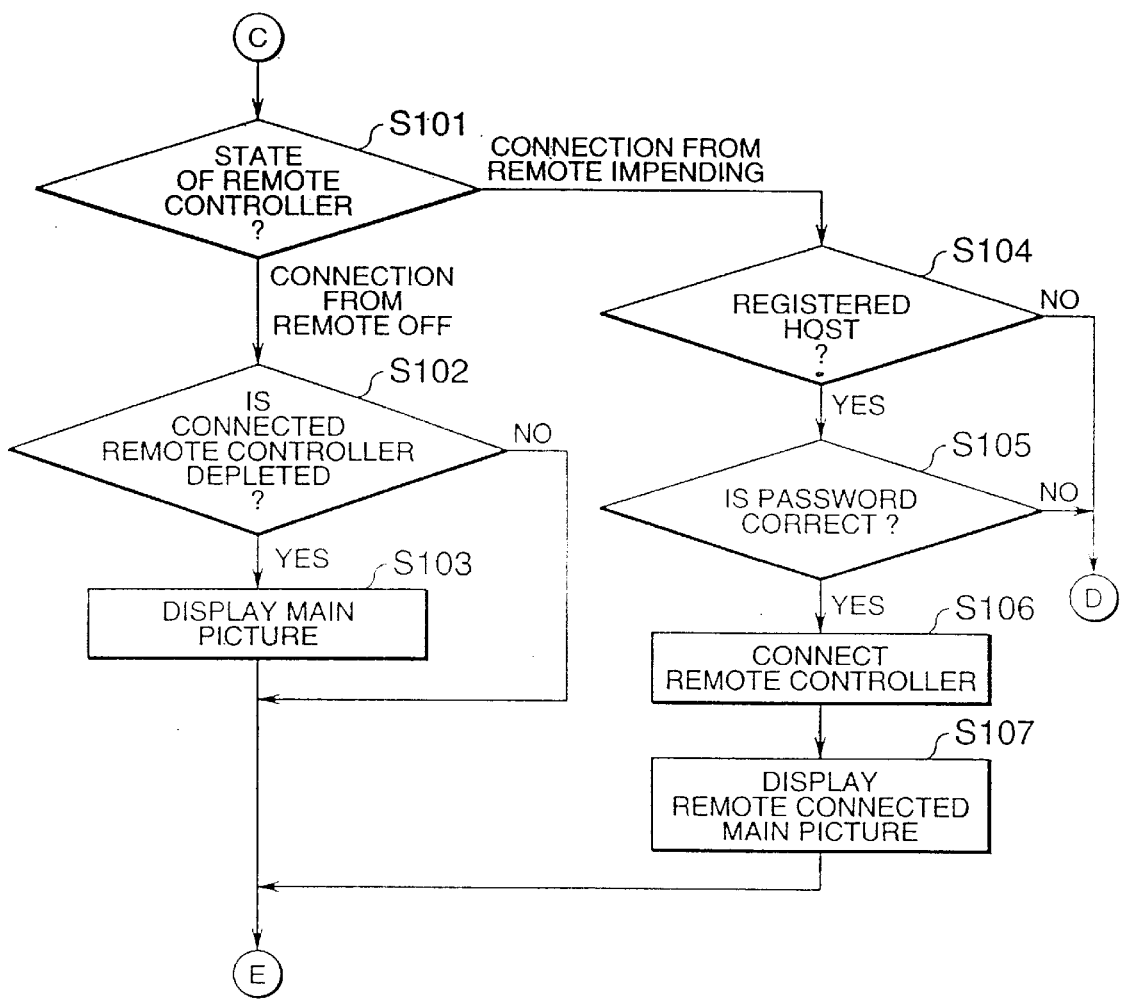
FIG. 42, continuing to FIG. 41, is a flowchart for illustrating the operational processing of the main controller body unit at the time of remote control.

At step S101 shown in FIG. 42, the main controller body unit 21 checks the state of the remote controller. Specifically, the main controller body unit 21 checks if the first remote controller 2A is going to be disconnected or the first remote controller 2A so far connected has been disconnected. If, as the result ofdecision at this step S102, if the first remote controller 2A is going to be connected, the main controller body unit 21 proceeds to step S104. If the connection from the first remote controller 2A is interrupted, the main controller body unit 21 proceeds to step S102.

At step S102, the main controller body unit 21 checks whether or not the first remote controller 2A so far connected has been removed, that is if the host name of the first remote controller 2A has been removed from the remote connection user list box 245. If the result of check at this step S102 is YES, that is if the first remote controller 2A so far connected has been removed, the main controller body unit 21 proceeds to the next step S103. If the result of check at this step S102 is NO, that is if the first remote controller 2A has been removed, the main controller body unit 21 reverts to step S74 shown in FIG. 36 to display the remote maintenance picture 240 on the display device 23.

At step S103, the main controller body unit 21 causes the main picture for control 90 shown information FIG. 11 to be displayed on the display device 23. The main controller body unit 21 reverts to step S74 shown in FIG. 36 to demonstrate the remote maintenance picture 240 on the display device 23.

At step S104, the main controller body unit 21 checks whether or not the first remote controller 2A is a previously registered host. If the result of check at this step S104 is YES, that is if the host is previously registered, the main controller body unit proceeds to step S105. If the result of check at this step S104 is NO, that is if the host is not previously registered, the main controller body unit proceeds to step S73 or step S76 shown in FIG. 36. If processing has proceeded from step S72 to step S101, the main controller body unit proceeds to step S73. If processing has proceeded from step S75 to step S101, the main controller body unit proceeds to step S76.

At step S105, the main controller body unit 21 checks whether or not the password transmitted from the first remote controller 2A is correct. If the result of check at this step S105 is YES, that is if the password is correct, the main controller body unit 21 proceeds to the next step S106. If the result of check at this step S105 is NO, that is if the password is not correct, the main controller body unit 21 proceeds to step S73 or S76. Specifically, if processing has proceeded from step S72 to step S101, the main controller body unit 21 proceeds to step S73 and, if processing has proceeded from step S75 to step S101, the main controller body unit 21 proceeds to step S76.

At step S106, the main controller body unit 106 performs the processing of connecting the first remote controller 2A. The main controller body unit then proceeds to step S107.

Figure 43:
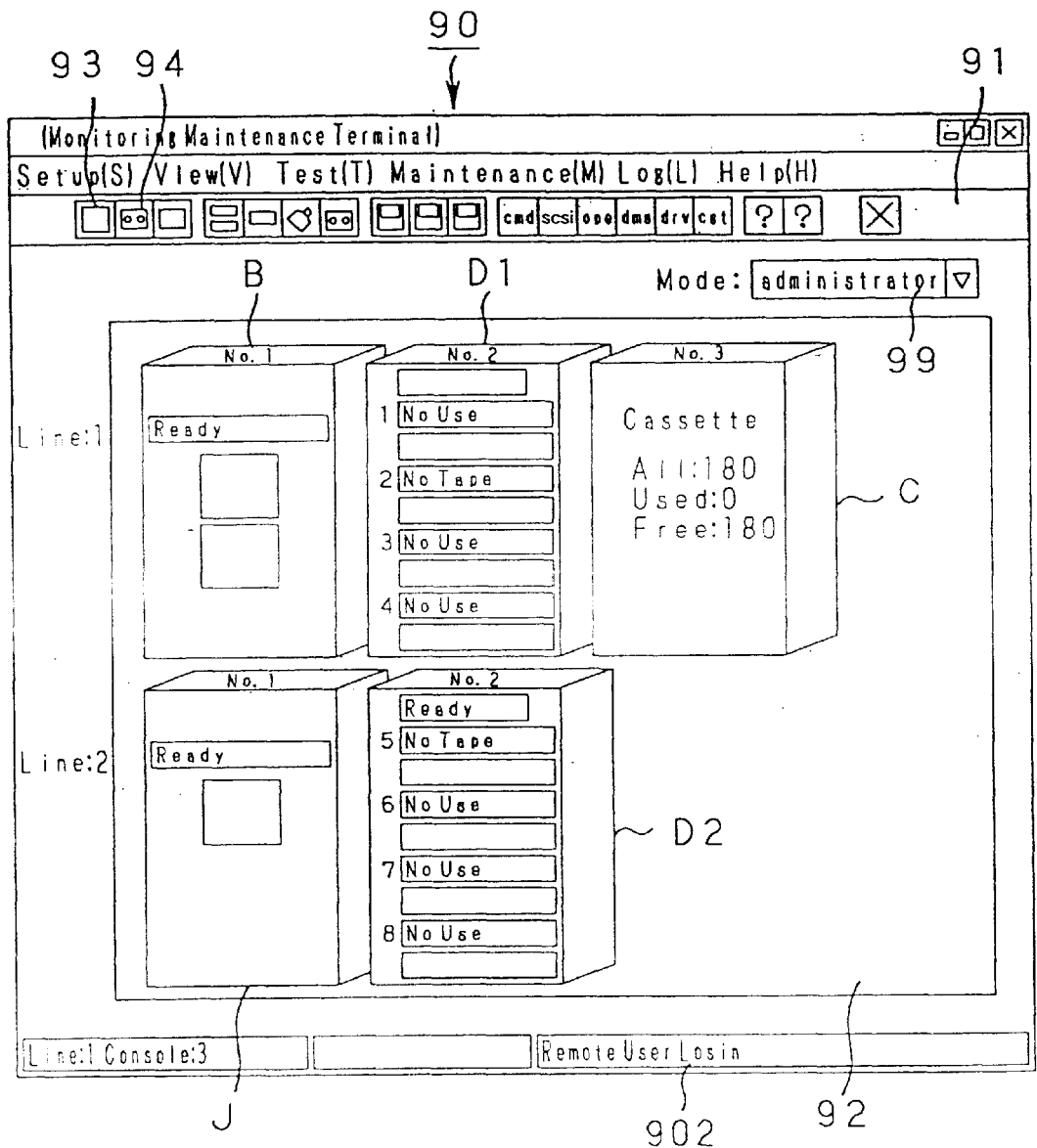
FIG. 43 shows a main picture at the time of remote connection.

At step S107, the main controller body unit 21 causes the display device 23 to indicate on the display device 23 the main picture for control 90 demonstrating that the remote connection from outside is on, as shown in FIG. 43. The main controller body unit 21 then proceeds to step S74 shown in FIG. 36.

On the main picture for control 90, an alarm [Remote User Login] is indicated on a remote connection display area 902. The remote connection display area 902 is scintillated in yellow by way of warning to the user. On establishing remote connection, the remote connection display area 902 is scintillated in yellow even if other windows are open. The main picture for control 90 is displayed on the top, with the remote connection display area 902 being scintillated in yellow. The user is able to recognize remote connection from outside positively regardless of which window is open.

If the user desires to interrupt the remote connection for prohibiting unauthorized operation, it suffices if, after the main controller body unit 21 reverts to step S74 to proceed to step S89, the disconnect button [Disconnect] 246 is clicked.

(4-2) Processing of Remote Controller

The processing contents of the first remote controller 2A as the remote controller side, at the time of remote operation, are hereinafter explained.

Figure 44:
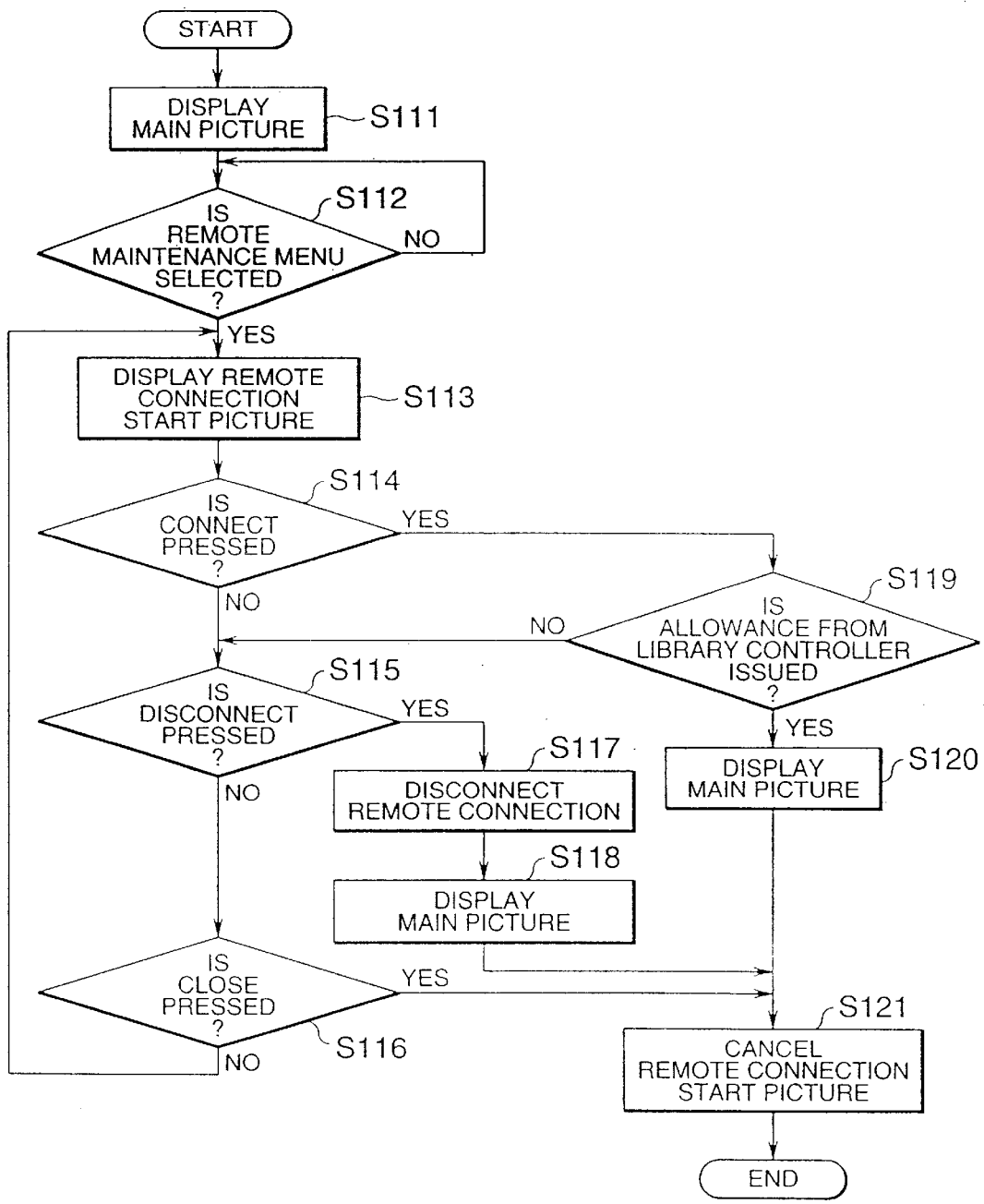
FIG. 44 is a flowchart for illustrating the operational processing of the main controller body unit at the time of remote control.

For connection to the main controller body unit 21 as the host side, a main controller body unit 21A of the first remote controller 2A performs the processing as from step S111 shown in FIG. 44.

Figure 45:
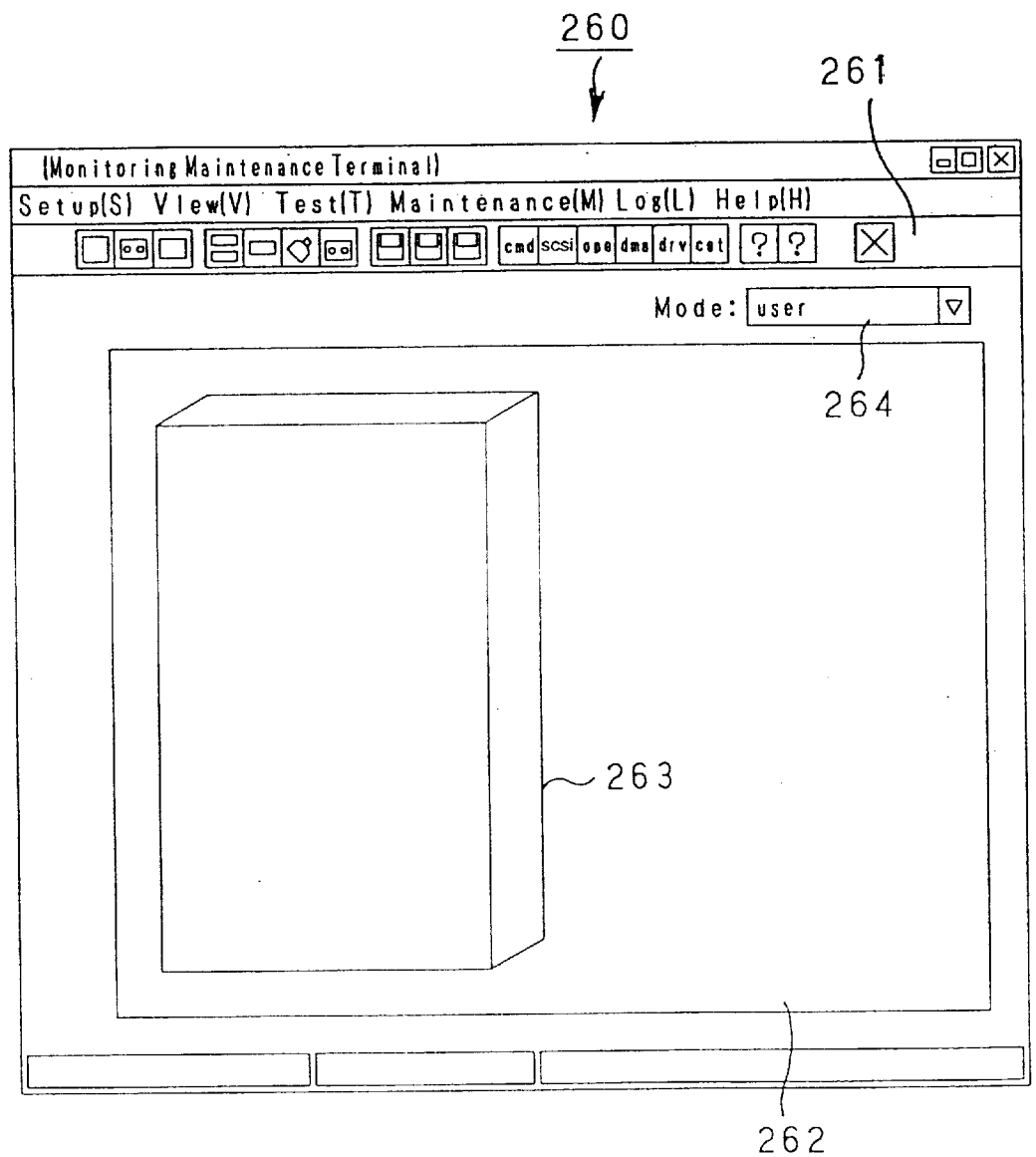
FIG. 45 shows a remote side main picture of a remote controller.

At step S111, the main controller body unit 21A causes a remote side main picture 260, shown in FIG. 45, to be displayed on a display device 23A.

The remote side main picture 260 includes a menu bar area 261 for displaying an icon menu for commanding the control of the cassette library system, a console composition area 262 showing the basic structure of the cassette library system 1, and a mode dropdown list box 264, indicating the operational mode, and is graphically displayed to permit facilitated visual recognition.

In the console composition area 262, a sole console 263 is displayed. Here, the library controller 2 is not connected to the first remote controller 2A. Therefore, a sole console 263 shown in FIG. 45 is conceptually displayed.

In a mode dropdown list box 264, one of the user mode, service mode or the disable mode is demonstrated. Meanwhile, in the mode dropdown list box 264, the user mode is displayed, without regard to the operating mode permitted by the library controller 2, directly after connection establishment. If the service mode operation is necessary, the mode dropdown list box 264 of the remote side main picture 260 needs to be clicked to change over the mode.

The remote side main picture 260 is substantially of the same structure as the main picture for control 90 with the exception of limitations imposed by the library controller 2.

Figure 46:
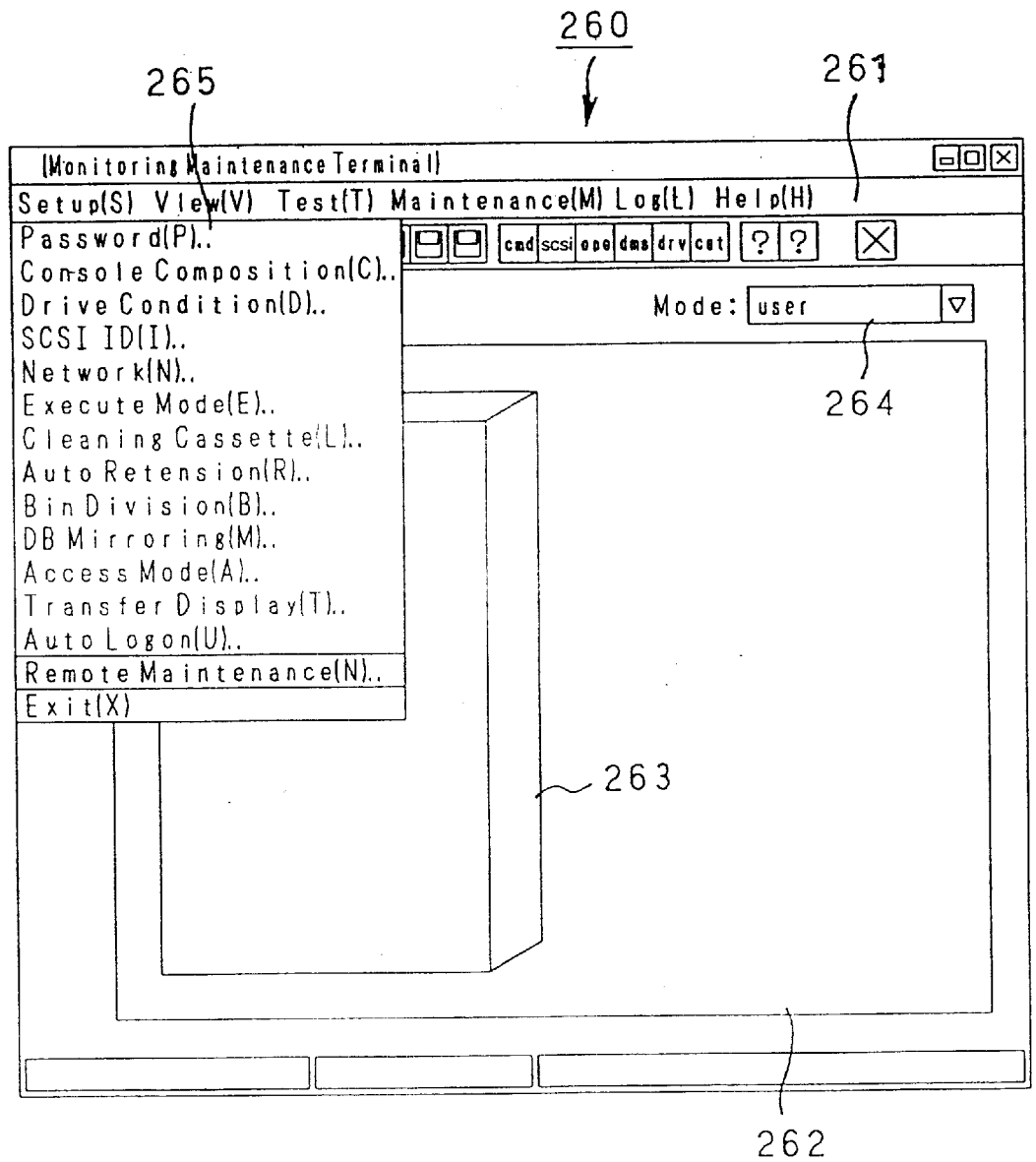
FIG. 46 shows a remote side main picture when a pull-down menu is displayed.

At the next step S112, the main controller body unit 21A checks whether or not the remote maintenance menu has been selected. Specifically, the setup menu [Setup(S)] of the remote side main picture 260 is clicked, as shown in FIG. 46, to display a pulldown menu 265, and it is checked whether or not the item [Remote Maintenance (N)]265 A has been clicked. Meanwhile, the pulldown menu 265 is the same as the pulldown menu of the host side library controller 2 shown in FIG. 37.

Figure 47:
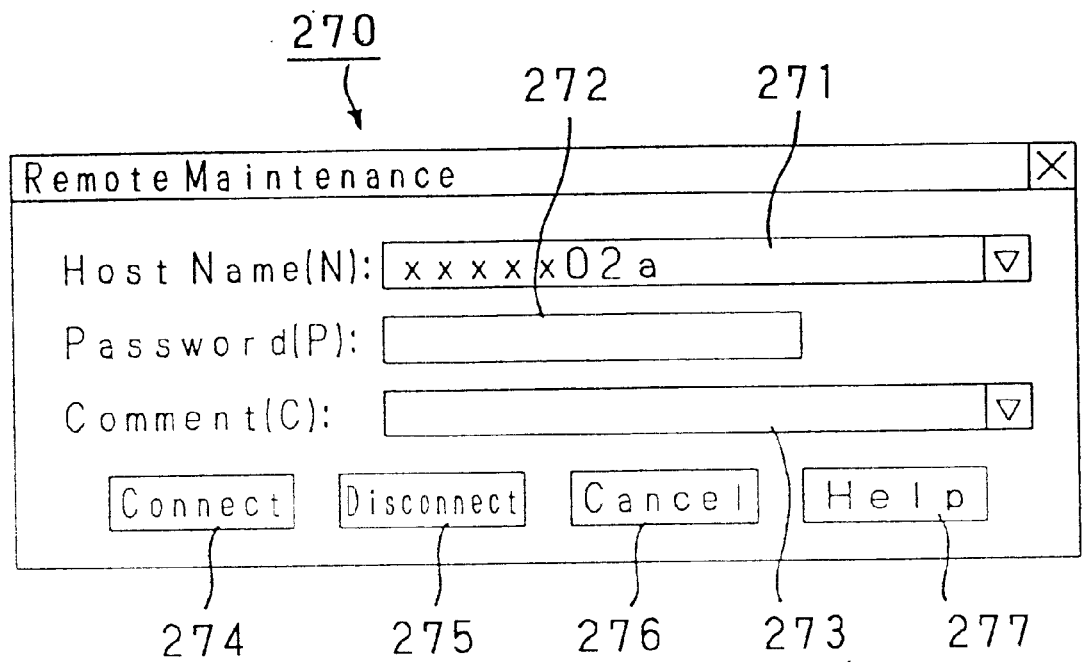
FIG. 47 shows a remote connection starting picture.

At the next step S113, the main controller body unit 21A causes a remote connection start picture 270 shown in FIG. 47 to be displayed on the display device 23A.

The remote connection start picture 270 includes a host name [Host Name] dropdown list box 271, for inputting or selecting the host name of the library controller 2 to be connected, a password text box 272, for inputting the password of the library controller 2 to be connected, a comment dropdown list box 273, a connection button [Connect] 274 for starting the connection, a disconnect button [Disconnect] 275 for interrupting the remote connection, a close button [Close] 276 and a help button [Help] 277 for help menu display.

The comment dropdown list box 273 is used for the user to input a comment in case of necessity. The input comment is demonstrated in the comment column of a user list box 245 of the host side remote maintenance picture 240, as shown in FIG. 38.

The user inputs the host name, password and the comment, if need be, in the respective pre-set columns.

At the next step S114, the main controller body unit 21A checks whether or not the connection button [Connect] 274 has been clicked. If the result of check at this step S114 is YES, that is if the connection button [Connect] 274 is clicked, the main controller body unit 21A proceeds to step S119. If the result of check at this step S114 is NO, that is if the connection button [Connect] 274 is not clicked, the main controller body unit 21A proceeds to step S115.

At step S115, the main controller body unit 21A checks whether or not the disconnect button [Disconnect] 275 has been clicked. If the result of check at this step S115 is YES, that is if the disconnect button [Disconnect] 275 has been clicked, the main controller body unit 21A proceeds to step S117. If the result of check at this step S115 is NO, that is if the disconnect button [Disconnect] 275 has not been clicked, the main controller body unit 21A proceeds to step S116.

At step S116, the main controller body unit 21A checks whether or not the close button [Close] 276 has been clicked. If the result of check at this step S116 is YES, that is if the close button [Close] 276 has been clicked, the main controller body unit 21A proceeds to step S121. If the result of check at this step S116 is NO, that is if the close button [Close] 276 has not been clicked, the main controller body unit 21A reverts to step S113.

At the step S117, to which the program moves if the disconnect button [Disconnect] 275 is verified to have been clicked at step S115 the main controller body unit 21A interrupts the remote connection with the library controller 2.

At the next step S118, the main controller body unit 21A demonstrates the remote side main picture 260 shown in FIG. 45. The main controller body unit then reverts to step S121.

At step S119, to which the program moves if the connection button [Connect] 274 is verified at step S274 to have been clicked, the main controller body unit 21A verifies whether or not a permission for remote connection has been issued from the library controller 2. If the result of check at step S119 is YES, that is if the permission for remote connection is issued, the main controller body unit 21A proceeds to the next step S120. If the result of check at step S119 is NO, that is if the permission for remote connection is not issued, the main controller body unit 21A proceeds to step S115. Since remote control is prohibited if no permission is acquired from the host side, unauthorized operation by a third party is prohibited.

Figure 48:
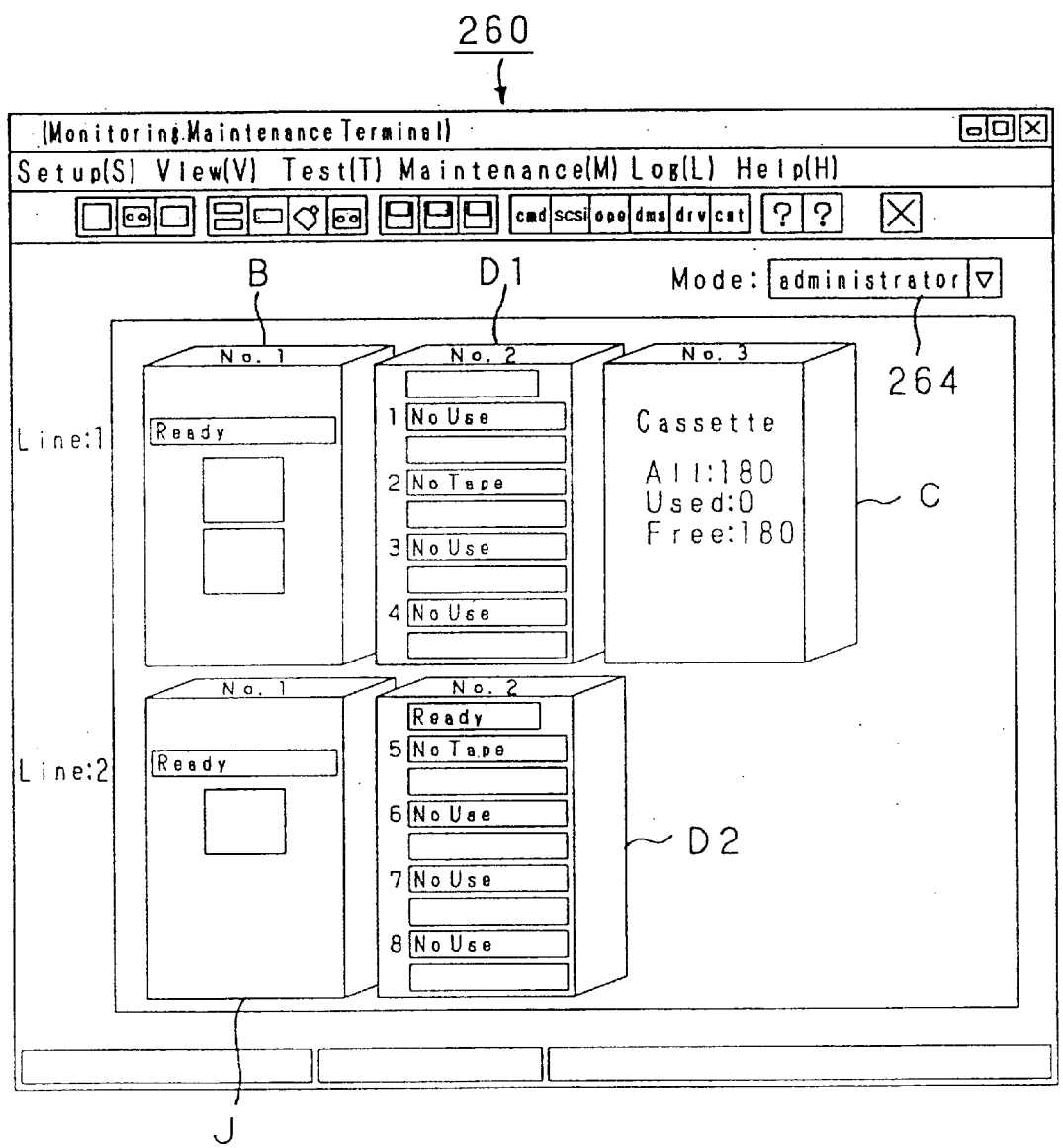
FIG. 48 shows a remote side main picture.

At step S120, the main controller body unit 21A causes the remote side main picture 260 indicating the structure of the cassette library 1 of the host side to be demonstrated on the display device 23, as shown in FIG. 48. The main controller body unit 21A then proceeds to step S121.

At this step S121, the main controller body unit 21A cancels the remote connection start picture 270, demonstrated by the display device 23, to terminate the remote control processing. If, after the end of the remote control processing, the remote control processing is to be initiated, the processing is started at step S112.

(4-3) Example of Remote Control

An example of controlling the host side library controller 2 from the first remote controller 2A is explained.

(4-3-1) Password Function

The password function herein means a function for a person supervising a cassette library system, referred to below as a system supervisor, or a user, to change an own password.

Figure 49:
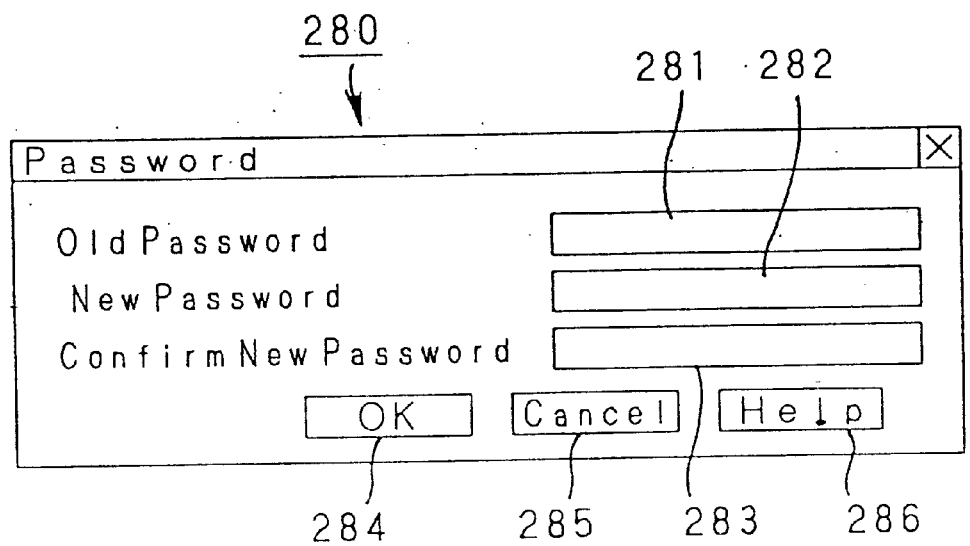
FIG. 49 shows a password dialog box.

If the setup menu [Setup(S)] in the main picture for control 90 of the library controller 2 is selected, and an item [Password(P)] 901C is selected from the pull-down menu 901, as shown in FIG. 37, a password dialog box 280, shown in FIG. 49, is displayed on the display device 23A.

The password dialog box 280 includes an old password text box 281, a new password text box 282, a confirm new password text box 283, an OK button 284 and a cancel [Cancel] button 285.

The old password text box 281 is used for inputting a password of the current system supervisor or the user. If the password is inputted, an asterisk (*) is displayed in the old password text box 281.

The new password text box 282 is used for inputting a new password of the current system supervisor or the user. Similarly, the confirm new password text box 283 is used for inputting a new password of the current system supervisor or the user. The same password is inputted twice to avoid setting a wrong password by possible inputting errors.

(4-3-2) Driving Condition Function

Figure 50:
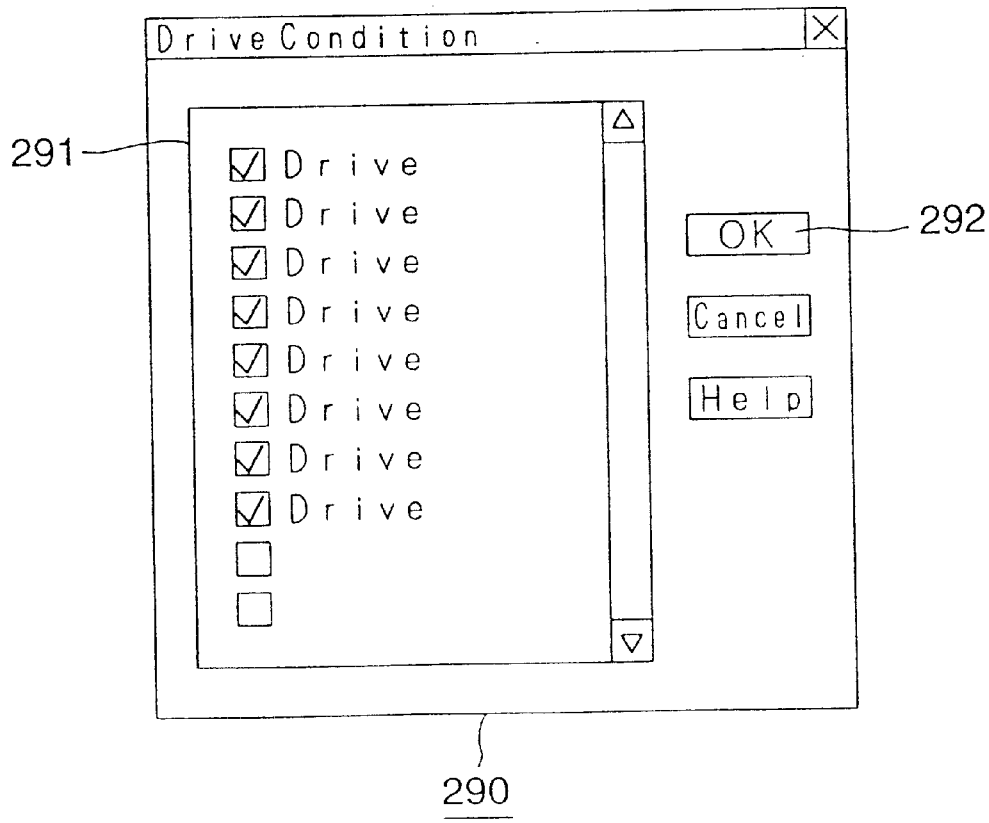
FIG. 50 shows a drive condition dialog box.

The driving condition function means the function of setting use permission/use inhibition of each data driving device 13 loaded on the cassette library 1. Although only monitoring is possible with the user mode, the following setting operations, in addition to the monitoring, are possible in the service mode. It is noted that only the data driving device 13 with the setting of "use permission" can be used. If the driving condition function is to be used, the setup menu [Setup(S)] in the main picture for control 90 is selected and the item [Drive Condition (D)] 901D in the pull-down menu 901 is also selected to display a driving condition dialog box 290 as shown in FIG. 50.

The driving condition dialog box 290 includes a drive check box 291 associated with each data driving device 13 of the cassette library system 1. The number of drives indicated on the drive check box 291 coincides with the number of the drives in the library system. That is, if the driving condition dialog box 290 is displayed, "Drive" is demonstrated a number of times equal to the number of drives of the library system. If the check of the drive check box 291 is cancelled with a mouse, and the OK button 292 is selected, the data driving device 13 associated with the drive check box 291 becomes unusable.

(4-3-3) Execute Mode

The execute mode function means the function of setting the control operation of the library controller 2 for controlling the library system 1. Although only monitoring is possible with the user mode, the following setting, in addition to the monitoring, can be performed in the service mode.

Figure 51:
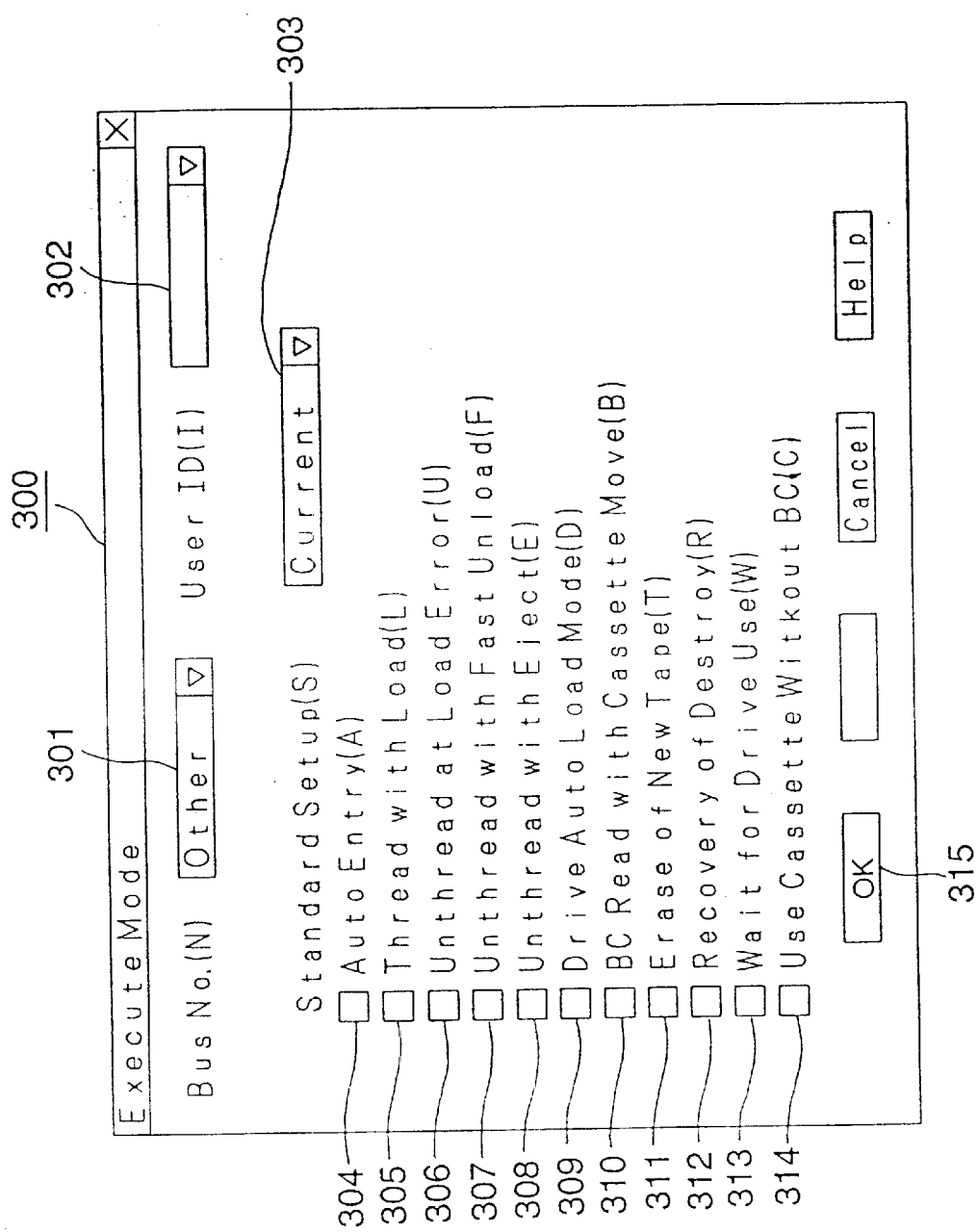
FIG. 51 shows an execution mode dialog box.

For this setting, the setup menu [Setup(S)] is selected from the main picture for control 90 shown in FIG. 37, and the item [Execute Mode]901E is selected from the pull-down menu 901 to display an execute mode dialog box 300 shown in FIG. 51.

It is possible for the library controller 2 to make divisional setting, that is the setting in which the entire console device 1 is constructed by plural library devices 1 by grouping plural consoles or on the console basis. In this case, the divisionally set library device can be entered on the screen by a bus number box [Bus No.(N)] 301 and a user ID dropdown list box [User ID(1)]. That is, which of the two divided areas is set is decided by the two boxes 301, 302. Meanwhile, if division setting is not made, the item [Other] is selected from the pull-down menu by the bus number box 301, as shown in FIG. 51.

A standard setup 303 is used when it is desired to omit the necessary inputting for the respective items of the operating mode 304 to 314 by selecting the desired menu from the pull-down menu, or when it is desired to omit the inputting of the items 304 to 314 of the operational mode by default setting.

The respective items of the operational mode are explained.

An item [Auto Entry(A)] 304 is an item for setting whether or not a cassette tape is to be moved to a vacant cassette housing shelf when the cassette tape is inserted into an input port of the input/output port 11 of the library device 1, such as an input port 11a. If this item [Auto Entry(A)] is not checked, it is necessary to deliver a command to the library controller to move the cassette tape.

An item [Thread With Load(L)] 305 is an item for setting whether or not, if a cassette tape is moved to the data driving device 13, the cassette tape is to be loaded automatically within the data driving device 13.

An item [Unthread at Load Error(U)] 306 is an item for setting whether or not, if a cassette tape is moved to the data driving device 13 and an error is detected in the data driving device 13, the cassette tape is to be returned to the cassette housing shelf or left in the data driving device 13. If this item [Unthread at Load Error(U)] 306 is not checked, the cassette tape is left within the data driving device 13.

An item [Unthread With Fast unload(F)] 307 is an item for setting whether not, when the cassette tape is moved to the data driving device 13, the cassette tape is to be unloaded at an elevated speed within the data driving device 13.

An item [Unthread With Eject(E)] 308 is an item for setting whether or not, when the cassette tape is moved from the data driving device 13, the cassette tape is to be ejected from the data driving device 13. If this item [Unthread With Eject(E)] 308 is not checked, it is necessary to send out a command of ejecting the cassette tape from the data driving device 13 before issuing a cassette tape movement command.

An item [Drive Auto Load Mode(D)] 309 is an item for setting, at a time point when the movement of the cassette tape to the data driving device 13 has come to a close, whether or not a notice of end of movement of the cassette tape is to be issued to an upper order controller, such as a library controller. By issuing the cassette tape movement end notice to the upper order controller, it is possible for the library controller 2 to control the movement of another cassette tape. If this item [Drive Auto Load Mode(D)] 309 is not checked, it becomes necessary to send out a notice for the end of cassette tape movement to the above controller after confirming that the cassette tape has been inserted into the data driving device.

An item [Erase Of New tape(T)] 310 is an item for setting whether or not, when the cassette tape is to be moved, the bar code of the cassette tape is to be read. If this item [Erase Of New tape(T)] 310 is checked, the cassette tape is not moved if the bar code data read out is not coincident with the database of the cassette tape held by the library controller 2.

An item [Erase Of New Tape(T)] 311 is an item for setting whether or not, if a non-formatted cassette tape is detected on loading the cassette tape on the data driving device, the cassette tape is to be initialized automatically.

An item [Recovery Of Destroy(R)] 312 is an item for setting whether or not, if a cassette tape is loaded on the data driving device 13, the header portion of the cassette tape is to be repaired automatically.

An item [Wait For Drive Use(W)] 313 is an item for setting whether or not, if, when a cassette tape is moved to the data driving device 13, another cassette tape is previously inserted in the data driving device 13 as a destination of movement, ejection of the other cassette tape from the data driving device 13 is to be awaited. If this item [Wait For Drive Use(W)] 313 is not checked, an other cassette tape previously introduced into the data driving device 13 of destination produces an error.

An item [Use Cassette Without BC(C)] 314 is an item for setting whether or not a cassette tape not carrying a bar code label or a cassette tape from which the bar code cannot be read out is to be used. If this item [Use Cassette Without BC(C)] 314 is not checked, only a cassette tape from which the bar code can be read out correctly is used.

If the user checks the dialog box with a mouse, the checked function is set in the library controller 2. The library controller 2 controls the cassette library 1 in accordance with the set contents.

(4-3-4) Hours Meter (DMS Hours, Drive Hours)

On a DMS hours meter window 320, an hours meter (integrated use time and number of times of use) is demonstrated from one console string to another, as shown in FIG. 52, by selecting a tool bar [DMS Hours] in a monitor window, not shown, by selecting the menu bar [Test (T)] on the main picture for control 90 shown in FIG. 37. This DMS hours meter window 320 displays data of the 24-hour based hours meter of the library device 1 as a hysteresis of seven days.

In a driver hours meter window 330, an hours meter (integrated use time) of each data driving device 13 is displayed in the drive number sequence, as shown in FIG. 53, by selecting a tool bar [Drive Hours] in a monitor window, not shown, displayed by selecting a menu bar [Test(T)] in the main picture for control 90 shown in FIG. 37. Meanwhile, the display [drive not connected] shows the state in which the data driving device 13 is not recognized by the library controller 2.

(4-3-5) Log Menu

FIG. 54 shows a view log window 340 demonstrating various logs recorded by the library controller 2. FIG. 54 shows an instance of an error log display. The view log window 340, shown in FIG. 54, is displayed on selecting the item [View Log] from the pull-down menu, not shown, displayed on selecting the menu bar [Log(L)] of the main picture for control 90 shown in FIG. 37.

Figure 55:
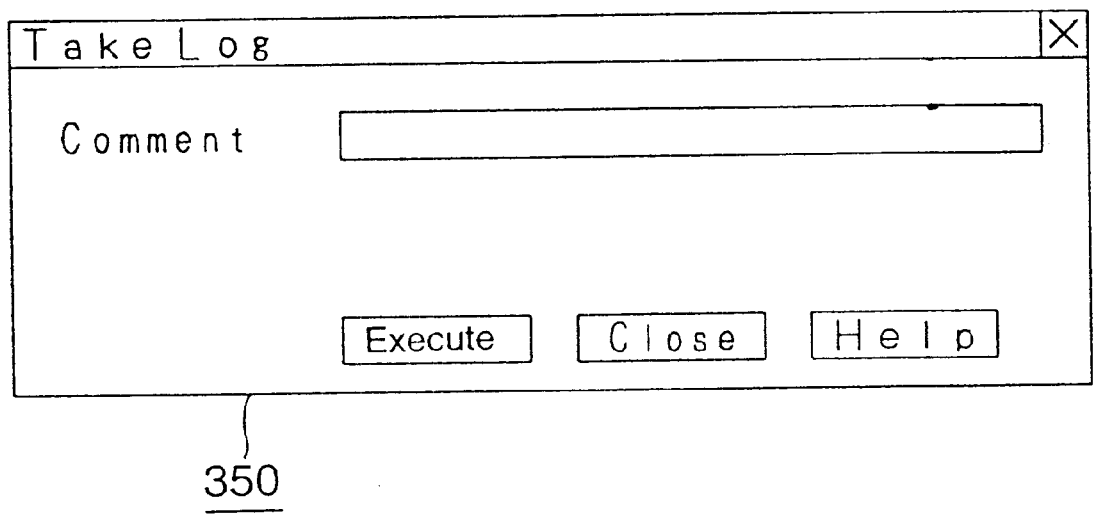
FIG. 55 shows a take log dialog box.

FIG. 55 shows a take log dialog box 350. The take log dialog box 350 is displayed on selecting an item [Take log] from a pull-down menu, not shown, displayed on selecting a menu bar [Log(L)] of the main picture for control 90 shown in FIG. 37. The take log dialog box 350 is used for collectively recording the logs necessary for analyses if certain inconveniences arise for the entire system. In a comment text box, comments on the inconveniences that arose are entered. A text file, having written the system information, is formulated to record the comments therein.

Figure 56:
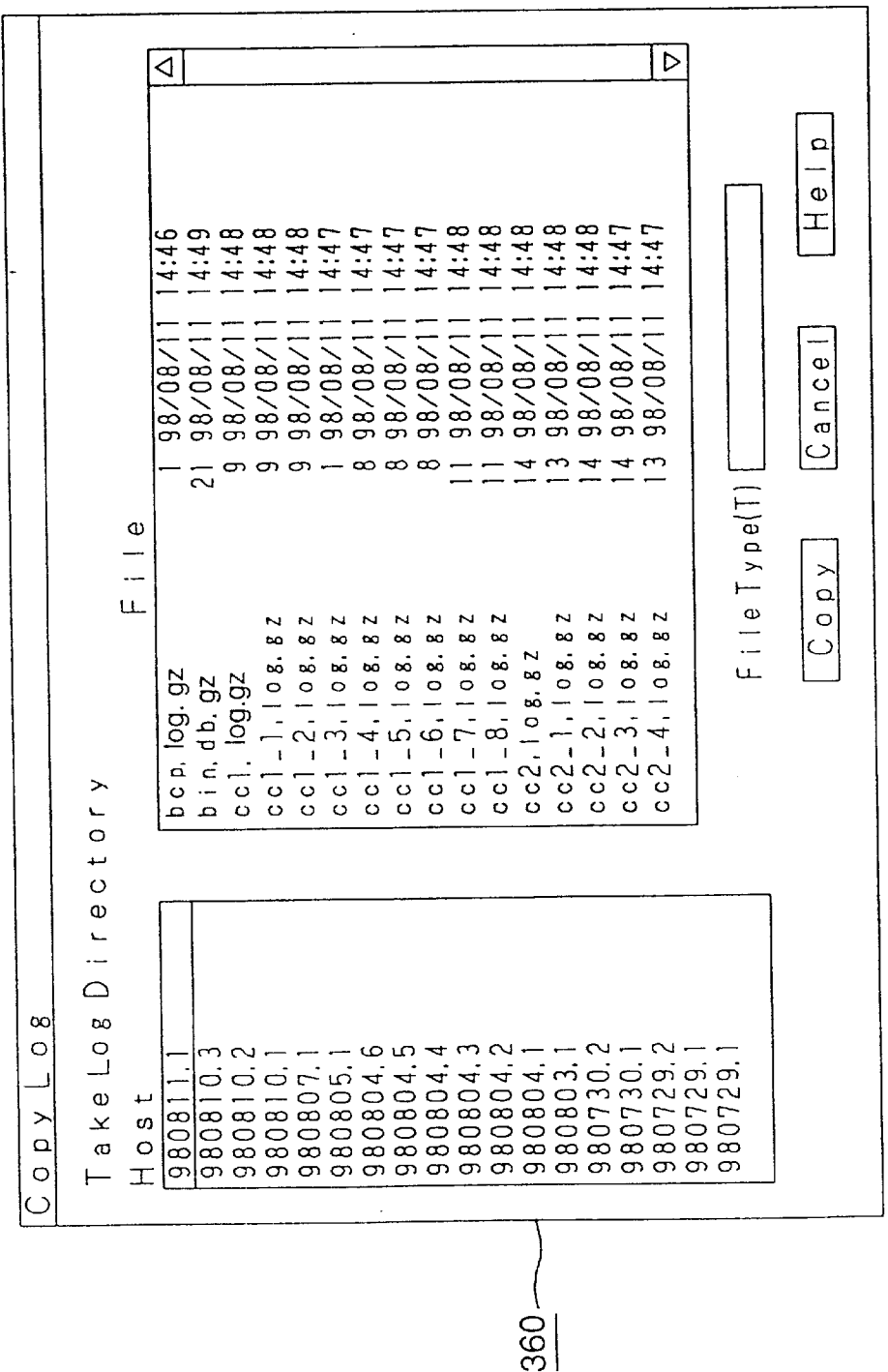
FIG. 56 shows a copy log dialog box.

FIG. 56 shows a copy log dialog box 360 which is displayed by selecting the menu bar [Log(L)] of the main picture for control 90 shown in FIG. 37. The copy log dialog box 360 is used for specifying the log data to be copied when the log data recorded on the hard disc drive 49 (FIG. 6) of the library controller 2 by the take log command is to be recorded on a floppy disc.

FIG. 57 shows a system information window 370. The system information window 370 is demonstrated by selecting an item [System Window] from a pull-down menu, not shown, displayed on selecting the menu bar [Log(L)] of the main picture for control 90 shown in FIG. 37. The system information window 370 indicates a list of files of the system information acquired so far. From this system information window 370, it is possible to newly acquire the current system information or to display the contents of the displayed system information file. The system information window is made of text files.

(4-3-6) Others

The operational contents of the remote controller in the user mode or the service mode in executing the various control commands are shown in Table 1.

TABLE 1

|  | User Mode | Service Mode |
| --- | --- | --- |
| Password | X | X |
| Console Composition | R | R/W |
| Drive Condition | R | R/W |
| Execute Mode | R | R/W |
| Remote Maintenance | R/W | R/W |
| Bin Data | R | R/W |
| Cassette Data | R | R/W |
| DMS Hours | R | R/W |
| Drive Hours | R | R |
| Move Cassettes | X | R/W |
| Tape Retensioning | X | R/W |
| Vies Log | R/W | R/W |
| Take Log | R/W | R/W |
| Copy Log | R/W | R/W |
| System Information | R/W | R/W |

In the above Table 1, [R]. [R/W] and [X] denote that monitoring only is possible, monitoring and setting are both possible and neither monitoring nor setting is possible, respectively.

The above-described commands are merely illustrative and monitoring or setting by remote connection also is of course possible in executing other control commands.

The present invention is not limited to the above-described embodiment such that it is of course possible to use a magnetic disc or an optical disc in place of a cassette tape with the exception of a retensioning operation.

What is claimed is:

1. A library device comprising:
   recording/reproducing means for recording or reproducing the information using a removable recording medium, a plurality of housing means having housing units to accommodate said recording medium therein, transporting means for transporting said recording medium between an optional housing unit in said housing means and said recording/reproducing means, and control means for controlling said transporting means and/or said recording/reproducing means; said respective means being accommodated in a plurality of consoles, depending on the console sorts, said consoles being combined and interconnected to permit relative positions thereof to be changed;
   wherein
      said control means allocating logical numbers to said consoles and also allocating logical numbers to said housing units in said consoles so that the allocated logical numbers will be contiguous to the logical numbers of said housing units of said consoles prior to a possible change of the relative positions thereof.

2. The library device according to claim 1 further comprising:
   display means for demonstrating a console composition setting picture used for allocating logical numbers to extended consoles;
   said control means operating so that a site of a console desired to be changed is decided from the logical number indicating the site information of a console prior to change displayed on said console composition setting picture to allocate said logical number to said console.

3. The library device according to claim 2 wherein
   when said physical number is inputted to said console composition setting picture, said control means causes the console logical number allocating setting picture on said display means to allocate the logical number inputted to said logical number allocating setting picture to the changed console.

4. The library device according to claim 1 wherein
   the logical number allocated to said housing unit includes a logical number affixed to an insertion opening or ejection opening of said recording/reproducing means via which said recording medium is inserted or ejected, respectively.

5. The library device according to claim 1 wherein
   said consoles comprise a basic console having an input/output port for capturing said recording medium and/or ejecting the recording medium to outside, a housing console having said plural housing means, a driving console having said recording/reproducing means and a junction console having a transfer unit for transferring said recording medium from a first direction to a second direction;
   said transfer means being moved across said consoles to transport said recording medium selectively between said housing unit and said recording/reproducing means.

6. The library device according to claim 5 wherein
   said transfer unit has an opening via which to insert or eject said recording medium;
   said logical number affixed to said housing means being affixed to said opening.

7. In a library device comprising recording/reproducing means for recording or reproducing the information using a removable recording medium, a plurality of housing means that is able to accommodate said recording medium therein, transporting means for transporting said recording medium between an optional housing unit in said housing means and said recording/reproducing means, and control means for controlling said transporting means and/or said recording/reproducing means, said respective means being accommodated in a plurality of consoles, depending on the console sorts, said consoles being combined and interconnected to permit relative positions thereof to be changed,
   a logical number allocating method comprising:
      a first step of demonstrating the relative positions of said consoles on display means and for demonstrating on said display means the locating positions of the respective console prior to change thereof by logical numbers affixed to the respective consoles;
      a second step of determining desired change positions of said consoles from said logical numbers;
      a third step of receiving the logical numbers of the consoles desired to be changed, as inputs, and allocating the logical numbers of the changed consoles based on the input logical numbers; and
      a fourth step of allocating the logical numbers to the respective housing sections in said changed consoles so that the allocated logical numbers of said housing sections will be contiguous to the logical numbers in said housing sections in said consoles prior to change.

8. The logical number allocating method in the library device according to claim 7 further comprising display means for demonstrating a console composition setting picture for allocating logical numbers to extended consoles, wherein
   in said third step, a logical number allocation setting picture for inputting the logical numbers is displayed on said display means and wherein the logical number inputted to said logical number allocation setting picture is allocated to the changed console.

9. The logical number allocating method according to claim 7 wherein
   the logical number allocated to said housing unit includes a logical number affixed to an insertion opening or an ejection opening of said recording/reproducing means via which said recording medium is inserted or ejected, respectively.

10. The logical number allocating method according to claim 7 wherein
    said consoles comprise a basic console having an input/output port for capturing said recording medium and/or ejecting the recording medium to outside, a housing console having said plural housing means, a driving console having said recording/reproducing means and a junction console having a transfer unit for transferring said recording medium from a first direction to a second direction;
    said transfer means being moved across said consoles to transport said recording medium selectively between said housing unit and said recording/reproducing means.

11. The logical number allocating method according to claim 10 wherein said transfer unit has an opening via which to insert or eject said recording medium;

said logical number affixed to said housing means being affixed to said opening.

* * * * *